(12) United States Patent
Green et al.

(10) Patent No.: US 10,870,566 B2
(45) Date of Patent: Dec. 22, 2020

(54) BEVERAGE MAKING MACHINE

(71) Applicant: THE COCA-COLA COMPANY, Atlanta, GA (US)

(72) Inventors: C. Brad Green, Dacula, GA (US); Stan Kaplita, Sammamish, WA (US); H. Brock Kolls, Alpharetta, GA (US)

(73) Assignee: The Coca-Cola Company, Atlanta, GA (US)

(*) Notice: Subject to any disclaimer, the term of this patent is extended or adjusted under 35 U.S.C. 154(b) by 0 days.

(21) Appl. No.: 15/462,087

(22) Filed: Mar. 17, 2017

(65) Prior Publication Data
US 2017/0190555 A1  Jul. 6, 2017

Related U.S. Application Data

(63) Continuation of application No. 13/913,211, filed on Jun. 7, 2013, now Pat. No. 9,630,826.

(51) Int. Cl.
*B67D 1/02* (2006.01)
*B67D 1/00* (2006.01)
(Continued)

(52) U.S. Cl.
CPC .............. *B67D 1/0058* (2013.01); *A23L 2/54* (2013.01); *A47J 31/407* (2013.01); *A47J 31/4403* (2013.01); *B67D 1/008* (2013.01); *B67D 1/0021* (2013.01); *B67D 1/0029* (2013.01); *B67D 1/0072* (2013.01); *B67D 1/0074* (2013.01); *B67D 1/0078* (2013.01); *B67D 1/0406* (2013.01); *B67D 1/0884* (2013.01); *B67D 1/0888* (2013.01); *B67D 1/1204* (2013.01); *B67D 1/1252* (2013.01); *A23V 2002/00* (2013.01); *B67D 3/0019* (2013.01); *B67D 2001/0091* (2013.01);
(Continued)

(58) Field of Classification Search
CPC .. B67D 1/0078; B67D 1/0072; B67D 1/0029; B67D 1/0406; B67D 1/0884; B67D 1/0888; B67D 1/1204; B67D 1/1252
USPC ............................................................ 99/295
See application file for complete search history.

(56) References Cited

U.S. PATENT DOCUMENTS 1,967,553 A * 7/1934 Paul ..................... B01F 3/04808
62/166
2,201,429 A * 5/1940 Deibel ................... B67D 1/0009
261/76

(Continued)

*Primary Examiner* — Sean M Michalski

(57) ABSTRACT

The present invention relates to a beverage making machine comprising a first beverage making cartridge comprising at least one of a gas source portion, the gas source portion contains a solid gas source that through sublimation emits a gas, and a gas storage tank arranged to store the gas emitted from the solid gas source. The beverage making machine further comprising a second beverage making cartridge comprising at least one of a micro ingredient, a beverage diluent receptacle for receiving a beverage diluent liquid, a dissolver dissolves portion of the gas, from the gas storage tank, into the beverage diluent liquid, and a dispenser selectively dispenses a predefined ratio of at least one of the micro ingredient and the beverage diluent liquid, to form a beverage. Exemplary embodiments include a computer control arranged to receive a beverage selection from a consumer and control the beverage making machine to form beverages.

20 Claims, 28 Drawing Sheets

(51) Int. Cl.
  *B67D 1/04* (2006.01)
  *B67D 1/08* (2006.01)
  *B67D 1/12* (2006.01)
  *A23L 2/54* (2006.01)
  *A47J 31/40* (2006.01)
  *A47J 31/44* (2006.01)
  *B67D 3/00* (2006.01)

(52) U.S. Cl.
  CPC ............... *B67D 2001/0092* (2013.01); *B67D 2210/0012* (2013.01); *B67D 2210/00123* (2013.01)

(56) References Cited

U.S. PATENT DOCUMENTS

| | | | | |
|---|---|---|---|---|
| 2,612,304 A * | 9/1952 | Nissen | ............... | B67D 1/0058 99/323.2 |
| 2,685,985 A * | 8/1954 | Howell, Jr. | ............... | B67D 1/10 137/897 |
| 3,460,713 A * | 8/1969 | Cornelius | ............ | B67D 1/0016 222/1 |
| 4,358,029 A * | 11/1982 | Yomoda | ................ | A47J 27/14 222/133 |
| 4,629,098 A * | 12/1986 | Eger | ................ | A45F 3/16 138/115 |
| 4,708,266 A * | 11/1987 | Rudick | ............... | B67D 1/0036 222/105 |
| 6,138,995 A * | 10/2000 | Page | ................ | B67D 1/0077 210/321.8 |
| 6,868,694 B2 * | 3/2005 | Nielsen | ............... | A47G 19/2288 62/457.3 |
| 6,871,761 B2 * | 3/2005 | Fox | ................ | B67D 1/0021 222/129.1 |
| 7,070,068 B2 * | 7/2006 | Fox | ................ | B67D 1/0021 222/129.1 |
| 7,223,426 B2 * | 5/2007 | Cheng | ................ | A23F 5/243 222/137 |
| 7,661,352 B2 * | 2/2010 | Sher | ................ | B67D 1/0021 222/129.1 |
| 7,997,448 B1 * | 8/2011 | Leyva | ................ | B67D 1/0044 222/1 |
| 8,444,012 B2 * | 5/2013 | Bergdahl | ............... | A47J 31/407 222/1 |
| 8,544,692 B2 * | 10/2013 | Rusch | ................ | B67D 1/0004 141/346 |
| 8,703,222 B2 * | 4/2014 | Yao | ............... | A23F 5/486 426/433 |
| 8,893,927 B2 * | 11/2014 | Olson | ................ | B01F 5/0496 222/162 |
| 2002/0083842 A1 * | 7/2002 | Kown | ................ | C02F 1/46104 99/290 |
| 2007/0261436 A1 * | 11/2007 | Sundaram | ................ | A23L 2/02 62/604 |
| 2010/0005973 A1 * | 1/2010 | Doglioni Majer | ..... | B65D 75/38 99/295 |
| 2010/0263545 A1 * | 10/2010 | Morgan | ................ | A47J 31/005 99/295 |
| 2010/0293969 A1 * | 11/2010 | Braithwaite | ............. | A23B 4/08 62/62 |
| 2011/0236557 A1 * | 9/2011 | Suzuki | ................ | A23L 27/72 426/601 |
| 2012/0107453 A1 * | 5/2012 | Chase | ................ | F25D 23/126 426/66 |
| 2014/0150670 A1 * | 6/2014 | Green | ................ | B67D 1/0058 99/323.2 |
| 2014/0154368 A1 * | 6/2014 | Kolls | ................ | B65D 85/8043 426/115 |
| 2014/0154369 A1 * | 6/2014 | Kolls | ................ | B67D 1/0057 426/115 |
| 2014/0154380 A1 * | 6/2014 | Brown | ................ | A23L 2/54 426/312 |
| 2014/0154382 A1 * | 6/2014 | Green | ................ | B67D 1/0057 426/477 |
| 2014/0154391 A1 * | 6/2014 | Mehta | ................ | A23L 2/54 426/590 |
| 2014/0170279 A1 * | 6/2014 | Kolls | ................ | B67D 1/0021 426/431 |
| 2015/0274537 A1 * | 10/2015 | Myers | ................ | C01B 31/22 62/602 |

* cited by examiner

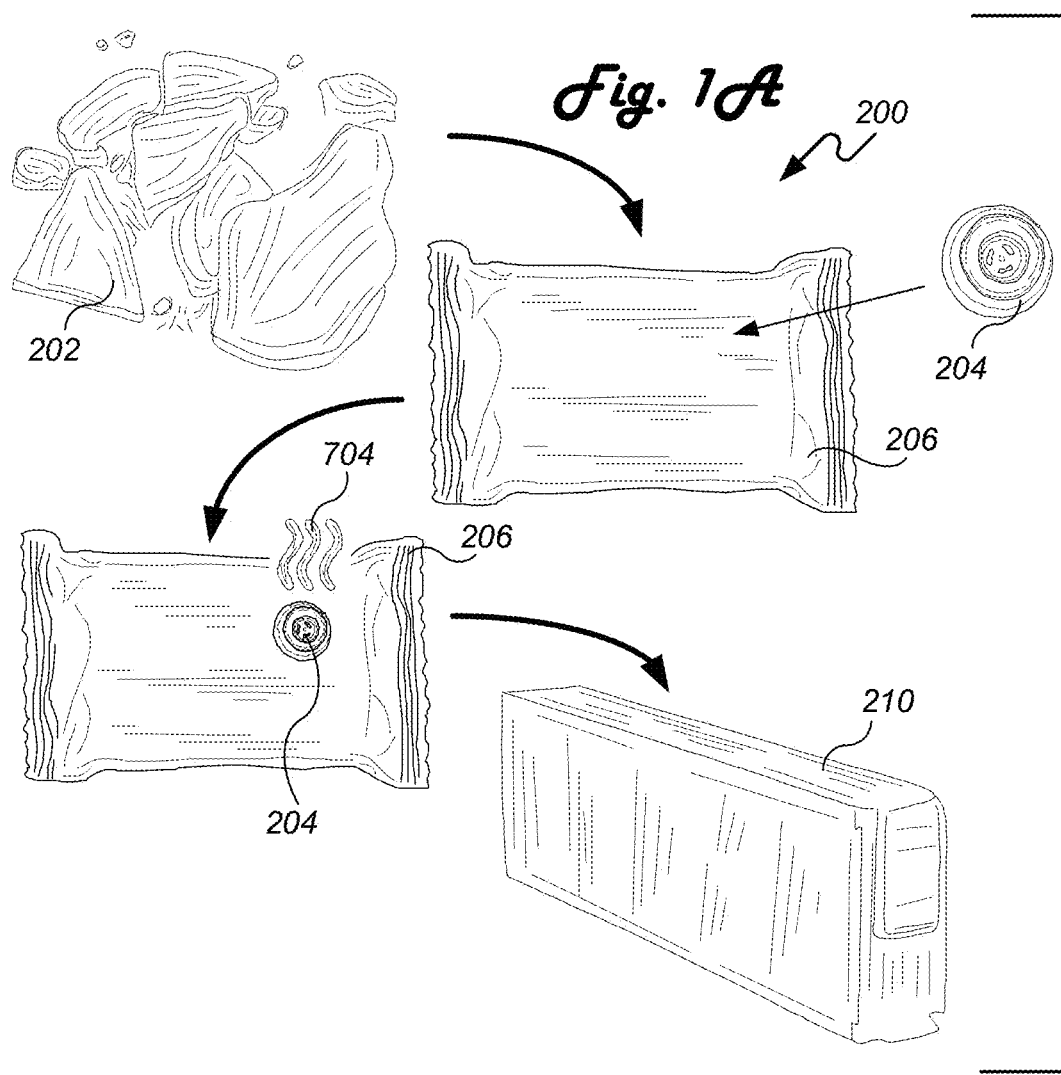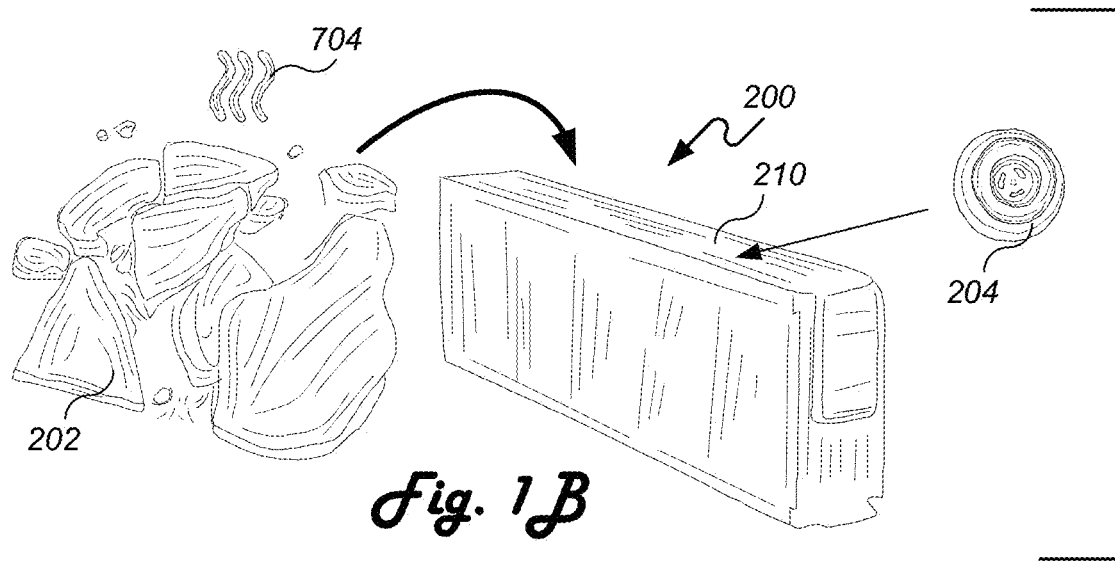

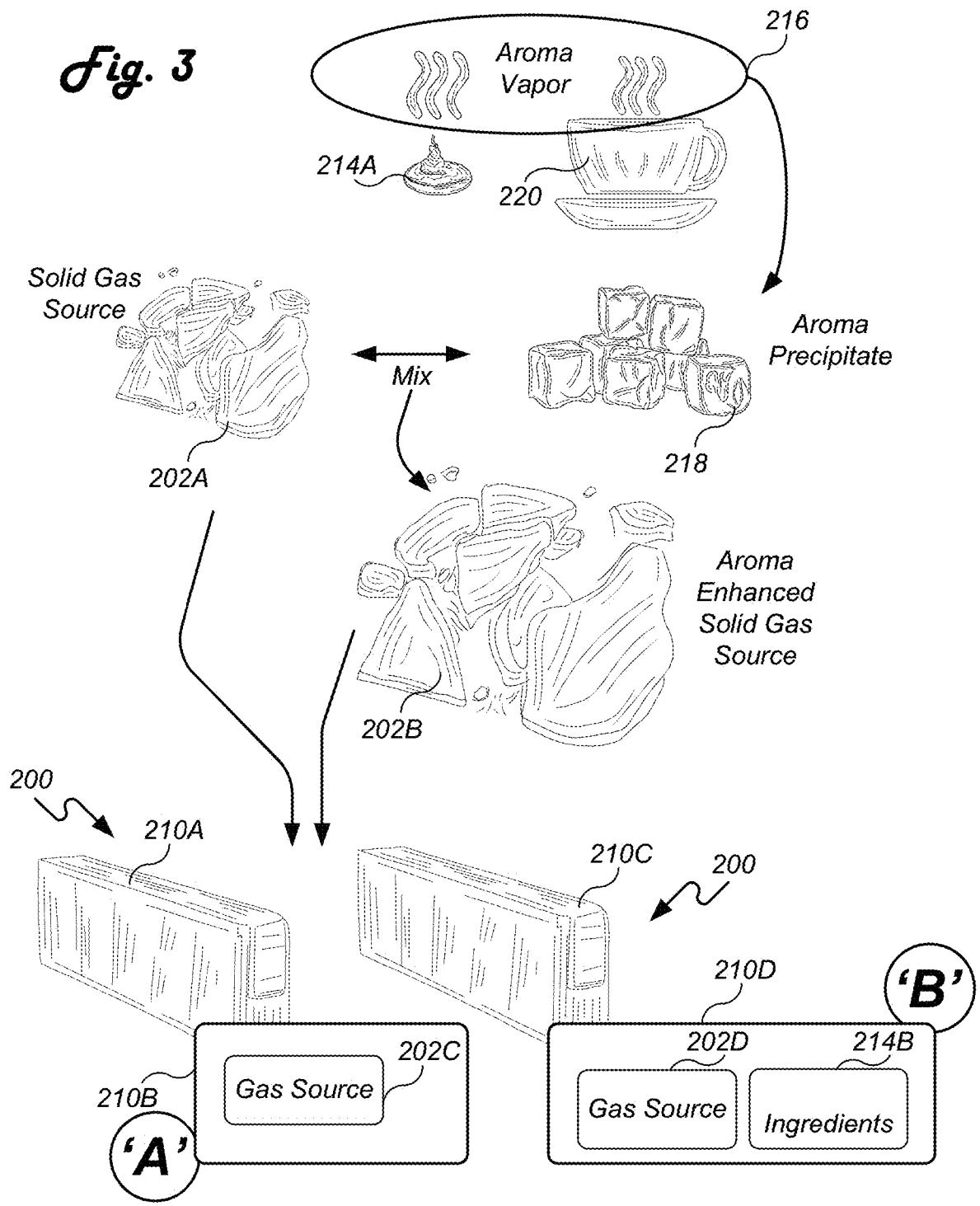

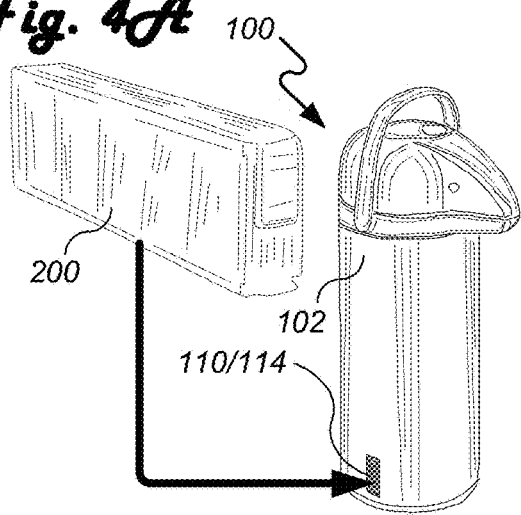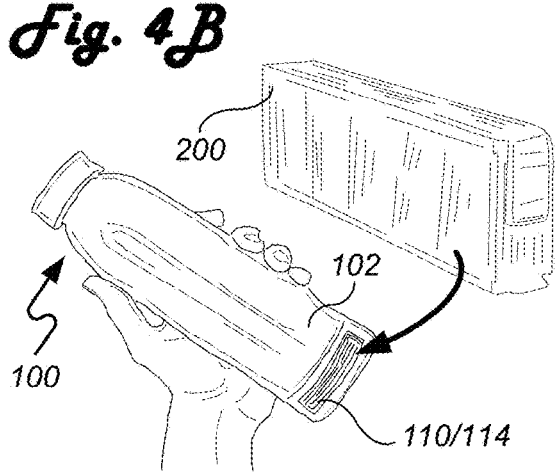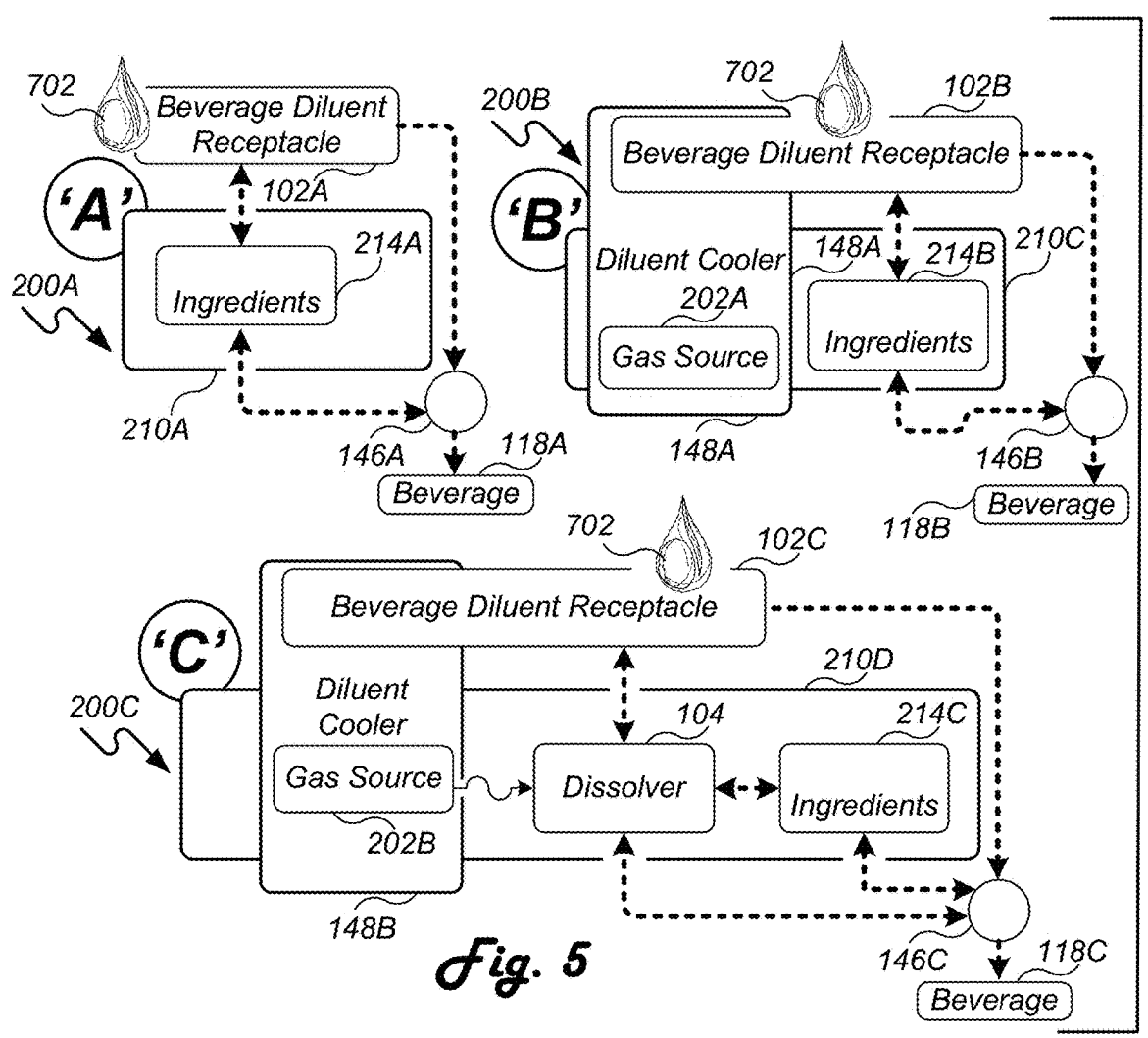

BEVERAGE MAKING MACHINE

CROSS REFERENCE TO RELATED APPLICATION

This application is being filed as a continuation application of U.S. patent application Ser. No. 13/913,211, filed Jun. 7, 2013, now allowed, the entire disclosure of which is incorporated by reference in its entirety.

TRADEMARKS

COCA-COLA® is a registered trademark of The Coca-Cola Company, Atlanta, Ga., U.S.A. Other names used herein may be registered trademarks, trademarks or product names of The Coca-Cola Company or other companies.

TECHNICAL FIELD OF THE INVENTION

This invention relates to a beverage making machine, and particular to the beverage making machine comprising a first beverage making cartridge comprising at least one of a gas source portion, the gas source portion contains a solid gas source that through sublimation emits a gas, and a gas storage tank arranged to store the gas emitted from the solid gas source. The beverage making machine further comprising a second beverage making cartridge comprising at least one of a micro ingredient, a beverage diluent receptacle for receiving a beverage diluent liquid, a dissolver dissolves portion of the gas, from the gas storage tank, into the beverage diluent liquid, and a dispenser selectively dispenses a predefined ratio of at least one of the micro ingredient and the beverage diluent liquid, to form a beverage.

BACKGROUND OF THE INVENTION

Before our invention the handling of high pressure gas for the purpose of sparkling beverage making needed to be done using a heavy walled pressure vessel. In this regard, making a beverage typically involved infusing a gas into water to create carbonated water and then mixing the gas infused water with ingredients to form the beverage. The ingredient and water parts of the beverage were relatively easy to handle, ship, and mix on site or in a factory. The gas on the other hand, had to be delivered to the factory in high pressure vessels by special purpose vehicles and/or produced onsite in the factory. In addition, when smaller quantities of the gas were needed to be delivered to an outlet, such as a quick serve restaurant, it was typically done by way of beverage company truck delivery, not a regular postal delivery service.

This model, with the costs of logistics, and need for heavy wall high pressure vessel filling, handling, and recycling can serve to abate and make impractical gas delivery models for low volume home or office dispenser locations. In addition, there are many postal services that ban or restrict the shipment of high pressure gasses. As such a consumer who might order supplies for a home or office dispenser might be able to receive by postal courier the ingredients but not the high pressure gas.

Another shortcoming, is in the beverage quality of packaged or pod based tea, coffee, and other beverage products reconstituted from concentrates, powders, or syrups. In this regard, by the very nature of how the ingredients are manufactured for package or pod based beverage systems, the aroma is lost or added to the ingredients where it then typically degrades before the consumer can enjoy. Aroma is a big consumer attribute in many beverages such as teas, coffees, and citrus beverages to name a few; however packaged and pod based system lack the ability to produce aroma rich beverages. As such, making an authentic tea or fresh brewed coffee, or fresh squeezed citrus beverage from package or pod based system prior to our invention was difficult and often relied on or employed unsuccessful techniques.

Another shortcoming, prior to our invention, is the ability to make beverage making systems that deliver an array of high quality sparking (gas infused) and still (non-gas infused) beverages in a small compact form factor and equipment footprint, as to make a system well suited for size constrained locations and countertops. Larger systems that require lots of space for ingredients, tanks, drain tubes, ice making, and other items are too large for many locations and thus unsuited for many new market opportunities.

Another shortcoming, prior to our invention, was that there were few options to turn bulk water dispensers into high quality flavored and customized beverages. Such bulk water type dispensers can typically include thermoses, sport type coolers, water coolers, and bulk water tank type facilities or stations often found in developing parts of the world. With regards to water in the developing world, too often these consumers don't have the opportunity to experience safe clean high quality flavored beverages. As such, water treatment techniques combined with beverage making technology, in simple easy to use forms, is in demand and very much needed around the world.

There is a long felt need for systems and methods to delivery or otherwise be able to create high pressure gas for beverage making in consumer's homes, office, and other outlets. There is a particular need for being able to deliver gas supplies by the same methods as ingredient supplies and preferably that is by way of common postal delivery services. There is also a long felt need to improve packaged and pod based beverage quality through the use of aroma enhancement, and improved gas infusion techniques. Furthermore, there is great need for small footprint high quality beverage making systems that are adapted for use in size constrained locations at home, office, and elsewhere. Additionally, there is a long felt need for new ways to deliver quality beverage products in areas of bulk water dispensing including in areas of the world where enjoyment of refreshing beverages is not common place. There is a need to overcome these shortcomings mentioned above as well as to overcome other shortcomings. All of which gives rise to the present invention.#1

SUMMARY OF THE INVENTION

The shortcomings of the prior art are overcome and additional advantages are provided through the provision of a beverage making machine comprising a first beverage making cartridge comprising at least one of a gas source portion, the gas source portion contains a solid gas source that through sublimation emits a gas, and a gas storage tank arranged to store the gas emitted from the solid gas source. The beverage making machine further comprising a second beverage making cartridge comprising at least one of a micro ingredient, a beverage diluent receptacle for receiving a beverage diluent liquid, a dissolver dissolves a portion of the gas, from the gas storage tank, into the beverage diluent liquid, and a dispenser selectively dispenses a predefined ratio of at least one of the micro ingredient and the beverage diluent liquid, to form a beverage.

Additional shortcomings of the prior art are overcome and additional advantages are provided through the provision of a beverage making machine comprising at least one of a beverage making cartridge comprising at least one of a micro ingredient portion and a gas source portion, the micro ingredient portion contains at least one of a micro ingredient, the gas source portion contains a solid gas source that through sublimation emits a gas, and a gas storage tank arranged to store the gas. The beverage making machine further comprising a beverage diluent receptacle for receiving a beverage diluent liquid, a dissolver dissolves a portion of the gas, from the gas storage tank, into the beverage diluent liquid, and a dispenser selectively dispenses a predefined ratio of the micro ingredient and the beverage diluent liquid to form a beverage.

Additional shortcomings of the prior art are overcome and additional advantages are provided through the provision of a beverage making machine comprising at least one of a beverage cartridge comprising at least one of a micro ingredient portion, a gas source portion, and a gas dissolver portion, the gas source portion contains a solid gas source that through sublimation emits a gas, and a gas storage tank arranged to store the gas. The beverage making machine further comprising a beverage diluent receptacle for routing at least a portion of a beverage diluent liquid to the dissolver portion, The dissolver dissolves at least a portion of the gas, from the gas storage tank, into the beverage diluent liquid, and a dispenser selectively dispenses a predefined ratio of at least one of the micro ingredient and the beverage diluent liquid to form a beverage.

Additional shortcomings of the prior art are overcome and additional advantages are provided through the provision of a beverage making machine comprising a beverage making cartridge comprising at least one of a micro ingredient portion, a gas source portion, and a gas dissolver portion, the micro ingredient portion contains at least one of a micro ingredient, the gas source portion contains a solid gas source that through sublimation emits a gas, and a gas storage tank arranged to store the gas. The beverage making machine further comprising a beverage diluent receptacle for routing at least a portion of a beverage diluent liquid to the dissolver portion, The dissolver dissolves at least a portion of the gas, from the gas storage tank, into the beverage diluent liquid, the gas source portion is arranged to thermally couple the gas source to the beverage diluent receptacle cooling the beverage diluent liquid, and a dispenser selectively dispenses a predefined ratio of the micro ingredient and the beverage diluent liquid to form a beverage.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 1A-1B illustrate examples of a beverage making cartridge comprising a solid gas source;

FIG. 3 illustrates examples of a method of making a beverage making cartridge comprising a solid gas source or an aroma enhanced solid gas source;

FIGS. 4A-B illustrates one example of a beverage diluent receptacle arranged to accept a beverage making cartridge;

FIG. 5 illustrates examples of functional block diagrams of various beverage making cartridges;

Figure 2A:
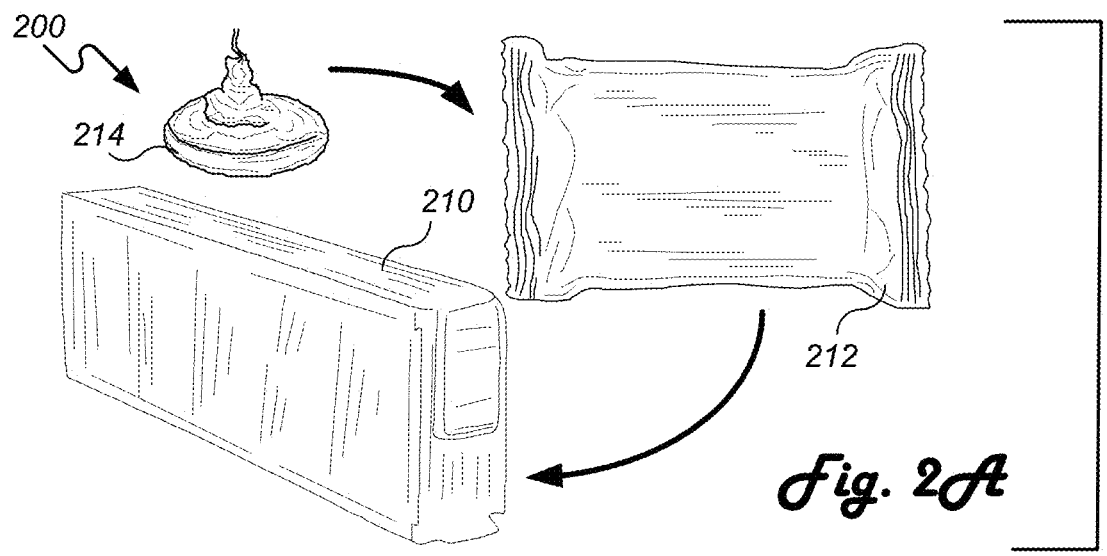
FIGS. 2A-2B illustrate examples of a beverage making cartridge comprising at least one of a micro ingredient.

The detailed description explains the preferred embodiments of the invention, together with advantages and features, by way of example with reference to the drawings.

DETAILED DESCRIPTION OF THE INVENTION

Use of the term "consumables", in the present invention, is intended to mean the supplies which are consumed in forming a beverage. In general, consumables can include, for example and not a limitation the beverage diluent liquid, the beverage diluent filter 222, which filters the beverage diluent liquid, a solid gas source 202 or an aroma enhanced gas source 202, which emits a gas, and/or a micro ingredient 214, which is mixed with the beverage diluent liquid to form a beverage in vessel 118, and/or other types and kinds of consumables, as may be required and/or desired in a particular embodiment.

Turning now to the drawings in greater detail, it will be seen that in FIGS. 1A-1B there is illustrated one example of a beverage making cartridge 200 comprising a solid gas 202. Referring to FIG. 1A, in an exemplary embodiment, the solid gas 202 can be food grade and in solid form, including in ice form. For example and not a limitation, the solid gas 202 can be frozen carbon dioxide ($CO_2$), which can also be referred to as dry-ice, or other gas in solid form, as may be required and/or desired in a particular embodiment. Dry-ice has a freezing point in the range of −109 Fahrenheit (F), as such, in ambient conditions, standard atmospheric pressures, and temperatures, the dry-ice will sublimate, transitioning from a frozen form directly to a gas form; no liquid state.

Use of the term "emitted gas" or "emitted gas 704" or "gas 704" or "gas source" or "solid gas source", in the present invention, is intended to mean preferably carbon dioxide ($CO_2$), nitrogen, or oxygen; however other gas types and blends can be utilized with the present invention. In general, "solid gas source" is a gas in frozen form preferably dry-ice also referred to as frozen carbon dioxide; however other gases in frozen or other solid states can be used, as may be required and/or desired in a particular embodiment. A sublimating gas, that is one that transitions from solid ice state to gas state, skipping the liquid state is preferred.

Typically solid gas, in ice form, can have an extremely cold surface temperature. The low temperature can make it difficult for a consumer to handle. As such, the solid gas 202 can be packaged in a solid gas package 206 and further collocated within a beverage making cartridge enclosure 210. As the solid gas 202 sublimates, emitting gas, within the solid gas package 206, gas pressure will increase in a sealed confined space. As such, without allowing the emitted gas 704, from the gas source 202, to vent, from the confines of the solid gas package 206, the solid gas package 206 would expand and then likely rupture. To prevent the rupture, a one-way degassing valve 204 can be arranged, within the solid gas package 206, to vent the emitted gas 704 from the gas source 202.

In an exemplary embodiment, a one-way degassing valve 204 can be secured to a solid gas package 206, which contains a solid gas source 202. Such a vent can be a mechanical pressure valve, or one-way valve manufactured, for example and not a limitation, by PLITEK, FRES-CO SYSTEMS, or other types and kinds of one-way degassing valves, as may be required and/or desired in a particular embodiment.

For convenience, as well as ease of use by a consumer, the solid gas source 202 packaged in a solid gas package 206 having a one-way degassing valve 204, for venting the emitted gas 704 from at least the solid gas package 206 can be further secured in a beverage making cartridge enclosure 210. In addition, the solid gas package 206 also provides the environment in which to keep the solid gas source 202 clean, free from contaminates, and sterile. All desirable traits for applications in making a beverage with the sublimated gas. The beverage making cartridge 200 can be arranged to insert into and interlock with a gas storage system 106, better illustrated in at least FIG. 15A. The gas generation and storage system 106 further comprising a gas storage tank 108 and a gas transfer system 128 and 136, which can comprise pumps, valves, and/or regulators, interconnect in a manner to transfer the emitted gas 704 from the solid gas source 202 to the gas storage tank 108 and from the gas storage tank to other parts of the beverage making machine.

A gas vent 140, which is part of the gas storage tank 108, allows pressure from the gas source to increase, reaching a selectable level of 3 to 11 atmospheres, and then venting the excess gas pressure. The pressure level being determined based in part on the safety limitations of the selected gas storage tank and the gas pressures needed to make the desired beverages.

Use of the term "atmospheres" or "atmospheric pressure", in the present invention, is intended to mean the pressure exerted by the weight of the atmosphere, which at sea level has a mean value of ~101,325 Pascal or 14.69 pounds per square inch (psi). In general, the term describes pressure. In an exemplary embodiment, a gas storage tank, such as gas storage tank 108 reaching pressure levels of 3 to 11 atmospheres would correspond to ~303,975 to ~911,925 Pascal or ~44.08 to ~161.59 psi. It easy to see from this example that packaging gas in a gas state in a small vessel can create large enough pressures to be very dangerous to ship and have a consumer handle safely. As such, in an exemplary embodiment of the present invention, a solid gas source 202, such as frozen $CO_2$ (dry-ice) is at least one way in which to transport gas safely to a point of use and then allow sublimation to convert the solid to a gas, which can be safely stored at higher pressures, in a gas storage tank 108, for use by the beverage making machine in making of beverages.

Use of the term "volumes", in the present invention, is intended to mean the volume of gas which is dissolved into one volume of liquid. In general, if it is desired to dissolve in one liter of liquid 3.8 liters of gas then the gas infused liquid could be characterized as a liquid at 3.8 volumes of gas or just 3.8 volumes. For carbonated, also referred to as sparkling beverages, carbonation levels of the gas infused diluent liquid can range up to 5 volumes, with the preferred range for most beverages ranging between 2 to 4.2 volumes.

Use of the term "beverage diluent liquid", in the present invention, is intended to mean a liquid, such as water, or other liquid that can be mixed with other ingredients to form a beverage. In general, the beverage diluent liquid is mixed with micro ingredients to form a beverage. Optionally, the liquid can have gas dissolved into the liquid to form a gas infused beverage.

Use of the term "micro ingredient', in the present invention, is intended to mean a concentrated syrup, powder, flavoring, coloring, preservative, concentrate mixture, non-caloric sweetener also referred to as non-nutritive sweetener, caloric sweetener also referred to as a sweetener, nutraceuticals, sweetener enhancers, tea, coffee, a combination thereof, or other types and kinds of substances that can be mixed with a beverage diluent liquid to form a beverage. In general, micro ingredients are concentrated forms of ingredients that can be diluted with a beverage diluent liquid to form a beverage.

Use of the term "point of use", in the present invention, is intended to mean where the beverage making machine 100, beverage making machine cartridges 200 including supplies, and/or the types and kinds of supplies are intended to be used. Examples of points of use can include, but not be limited to, a consumer's home, an office, store, restaurant, quick serve restaurant, and/or other points of use where the beverage making machine 100, the beverage making machine cartridges 200 including supplies or other types and kinds of supplies are intended to be used, and as may be required and/or desired in a particular embodiment. In addition, points of use can include stores, warehouses, and other places where beverage making cartridges 200 including supplies may be made available for purchase by consumers who then take the supplies to the ultimate point of use where the supplies can be utilized in connection with a beverage making machine 100.

In an exemplary embodiment, for example and not a limitation, the solid gas packaging material 206 can provide thermal insulation to prevent the solid gas 202, in the case where the solid gas is ice, from sublimating too quickly. In this regard, in an exemplary embodiment of the present invention, for example and not a limitation, the beverage making cartridge 200 can be shipped to a point of use location, such as to a consumer, made available in a store, or logistically provided in other ways, as may be required and desired in a particular embodiment. During the period of time the beverage making cartridge 200 is not placed in a beverage making machine 100, where the emitted gas 704 can be captured and stored in gas storage tank 108, the emitted gas 704 is vented to the atmosphere and the ice volume reduces. The larger the differential between the surface temperature of the solid gas source 202 and the atmospheric temperature the quicker the solid gas source 202 will sublimate. To slow sublimation, especially while transporting the solid gas source 202, to the point of use, a suitable insulating material can be utilized as the solid gas packaging material 206. This in combination with providing a solid gas source that is larger than necessary, so that some sublimation on the way to the point of use leaves a sufficient volume of the solid gas source left to pressurize the gas storage tank, will better insure that a full gas storage tank pressurization can be obtained when the solid gas source is inserted into the beverage making machine and allowed to sublimate, pressurizing the gas storage tank 108. Should too much gas be emitted, then the gas vent 140 would vent the excess gas allowing the gas storage tank 108 to reach a full and safe pressure level.

Referring to FIG. 1B there is illustrated one example of a beverage making cartridge 200 comprising a solid gas 202. In this exemplary embodiment, the solid gas 202, which can be frozen CO2 can be placed directly into the beverage making cartridge enclosure 210. In such an embodiment, the beverage making cartridge can further comprise a one-way degassing valve 204, to vent the emitted gas 704 from the gas source 202. In this embodiment, separate solid gas package 206 material is not utilized. Instead, the beverage making cartridges 200 provides the thermal insulation and barrier properties to prevent the solid gas 202, in the case where the solid gas is ice, from sublimating too quickly in a similar manner as the solid gas package 206. In addition, the beverage making cartridge enclosure 210 also provides the environment in which the solid gas source 202 stays clean, free from contaminates, and sterile; desirable attributes for applications in making a beverage with the sublimated gas. The beverage making cartridge 200 can be arranged to insert into and interlock with a gas generation and storage system 106, as better illustrated in at least FIG. 15A and as previously disclosed.

Use of the term "barrier properties" or "packaging material barrier properties", in the present invention, is intended to mean, in the context of food packaging materials, a defined barrier against permeation of gases, moisture, liquids, and flavor. In general, barrier properties can be considered characteristics of the packaging material. Some of the many packaging material characteristics can include, without limitation, the ability to insulate, and prevent certain gases or certain wavelengths of light from passing through the barrier, physical strength of the material, and/or other types and kinds of barrier properties.

An advantage, in the present invention, of using a solid gas source that sublimates versus other gas sources, that require wetting to activate or require a carrier material which is not converted to gas, is that the sublimating gas source has little, if any, microbiological contamination concerns. In this regard, the sublimating gas source of the present invention can be packaged in a sterile environment and remains there emitting gas through a sterile one-way vent. In addition, for solid gas sources that exhibit a cold surface temperatures, such cold surface temperature can prevent microbiological growth. As such, with no liquid state, cold temperatures, and no contaminates entering the environment, in which the sublimating solid gas source is secured, microbiological contamination is of little concern.

On the other hand, gas sources that required wetting can be contaminated and sit in a wet moist environment—a petri dish—where microbiological growth can take over and produce molds, yeasts, contribute off flavors and odors to the beverage, and act as a food source for microorganisms including pathogens. This contamination cannot only impair the food safety of the gas source but the emitted gas 704 as well. As such, gas sources that require wetting or some other form of activation or regeneration can be easily contaminated and compromised. This contamination can be transferred to the food products made with these types of gas sources, which in turn can make consumers very sick and impair beverage safety and/or quality.

In an exemplary embodiment, a beverage making cartridge 200 for use by a beverage making machine 100 in forming a beverage, the beverage making cartridge 200 can comprise a beverage making cartridge enclosure 210 which can further comprise a gas source portion 228 (illustrated in at least FIG. 14), the gas source portion 228 further comprising a solid gas source 202 that through sublimation emits a gas 704. A one-way vent 204 can be arranged in the beverage making cartridge enclosure 210 to vent the gas 704 emitted from the solid gas source 202, such that it can be captured and stored in a gas storage tank 108 (illustrated in at least 15). In this regard, the gas 704 from the gas storage tank 108 can be dissolved in a beverage diluent liquid 702 and mixed with at least one of a micro ingredient 214 to form the beverage.

In another exemplary embodiment, an insulation material 206 seals the solid gas source 202 in a sterile environment and moderates the rate of sublimation of the solid gas source 202.

In another exemplary embodiment, a dispenser 120 (illustrated in at least FIGS. 19-23) can be attached to the beverage making cartridge enclosure 210 and arranged to dispense the beverage.

In another exemplary embodiment, a micro ingredient selector 150 (illustrated in at least FIG. 23) can be provided for selecting which, if any, of the micro ingredient 214 are to be mixed with the beverage diluent liquid 702 to form the beverage.

In another exemplary embodiment, the beverage making cartridge 200 can further comprise at least one of a fluid handler 144 (illustrated in at least FIGS. 19-23) for ratio mixing the gas infused beverage diluent liquid 702 with the beverage diluent liquid 702 which is absent of the gas 704 to reduce the volumes of the gas in the beverage.

In another exemplary embodiment, a beverage making cartridge 200 for use by a beverage making machine 100 in forming a beverage, the beverage making cartridge 200 comprising a beverage making cartridge enclosure 210 which can further comprise a gas source portion 228 and a micro ingredient portion 230, the gas source portion 228 further comprising a solid gas source 202 that through sublimation emits a gas 704, the micro ingredient portion 230 can further comprise a micro ingredient 214. A one-way vent 204 arranged in the beverage making cartridge enclosure 210 to vent the gas 704 emitted from the solid gas source 202, such that it can be captured and stored in a gas storage tank 108. In this regard, the gas 704 from the gas storage tank 108 can be dissolved into the beverage diluent liquid and mixed with at least one of the micro ingredient to form the beverage.

In an exemplary embodiment, a beverage making cartridge 200 for use by a beverage making machine 100 in forming a beverage, the beverage making cartridge 200 comprising a micro ingredient portion 230, the micro ingredient portion 230 can further comprise a micro ingredient 214. A dispenser 120 can be attached to the beverage making cartridge 200, the beverage making cartridge 200 can be arranged to receive a beverage diluent liquid 702 form a beverage diluent receptacle 102, the dispenser 120 dispenses the beverage diluent liquid 702 and the micro ingredient 214 to form the beverage.

Figure 2B:
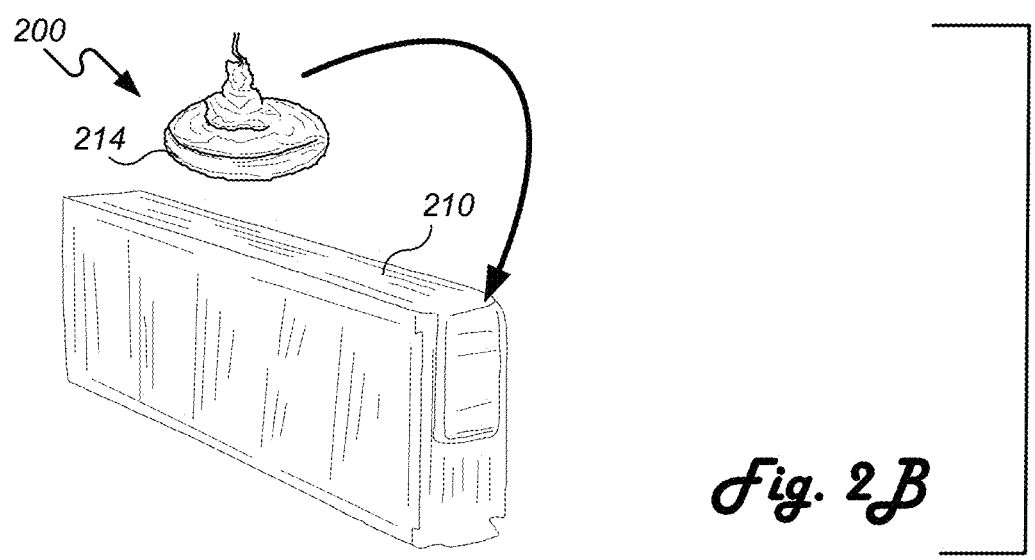

Referring to FIGS. 2A-B there is illustrated examples of a beverage making cartridge 200 comprising at least one of a micro ingredient 214. Referring to FIG. 2A, in an exemplary embodiment, a beverage making cartridge can comprise at least one micro ingredient 214 packaged in a micro ingredient package 212 and further packaged into a beverage making cartridge enclosure 210. Such beverage making cartridges 200 comprising micro ingredients can be interlocked into a beverage making machine 100 to provide a matrix of ingredients, which can be combined to form a variety of beverages. In at least FIG. 7 there is illustrated an exemplary embodiment of a beverage making machine 100 comprising a plurality of beverage making cartridges 200A-C which can be inserted into or otherwise arranged in beverage making cartridge receptacles 110 for gas and 114A-C for micro ingredients.

Once the beverage making cartridges 200A-C have been arranged in the beverage making cartridge receptacles 110 for gas and 114A-C for micro ingredients, a variety of beverages (gas infused, non-gas infused, and/or otherwise) can be made. In this regard, a beverage diluent 702 (infused with gas or not, or in some combination, and/or otherwise) can be mixed with the plurality of micro ingredients 214 to form a beverage. The beverage can be dispensed at the initiation of a consumer, manually, at the beverage making machine 100, by way of wireless device 602, by global network 604 communication with computer control 122, and/or by way of other methods, as may be required and/or desired in a particular embodiment.

For disclosure purposes the shaded blocks in at least FIGS. 7-8 and 15A-16 denote a changeable supply, ingredient, or functional device (such as filer 222). In an exemplary embodiment, for example and not a limitation, such a changeable supply can preferably be a beverage making cartridge that can be interchanged to resupply the beverage making machine with solid gas sources, micro ingredients, filters, and/or other types and kinds of changeable supplies, as may be required and/or desired in a particular embodiment.

In an exemplary embodiment, the micro ingredient package 212 also provides an environment in which the micro ingredient 214 stays clean, free from contaminates, suitable for food contact, and sterile. In addition, the micro ingredient package 212 can exhibit barrier properties which promote extended shelf life for the micro ingredient 214 inside. Such barrier properties refer to the micro ingredient packaging 212 ability, from a materials perspective to, for example and not a limitation, block ingredient damaging light, to block ingress of oxygen or other undesirable gasses that can harm flavor, color, or have other undesirable impacts on the ingredients, to block egress of gases (such as aroma and other gases) through the packaging material, to block ingress of gasses (such as oxygen and/or other gases) and other barrier properties, as may be required and/or desired in a particular embodiment.

In an exemplary embodiment, the micro ingredient 214 can include, for example and not a limitation, syrups, concentrates, powders, flavors, colors, nutraceuticals, vitamins, healthy or wellbeing ingredients, sweeteners (caloric or non-caloric), beverage modifiers, beverage enhancers (including sweetness enhancement, aroma enhancements, and/or other types and kinds of beverage enhancers) and/or other types and kinds of micro ingredient 214, as may be required and/or desired in a particular embodiment.

Referring to FIG. 2B there is illustrated one example of a beverage making cartridge 200 comprising at least one of a micro ingredient 214 packaged in a beverage making enclosure 210. In this exemplary embodiment, the micro ingredient 214 can be placed directly into the beverage making cartridge enclosure 210. As such, a separate micro ingredient package 212 is not utilized. Instead, the beverage making cartridge enclosure 210 provides the thermal insulation and barrier properties to meet the shelf life requirements for the micro ingredient 214, allowing the micro ingredient 214 to be utilized as a beverage making ingredient, as disclosed herein. The beverage making cartridge 200 comprising the micro ingredient 214 can be arranged to insert into and interlock with the beverage making machine receptacle 114, wherein the beverage making machine 100 can use the micro ingredient 214 in the making of beverages.

Figure 26A:
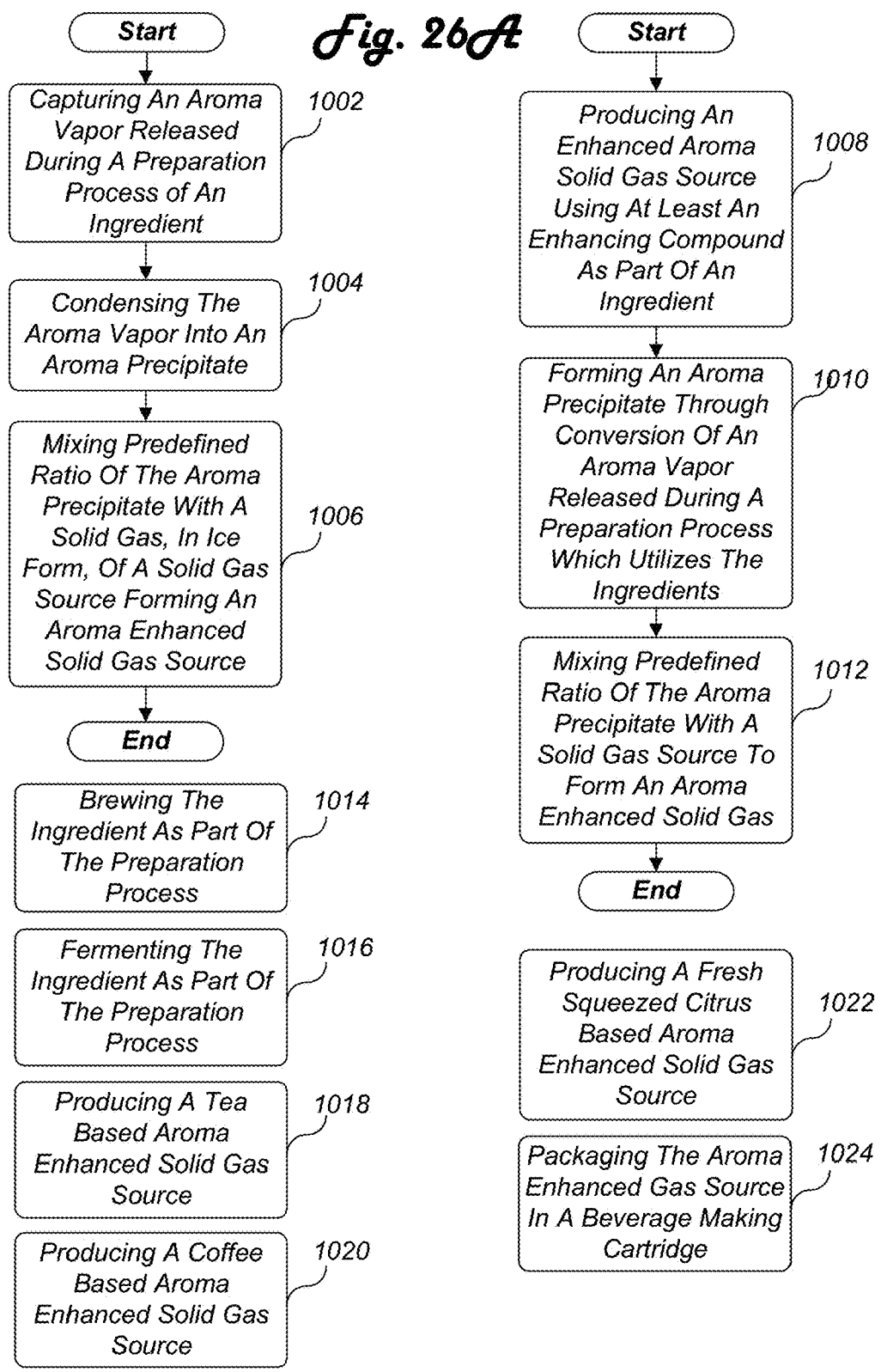
FIGS. 26A-B illustrates examples of methods of producing aroma enhanced solid gas for use in a beverage making machine to make a beverage.
Figure 26B:
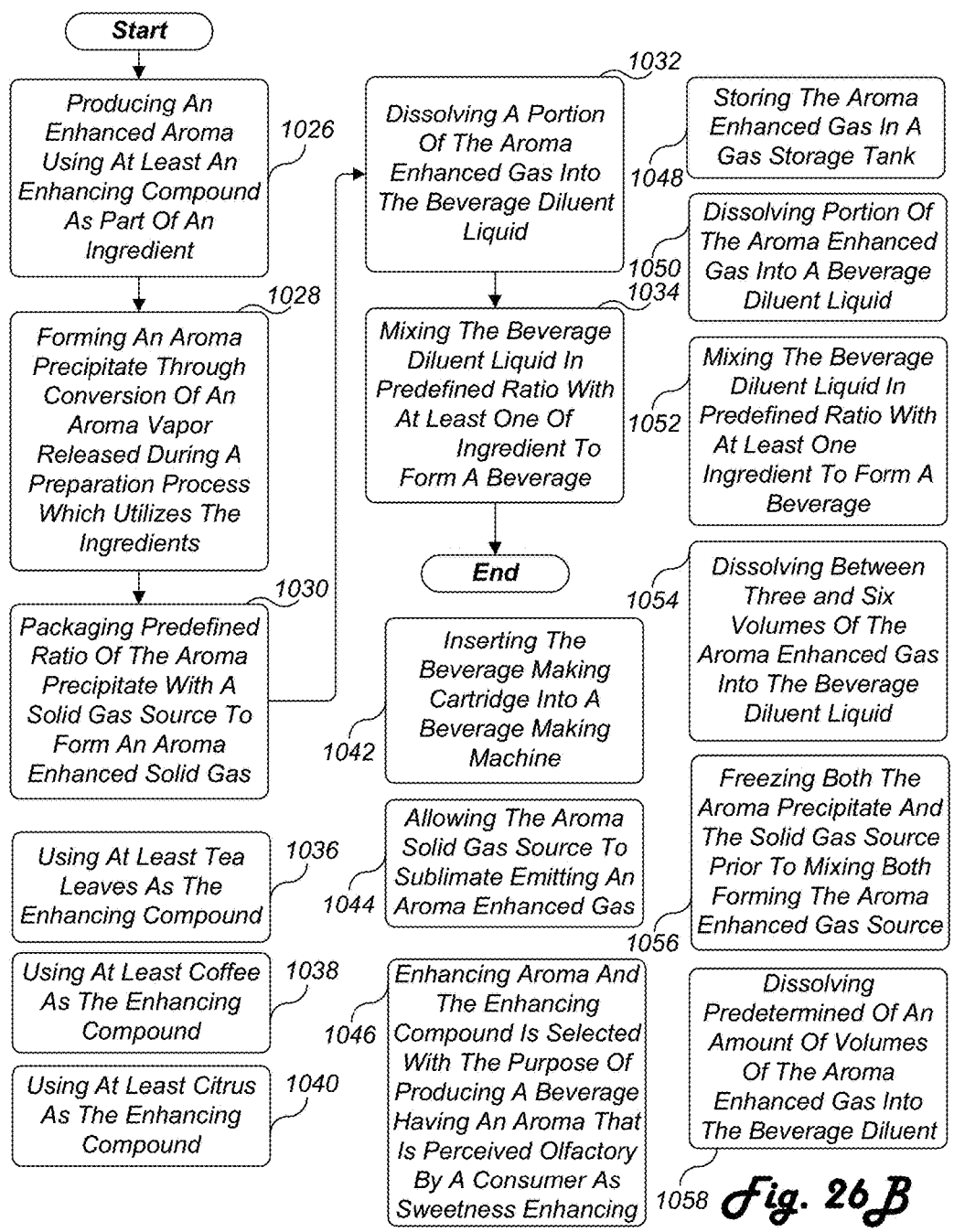

Referring to FIG. 3, with reference to at least FIGS. 26A-B, there is illustrated a method of making a beverage making cartridge comprising a solid gas source 202A or an aroma enhanced solid gas source 202B with aroma precipitate 218 added in a predefined ratio to the solid gas source 202A.

For purposes of disclosure a solid gas source 202 and an aroma enhanced solid gas source can both be referred to as a solid gas source 202. In this regard, the aroma enhanced solid gas source has had some aroma precipitate 218 added to the solid gas source to form the aroma enhanced solid gas source. In an exemplary embodiment, solid gas source 202 and aroma precipitate 218 are both in frozen state and can be mixed to form a solid gas source having aroma enhancement. The solid gas source material and the aroma precipitate can be mixed in a suitable ratio such that the gas created through sublimation can be stored in the gas storage tank 108 and contain the desired ratio of gas molecules to aroma molecules so that the combined gas plus aroma can be dissolved into the beverage diluent liquid and add just the right aroma benefit to the beverage. In this regard, the final beverage comprising the aroma enhanced gas, when dispensed, will release the desired amount of aroma to be pleasing to the consumer's olfactory senses; not too weak or too strong, just right.

Illustrated in FIG. 3, is an exemplary embodiment of a preparation method for creating an aroma enhance gas source that can take advantage of preparation processing techniques such as brewing, fermentation, or other preparation process, as may be required and/or desired in a particular embodiment, which can be used to cause aroma vapor 216 to be produced or otherwise released from an ingredient 214A. Such aroma vapor 216, for example and not a limitation, could be tea aroma when tea leaves, as an ingredient, are brewed or coffee aroma when coffee, as an ingredient, is brewed, fresh squeezed citrus aroma when being squeezed or citrus is processed to extract aroma, or other aroma when brewing, fermenting, squeezing, or other preparation process is used with other ingredients.

Prior to the present invention it has been difficult to capture, collect, or otherwise package this aroma vapor and later use the captured aroma to enhance a beverage. One advantage of the present invention is to be able to capture and condense aroma vapor 216 from ingredients 214A and brewed ingredients 220 (like coffee and tea) into an aroma precipitate 218. Such an aroma precipitate 218 can be in frozen ice form or other form and can be aroma captured from brewing, fermenting, squeezing, or other preparation process of tea, coffee, citrus, sweetness enhancers, flavors, and/or other ingredients, precipitate states, or preparation processes, as may be required and/or desired in a particular embodiment.

Another advantage, in the present invention, is that aroma liquid or vapor added to micro ingredient degrades over time, such that the benefit of the aroma at the time of use may be negated or significantly impaired simply due to the natural degradation of the aroma when mixed with the ingredient. This has for a long time prevented delivering to the consumer real authentic tasting tea, or fresh brewed coffee smell, or freshly squeezed citrus aroma simply because aroma mixed with ingredients degrades. The present invention overcomes this limitation by creating a frozen precipitate 218 and mixing with the frozen solid gas source. In this regard, the aroma is preserved in frozen form and returned to gas vapor form, stored in a gas storage tank where the aroma does not degrade. As such, the true quality of the aroma can be delivered by infusion into the beverage, at the time the beverage is made, making delivering to the consumer in concentrated or syrup form, with aroma enhance gas, a true authentic tea experience, a real fresh brewed coffee experience, a fresh squeezed citrus experience, and/or delivering to the consumer other superior beverage making and enjoying experiences.

In this regard, in an exemplary embodiment, for example and not a limitation, the aroma vapor 216 can be from brewed ingredients 220 like coffee and tea or an ingredient 214A, or other aroma source. The aroma can be condensed into a precipitate 218 form. Preferably, the form of the aroma precipitate 218 is frozen ice so that it can be mixed in a predefined ratio with a solid gas source 202A, such as frozen $CO_2$ (dry-ice) or other frozen gas. The ratio-mix combination now forms an aroma enhanced solid gas source 202B, which can be packaged in a solid gas source package 206, as illustrated in at least FIG. 1A or packaged directly into a beverage making cartridge 200, as illustrated in at least FIG. 1B.

FIG. 3 further illustrates, for example and not a limitation, how the solid gas source 202A or the aroma enhanced solid gas source 202B can be packaged in a beverage making cartridge enclosure 210A-B individually, as solid gas source 202C, illustrated as option 'A' or as solid gas source 202D collocated with at least one of a micro ingredient 214B, in a beverage making cartridge enclosure 210C-D, illustrated as option 'B'. Other Figures, such as at least FIG. 5 illustrate how the solid gas source can be collocated with other functional elements, such as dissolver 104 or in at least FIGS. 19-23 with a dispenser 120.

Referring to FIG. 4A there is illustrated a beverage diluent receptacle 102 arranged to accept a beverage making cartridge 200. In an exemplary embodiment, a beverage diluent receptacle 102 can be a thermos filled with bulk water, or other type or kind of beverage diluent receptacle, as may be required and/or desired in a particular embodiment. The beverage diluent receptacle 102 is arranged to be interoperable with a beverage cartridge receptacle 110/114; 110 for gas only, 114 for micro ingredients or combinations of gas plus micro ingredients.

The beverage cartridge receptacle 110/114 is configured to allow a beverage making cartridge 200 to be inserted. In operation, the beverage making cartridge can comprise a solid gas source 202, micro ingredient 214, and other functionality such as, for example and not a limitation, a dissolver 104, a dispenser 120, a diluent filter receptacle 116/filter 222, a thermal coupling to the gas source to form a diluent cooler 148, or other functionality, as may be required and/or desired in a particular embodiment. Each of these features is better illustrated in at least FIGS. 5, and 19-23. Once installed the beverage diluent liquid can be mixed with the micro ingredient 214 to form a beverage. If a solid gas source is present, preferably an aroma enhanced solid gas source, the emitted gas 704 can be dissolved into the beverage diluent liquid to form an aroma enhanced beverage.

Use of the term "bulk water dispenser", in the present invention, is intended to mean a beverage making machine 100 having a beverage diluent receptacle 102, which hold a supply of beverage diluent liquid for use in beverage making. In general, these types beverage making machines 100 can be portable thermos, as illustrated in at least FIG. 4A, personal drinking vessel, as illustrated in at least FIG. 4B, a refrigerated appliances 402 having a beverage diluent water supply, as is illustrated in at least FIG. 17, a sports cooler or community water supply bucket type beverage making machine 100 as is illustrated in at least FIG. 24, a water cooler type beverage making machine 100, as is illustrated in at least FIG. 25, or other types and kinds of bulk water dispensers, as may be required and/or desired in a particular embodiment.

For example and not a limitation, if the beverage diluent liquid 702 is hot, the micro ingredient is coffee, and the solid gas source is coffee based aroma then a refreshing hot coffee beverage with fresh brewed coffee aroma can be made and dispensed to the consumer. In another example, if the beverage diluent liquid 102 is hot, the micro ingredient is tea, and the solid gas source is tea based aroma then a refreshing hot tea beverage with fresh brewed tea aroma can be made and dispensed to the consumer. In another example, if the beverage diluent liquid 702 is cold, the micro ingredient is juice, and the solid gas source is fresh squeezed citrus aroma enhanced then a refreshing cold juice beverage with fresh squeezed aroma can be made and dispensed to the consumer.

Figure 7:
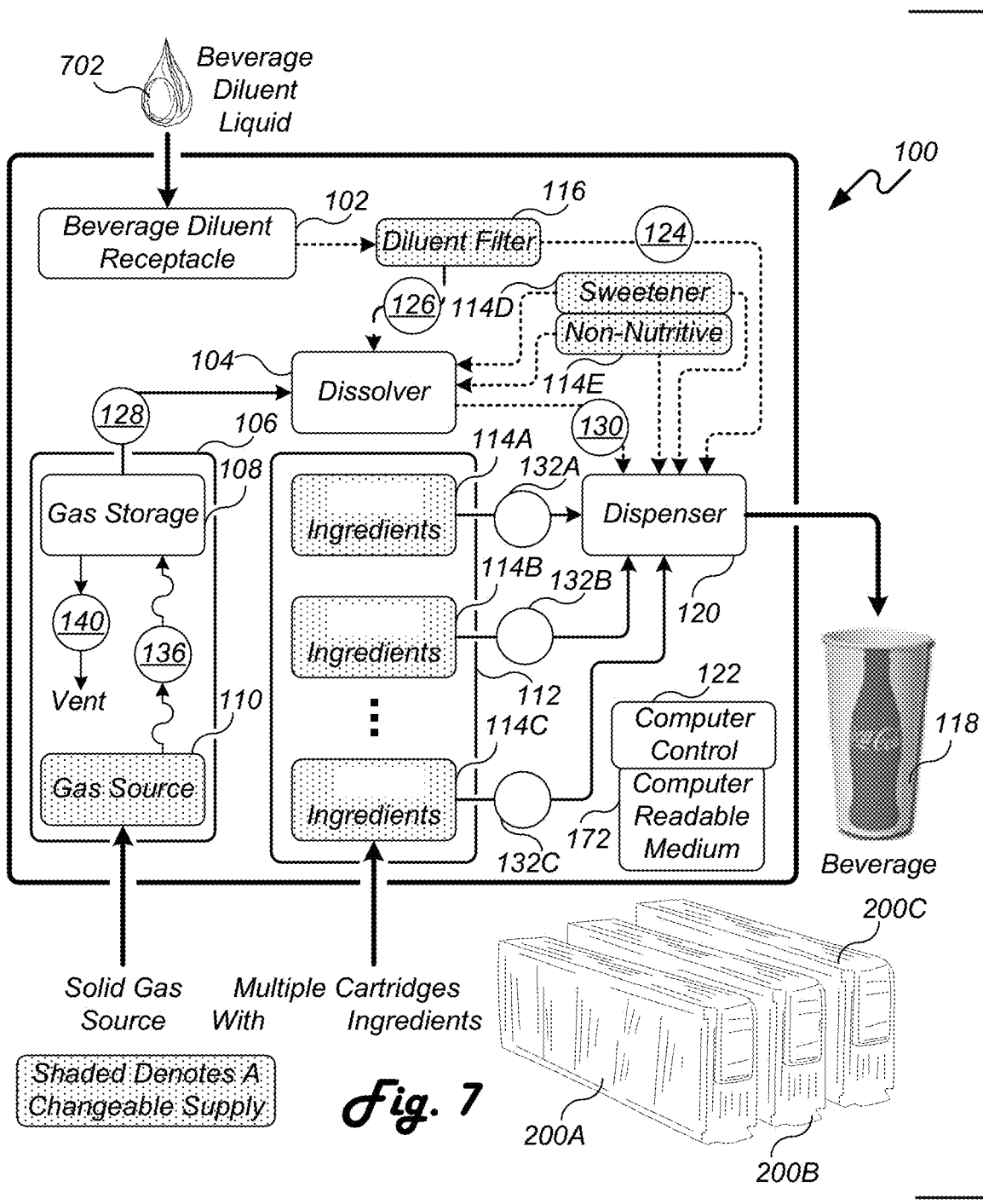
FIG. 7 illustrates one example of a beverage making machine, which utilizes at least one of a beverage making cartridge.

For clarification, beverage making cartridge receptacle 110 is illustrated in at least FIG. 7 as a receptacle for receiving a beverage making cartridge comprising a solid gas source cartridge and beverage making cartridge receptacle 114 is shown as a receptacle for receiving a beverage making cartridge comprising a micro ingredient. In the exemplary embodiment, illustrated in at least FIGS. 4A-B and 17, the beverage making cartridge receptacle 110/114 can be a gas cartridge or a micro ingredient cartridge or a cartridge with at least one of a solid gas and at least one of a micro ingredient or a combination thereof in the same beverage making cartridge 200. Once the beverage making cartridge has been installed, the systems and methods of the present invention can be used to make gas infused and non-gas infused beverages, with or without aroma enhancement, as may be required and/or desired in a particular embodiment.

Referring to FIG. 4B there is illustrated a beverage making machine 100, which utilizes at least one of a beverage making cartridge 200. In an exemplary embodiment, with some similar functions as the bulk dispenser of FIG. 4A, this bulk type dispenser 100, often referred to as a personal drink vessel style dispenser, is often carried by a consumer. This bulk type dispenser beverage making machine 100, which comprises a beverage diluent receptacle 102 can make a wide variety of hot or cold beverages.

The beverage making cartridge 200 can come in many flavors, types and kinds of beverages, such as energy boost or nutraceutical enhancers or other benefits, and/or brands. Typical use includes a consumer inserting at least one beverage making cartridge 200 into a beverage making cartridge receptacle 110/114, which is part of the bulk type dispenser beverage making machine 100. Once installed, the beverage making machine 100 can make, from a single installed beverage making cartridge 200, a plurality of hot and cold beverages. When the consumables are used up in the beverage making cartridge 200, the beverage making cartridge 200 can be removed and replaced with a new beverage making cartridge 200, as needed.

Referring to FIG. 5 there are illustrated examples of functional block diagrams of various beverage making cartridges 200A-C. In an exemplary embodiment, for example and not a limitation, these functional bock diagrams 'A', 'B', and 'C' are separate and different representations of three different beverage making cartridges that can be used with a beverage making machines 100 and are particularly well suited for bulk water type beverage making machines, such as is illustrated in at least FIGS. 4A-B, and 24-25.

Referring to beverage making cartridge enclosure 210A, reference label 'A', arrows indicate different fluid flow pathways depending on the embodiment desired. In one exemplary embodiment, a fluid flow pathway can involve mixing the micro ingredient 214A with the beverage diluent liquid received from the beverage diluent receptacle 102A to form a beverage and then returning the beverage to the beverage diluent receptacle 102A. A consumer can then dispense, from the beverage diluent receptacle 102A, by way of a bistable lever actuated valve 146A, the beverage into vessel 118A, as needed.

An advantage of this configuration is that, the beverage can be prepared ahead of the consumer's need and then dispensed as needed. Another advantage of this exemplary embodiment can be that if electricity is needed to operate the beverage making machine 100, the beverage could be produced and remain in the beverage receptacle 102A at a location, where there is a power source, and then unplugged to be portable, taken with the consumer to a remote location, where there is not easy access to a power source, and the beverage in the beverage diluent receptacle 102A can be dispensed into vessel 118A, as needed, to be enjoyed by consumers at the remote location.

Use of the term "vessel" or "vessel 118" or "vessel portion", in the present invention, can mean a drinking cup, reseal type bottle, pitcher, drinking mug, potable water container, or other similar type, kind, or reference, as it relates to something a consumer can transport beverages, or put a beverage into and/or drink from. Common beverage packaging vessels can include glass bottles, immediate consumption paper vessels, plastic, or coated cups like the kind use for fountain drinks at a quick serve restaurant, metal cans and bottles, plastic bottles such as PET and other types of polymers, and other types and kinds of vessel containers that are good for holding a beverage, transporting a beverage, storing a beverage or storing beverage making materials and/or allowing a consumer to drink a beverage. The present invention does make reference to and therefore a distinction from the term "vessel" or "vessel 118" in the special case of a high pressure vessel, in the context of holding a high pressure gas, or other substance, such as for gas storage tank 108. This type of high pressure vessel, for containing and dispensing a high pressure gas, is often a heavy wall metal container, for specific use under certain conditions, where safety is a priority and as such, the design and use of the vessel requires special attention.

In another exemplary embodiment, a fluid flow pathway can cause the micro ingredient 214A and the beverage diluent liquid 702 from the beverage diluent receptacle 102A to meet and be ratio mixed at or just after dispense, through the dispenser 146A, into the consumer's vessel 118, to form the beverage. Other fluid pathways can be configured and multiple micro ingredients can be utilized, as may be required and/or desired in a particular embodiment.

Use of the term "mixed", "mixing", "ratio mix" or "ratio mixed", or "ratio mixing", in the present invention, is intended to mean mixing volumetrically or otherwise a predefined portion of micro ingredient with a predefined portion of beverage diluent. As an example and not a limitation, the ratio mix of a micro ingredient, which is a syrup concentrate, could be one part syrup to five parts beverage diluent liquid. Furthermore, the dispenser 146 can be considered a mixer in exemplary embodiments where the various fluid streams are combined and dispensed to form the beverage.

Referring to beverage making cartridge enclosure 210B, reference label 'B', a micro ingredient 214B, a beverage diluent receptacle 102B, a solid gas source 202A, and a beverage diluent cooler 148A are arranged to cool the beverage diluent liquid 702 and mix at least one micro ingredient with the beverage diluent liquid 702 to form a beverage in vessel 118B.

In an exemplary embodiment, the solid gas source could be in ice form and as such have an extremely cold surface temperature, for example and not a limitation, carbon dioxide (dry-ice) has a surface temperature in the range of −109 F. Use of this cold temperature to cool the beverage diluent liquid can be effectuated by way of the beverage diluent cooler 148A. In this regard, the beverage diluent cooler 148A can be thermally coupled to the beverage diluent receptacle 102B. In this arrangement, the cold surface temperature can be communicated through the thermally coupled beverage diluent cooler 148A and cool the beverage diluent receptacle 102B. As the beverage diluent receptacle 102B cools the beverage diluent liquid inside also cools.

Similar to cartridge reference label 'A' the micro ingredient 214B and the beverage diluent liquid can be mixed in different fluid pathways, as may be required and/or desired in a particular embodiment, to form a beverage in vessel 118B. A bistable lever actuated valve 146B can be utilized to dispense a beverage into vessel 118B into a vessel. In one exemplary embodiment, the fluid pathway forms the beverage and stores it in the beverage diluent receptacle 102B until dispensed by a consumer. In a second exemplary embodiment, a fluid pathway can cause the beverage diluent liquid 702, from beverage diluent receptacle 102B, and the micro ingredient 214B to meet and be ratio mixed at or just after dispense, through the bistable lever actuated valve 146B, into the consumer's vessel 118B. Other fluid pathways can be configured and multiple micro ingredients can be utilized, as may be required and/or desired in a particular embodiment.

Referring to beverage making cartridge enclosure 210C, reference label 'C', a micro ingredient 214C, a beverage diluent receptacle 102C, a solid gas source 202B, a dissolver 104, and a beverage diluent cooler 148B are arranged to cool the beverage diluent and mix at least one micro ingredient with the beverage diluent liquid to form a beverage in vessel 118C. In addition, the solid gas source 202B, which sublimates to emit a gas, can be arranged with dissolver 104 to dissolve the emitted gas 704, into the beverage diluent liquid 702. In this regard, for example and not a limitation, if the emitted gas 704 is CO2 then dissolving the emitted gas 704, by way of dissolver 104, into the beverage diluent liquid 702, would carbonate the beverage diluent liquid and ultimately dispense beverage into vessel 118C.

As in the exemplary embodiments of reference label 'A' and 'B' above multiple fluid pathways can provide several alternatives for the embodiment illustrated in reference label 'C'. As example, the beverage diluent liquid 702, within the beverage diluent receptacle 102C, can be transfer between the dissolver 104, for the purpose of dissolving the emitted gas 704 from the solid gas source 202B into the beverage diluent liquid 702, and then transferred back to the beverage diluent receptacle 102C for storage. Alternatively, the gas 704 infused beverage diluent liquid can remain in the dissolver 104 under pressure, until needed. As required, in a particular embodiment, the beverage diluent liquid 702 with or without gas infusion can be chilled by the beverage diluent cooler 148B. In this regard, chilled beverage diluent liquid allows the emitted gas 704 to be more easily dissolved into the beverage diluent liquid, which in turn enables being able to reach higher concentration of dissolved gas volumes within the beverage diluent liquid, referred to as a higher or larger volume of gas to liquid ratio. In addition, often cooling the beverage diluent liquid makes a more enjoyable beverage for the consumer.

The micro ingredient 214C can also have multiple fluid pathways, as may be required in a particular embodiment. As example, in one such fluid pathway the micro ingredient 214C can be transferred, as needed and in the correct quantities, to the dissolver 104 and mixed with the beverage diluent liquid 702. An advantage can be that with the combining of the micro ingredient and beverage diluent liquid, the mixed beverage may be easier to dissolve the emitted gas 704 into versus trying to dissolve the emitted gas 704 into the beverage diluent liquid only.

Another fluid pathway can cause the micro ingredient 214C to be transferred, as need and in the correct quantities, to the bistable lever actuated valve 146C. In such an embodiment, the micro ingredient 214C and the beverage diluent liquid, from the beverage diluent receptacle 102C or the dissolver 104, can be arranged to meet and be ratio mixed at or just after dispense, through the bistable lever actuated valve 146C, into the consumer's vessel 118C.

As another example, a fluid pathway can cause the micro ingredient 214C, gas infused beverage diluent liquid from the dissolver 104, and non-gas infused beverage diluent liquid from the beverage diluent receptacle 102C to meet at the bistable lever actuated valve 146C, mix, and form beverage in vessel 118C. In this embodiment, the combined gas infused and non-gas infused beverage diluent liquid act to ratio mix with the micro ingredient, diluting the micro ingredient as well as adjusting the final volumes of gas to a desired set point, by diluting down the gas infused beverage diluent liquid with non-gas infused beverage diluent liquid. In this regard, the gas infused beverage diluent liquid having a high gas infused volume measurement can be mixed down to a lower gas infused volume level when the beverage in vessel 118C is formed. As example, and not a limitation, the gas infused beverage diluent liquid, within the dissolver 104, can contain 8 volumes of gas. Mixing, at time of dispense, with non-gas infused beverage diluent liquid in a 50:50 mixture would bring the beverage down in the range of 4 volumes of infused gas (ideally, though often less with pressure changes).

Figure 11:
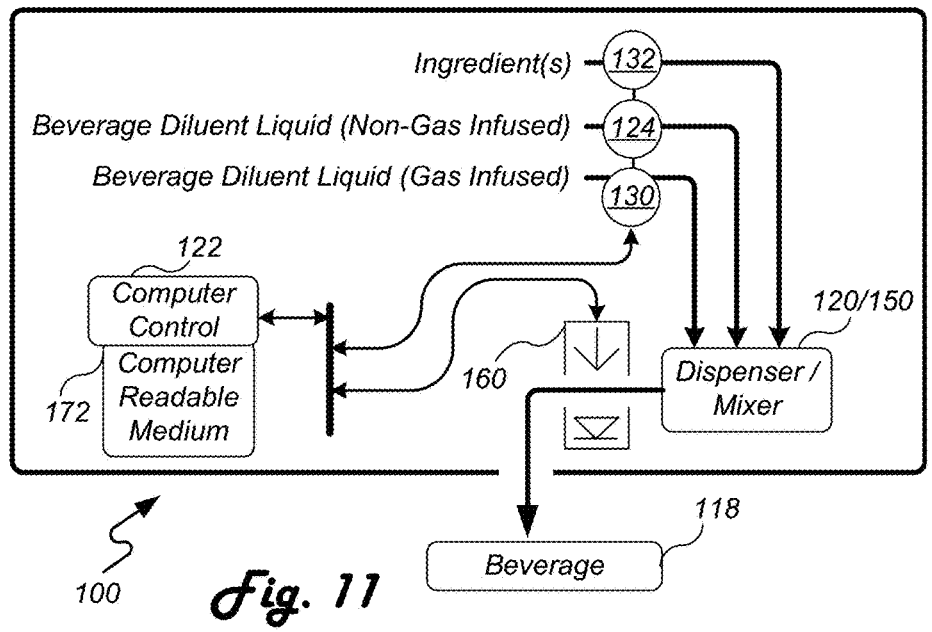
FIG. 11 illustrates one example of combining beverage diluent fluid flows (with and without gas infusion) with at least one of a micro ingredient flow to control the volumes of gas in a formed beverage.

In another exemplary embodiment, as better illustrated in at least FIG. 11, an infrared sensor system 160 comprising an infrared light source and an infrared receiver sensor can data communicate with a computer control 122 and be used to look through the beverage diluent liquid. If Carbon dioxide (CO2) is used as the gas and the beverage diluent liquid is clear (like water), the dissolved gas in the beverage diluent liquid will appear opaque to the infrared receiver sensor essentially blocking the infrared light source from reaching the sensor. The more dissolved gas the more opaque. As such, the amount of infrared light passing through the beverage diluent liquid is inversely proportional to the amount of CO2 dissolved in the beverage diluent liquid. This correlation can be used to measure the dissolved CO2 level or volumes in the beverage diluent as the liquid is being dispensed and the gas infused and non-gas infused beverage diluent sources can each be throttled accordingly to set the dissolved volumes level at the desired value.

As example, if the infrared sensor system 160 indicates the dissolved CO2 level is too low then the gas infused beverage diluent liquid flow can be increased, by way of pump, valve, mixer, and/or regulators 130, or the non-gas infused beverage diluent liquid flow can be decreased, by way of pump, valve, mixer, and/or regulators 124. Conversely, if the infrared sensor system 160 indicates that the dissolved CO2 level is too high then the gas infused beverage diluent liquid flow can be decreased, by way of pump, valve, mixer, and/or regulators 130, or the non-gas infused beverage diluent liquid flow can be increased, by way of pump, valve, mixer, and/or regulators 124. A micro ingredient, by way of pump, valve, mixer, and/or regulators 132 can also be mixed with the beverage diluent liquid to form the beverage which can be dispensed into vessel 118. The pump, valve, mixer, and/or regulators 124, 130, and 132 can data communicate with computer control 122 or otherwise are operable and/or controllable by way of computer control 122 or other control systems, as may be required and/or desired in a particular embodiment.

A beverage making machine 100 can comprise a beverage diluent receptacle 102 for storing a beverage diluent liquid 702. A beverage making cartridge 200 comprising at least one of a micro ingredient 214, the beverage making cartridge 200 is arranged to receive at least portion of the beverage diluent liquid 702 A dispenser 120 selectively dispenses a predefined ratio of the micro ingredient 214 and the beverage diluent liquid 702 to form a beverage.

In another exemplary embodiment, the beverage diluent liquid 702 can be circulated through the beverage making cartridge 200 to form the beverage and then returned to the beverage diluent receptacle 102 for storage until dispense.

In another exemplary embodiment, the gas 702 can be dissolved into the beverage diluent liquid 702.

In another exemplary embodiment, the gas source portion 228 is arranged to thermally couple the cold surface temperature of the solid gas source 202 to the beverage diluent receptacle 102, cooling the beverage diluent liquid 702.

In another exemplary embodiment, the dispenser 120 can further comprising a micro ingredient selector 150, the micro ingredient selector 150 selects which of the micro ingredient 214 is to be mixed with the beverage diluent liquid 702 to form the beverage. Additionally, the dispenser 120 can further comprise a micro ingredient selector 150, the micro ingredient selector 150 selects between dispensing beverage diluent liquid 702 only and dispensing at least one of the micro ingredient 214 mixed with the beverage diluent liquid 702 to form the beverage.

In another exemplary embodiment, a beverage making machine 100 can comprise a beverage diluent receptacle 102 which can further comprise a beverage diluent liquid 702. A beverage making cartridge 200 can be arranged to receive at least the beverage diluent liquid 702, the beverage making cartridge 200 including at least one of a micro ingredient portion 230 and a gas source portion 228, the gas source portion 228 contains a solid gas source 202 that through sublimation emits a gas 704, the gas 704 is dissolved into the beverage diluent liquid 702, the gas source portion 228 is arranged to thermally couple the cold surface temperature of the solid gas source 202 to the beverage diluent receptacle 102, cooling the beverage diluent liquid 702. A dispenser 120 attached to the beverage making cartridge 200 selectively dispenses a predefined ratio of the micro ingredient 214 and the beverage diluent liquid 702 to form a beverage.

In another exemplary embodiment, a beverage making machine 100 can comprise a beverage making cartridge 200 including at least one of a micro ingredient portion 230, and a gas source portion 228, the gas source portion 228 contains a solid gas source 202 that through sublimation emits a gas 704. A beverage diluent receptacle 102 for receiving a beverage diluent liquid 702, the beverage diluent receptacle 102 is arranged to dissolve the gas 704 into the beverage diluent liquid 702, the gas source portion 228 is arranged to thermally couple the cold surface temperature of the solid gas source 202 to the beverage diluent receptacle 102 cooling the beverage diluent liquid 702. A dispenser 120 selectively dispenses a predefined ratio of the micro ingredient 214 and the beverage diluent liquid 702 to form a beverage.

For the exemplary embodiments reference labels 'A', 'B', and 'C' illustrated in FIG. 5 there can be other fluid pathways configured, and/or more than one micro ingredient can be utilized, as may be required and/or desired in a particular embodiment.

Figure 6:
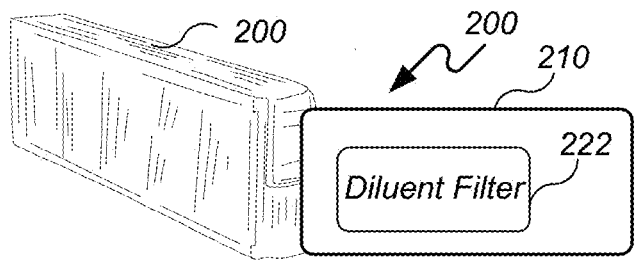
FIG. 6 illustrates one example of a functional block diagram of a beverage making cartridge having a beverage diluent liquid filter.

Referring to FIG. 6 there is illustrated one example of a functional block diagram of a beverage making cartridge 200 comprising a beverage diluent cartridge enclosure 210 having a beverage diluent liquid filter 222. In an exemplary embodiment, beverage diluent liquid properties such as chemical content, turbidity, odor, pathogens, and other beverage diluent liquid qualities can affect the safety and quality of the beverage formed with the beverage diluent liquid. As such, beverage making cartridge 200 comprising a beverage diluent filter 222 can be inserted into a beverage diluent filter receptacle 116, and can be arranged to remove contaminates, pathogens, and odors, turbidity, and/or other undesirable materials from the beverage diluent liquid rendering the beverage diluent liquid suitable for use and capable of producing a quality beverage. Such a beverage diluent filter can be active or passive and can comprise technologies such as small micron particle filtering, active carbon, and/or other beverage diluent liquid filter technologies, as may be require and/or desired in a particular embodiment.

Referring to FIG. 7 there is illustrated one example of a beverage making machine 100, which utilizes at least one of a beverage making cartridge 200. In an exemplary embodiment, with arrows indicating fluid or gas pathways, a beverage diluent liquid 702 can be supplied into a beverage diluent receptacle 102. The beverage diluent receptacle 102 can be sized, as may be desired and/or required in a particular embodiment, to hold from several ounces of beverage diluent liquid 702 to several gallons of the beverage diluent liquid 702. The beverage diluent liquid 702 is preferably water, but can be other liquids such as milk, juice, or other liquids, as may be required and/or desired in a particular embodiment.

The beverage diluent liquid 702 can optionally be filtered by way of a beverage making cartridge 200 comprising a beverage diluent filter 222 illustrated in at least FIG. 6, being inserted into the beverage diluent receptacle 116. In an exemplary embodiment, the beverage diluent liquid 702 properties such as chemical content, turbidity, odor, pathogens, and other beverage diluent liquid qualities can affect the safety and quality of the beverage formed with the beverage diluent liquid 702. As such, beverage diluent filter 222 can be arranged to remove contaminates, pathogens, and odors, turbidity, and other undesirable materials from the beverage diluent liquid rendering the beverage diluent liquid suitable for use and capable of producing a quality beverage. Such a beverage diluent filter can be active or passive and comprise technologies such as small micron particle filtering, active carbon, and/or other beverage diluent liquid filter technologies, as may be require and/or desired in a particular embodiment. If filtering of the beverage diluent liquid 702 is not required in a particular embodiment then the beverage diluent receptacle 102 can be arranged to provide the supply to either or both the dissolver 104 and/or the dispenser 120.

During beverage making a pump, valve, mixer, and/or regulator 124 can control the flow of the beverage diluent liquid 702 to the dispenser 120. In this case, the beverage diluent liquid 702 would not be infused with gas. A pump, valve, mixer, and/or regulator 126 can control the flow of the beverage diluent liquid 702 to the dissolver 104. The dissolver 104 can receive gas from the gas storage tank 108 and under pressure, dissolve the gas into the beverage diluent liquid 702 producing the gas infused beverage diluent liquid. A gas transfer system 128, which can comprise pumps, valves, and/or regulators, can control the supply of gas and pressure level maintained within the dissolver 104. A pump, valve, mixer, and/or regulator 130 can control the flow of gas infused beverage diluent liquid to the dispenser 120.

At least one of a beverage making cartridge 200A-C comprising micro ingredients 214 and/or a solid gas source 202, illustrated in at least FIGS. 1A-B and 2A-B, can be inserted into beverage making cartridge receptacles 110 and 114A-E. The beverage making cartridges comprising micro ingredients can be accessible to a consumer by way of an ingredient storage section 112. In a similar manner, the beverage making cartridge 200 comprising a solid gas source 202 or an aroma enhanced solid gas source 202, better illustrated in at least FIG. 3, can be accessible to a consumer as part of the gas generation and storage system 106. A series of pumps, valves, and/or regulators 132A-C can control the flow of the micro ingredients to the dispenser 120.

The gas generation and storage system 106 accommodates a beverage making cartridge 200 comprising a solid gas source or an aroma enhance solid gas source which can be inserted into a beverage making cartridge receptacle 110. The beverage making cartridge receptacle 110 is arranged to accept and/or channel emitted gas 704, from the solid gas source, as the solid gas source sublimates and transfers the emitted gas 704 to the gas storage tank 108. Pumps, valves, and/or regulators 136 can effectuate the transfer of the emitted gas 704, from the solid gas source, to the gas storage tank 108. To avoid over pressure conditions, within the gas storage tank 108, pumps, valves, mixers, and/or regulators 140 can be arranged to vent the gas in over pressure conditions, thus holding the tank at a safe predetermined upper gas pressure limit.

The dispenser 120 can be a valve or nozzle configured to consolidate the fluid flows from multiple sources into a single fluid flow which can be directed into a consumer vessel 118 thus forming a beverage. Such a dispenser can be passive as a component that routes fluids or active having pumps, valves, and/or regulators to control when to dispense liquids and/or to control the mixing ratios of the liquids, and/or for controlling other aspects of beverage making, as maybe required and/or desired in a particular embodiment.

With respect to beverage cartridge receptacles 114D and 114E, these receptacles can be optionally utilized to supply a micro ingredient which is a sweetener in beverage making cartridge receptacle 114D and/or to supply a micro ingredient which is a non-nutritive sweetener in beverage making cartridge receptacle 114E. In an exemplary embodiment sweetener from beverage making cartridge receptacle 114D and/or non-nutritive sweetener from beverage making cartridge receptacle 114E can be routed to the dispenser 120 and mixed with other fluid streams to form the beverage.

Figure 12:
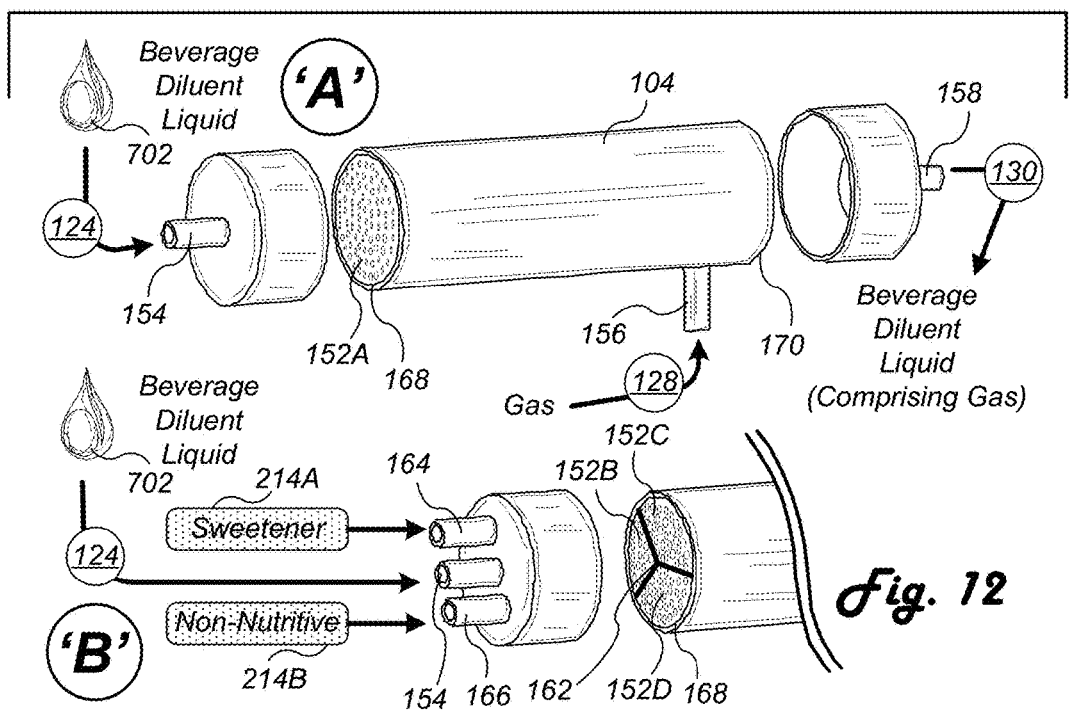
FIG. 12 illustrates one example of a dissolver for dissolving gas into the beverage diluent liquid, such method being effectuated by way of a gas permeable hollow fiber tube style dissolver.

In an exemplary embodiment and with reference to at least FIG. 12, reference label 'B', a method of making a beverage, in a beverage making machine 100, can include increasing the retained volume of gas in the beverage after dispense into a vessel 118, by mixing a beverage diluent liquid 702 with at least one of a micro ingredient, either sweetener in beverage making cartridge receptacle 114D and/or non-nutritive sweetener in beverage making cartridge receptacle 114E, to form an enhanced beverage diluent liquid. The gas can then be dissolved into the enhanced beverage diluent liquid. When compared to dissolving the gas into the beverage diluent liquid only, the enhanced beverage diluent liquid can exhibit a higher volume of dissolved gas.

Such a method, in the present invention, can include mixing on inlet into a dissolver 104 a predefined ratio of a beverage diluent liquid and a micro ingredient to form an enhanced beverage diluent liquid. The micro ingredient in this exemplary embodiment can be a sweetener or a non-nutritive sweetener or a combination thereof. The gas can then be injected into the dissolver 104 at a gas dissolving pressure to cause the gas to dissolve into the enhanced beverage diluent liquid. A predetermined amount of the gas can then be dissolved into the enhanced beverage diluent liquid. The enhanced beverage diluent liquid can then be mixed with other micro ingredients to form the beverage. The beverage can be dispensed from the beverage making machine 100 into a vessel 118.

Resultant form this method, as the beverage leaves the higher pressure environment of the dissolver 104 and enters standard atmospheric conditions of the vessel 118, the enhanced beverage diluent liquid causes the gas to be retained in the beverage in higher concentration, instead of being more easily released to the atmosphere, such that the volumes of the gas in the beverage, after dispense, is increased versus having dissolved the gas into the beverage diluent liquid only.

The term "gas dissolving pressure", in the present invention, is intended to mean the gas pressure necessary to cause the gas to dissolve into a liquid. In general, the liquid can be at some nominal pressure and in order to get the gas to dissolve into the liquid, the pressure of the gas needs to exceed the nominal pressure of the liquid. As such, the gas dissolving pressure is that pressure, which is needed to overcome any nominal liquid pressure and forcible diffuse the gas into the liquid. In an exemplary embodiment, there may be a minimum gas dissolving pressure, at which the gas begins to dissolve into the liquid and a higher and/or more preferred gas dissolving pressure that dissolves the desired volumes of gas level into the liquid, in a desired time period. Typically, liquid temperature, surface area of the liquid exposed to the gas, gas dissolving pressure, and other factors work together to determine the average time required to dissolve the gas into the liquid and for the gas infused liquid to reach equilibrium.

In an exemplary embodiment the "gas dissolving pressure" and the "minimum dissolver gas volumes level" are somewhat related in that the "gas dissolving pressure" needs to be high enough to dissolve or otherwise force the desired "minimum dissolver gas volumes level" of the gas into the liquid.

A computer control 122 can selectively formulate and make a wide variety of gas infused and non-gas infused beverages 118. As example and not a limitation, computer control 122 can dispense at least one of a micro ingredient and gas infused beverage diluent liquid 702 in a predetermined volumetric ratio to form a gas infused beverage. The computer control 122 can further comprise a computer readable medium 172 which can be encoded with instructions to operate the beverage making machine 100, the methods of the present invention, control operation of the beverage making machine 100, data communicate across the global network 604, with data processing resources 606, with wireless device 602, and/or encoded with instructions for effectuating other types and kinds of activities, as may be required and/or desired in a particular embodiment.

A computer control 122 can be an embedded system, PC computer based design, micro controller based design (examples MOTOROLA, MICROCHIP, ZILOG, others), run LINUX, WINDOWS (examples CE, EMBEDDED, XP, other), ANDROID, or other suitable operating systems, and/or can be other types and kinds of computer control systems, as may be required and/or desired in a particular embodiment.

In another example and not a limitation, computer control 122 can dispense at least one of a micro ingredient and non-gas infused beverage diluent liquid 702 in a predetermined volumetric ratio to form a non-gas infused beverage.

In another example and not a limitation, the computer control 122 can dispense both gas infused beverage diluent liquid 702 and non-gas infused beverage diluent liquid 702 in a predetermined volumetric ratio to control the volumes of the gas infused in the final beverage. In this regard, a gas infused beverage diluent liquid could have a higher than needed volumes of gas dissolved in the liquid, for example and not a limitation, greater than 4 volumes. To reduce the gas volumes in the final beverage, the gas infused beverage diluent liquid can be mixed with a non-gas infused beverage diluent liquid, which will reduce by dilution the volumes of the beverage formed to the desired level. An advantage in this approach is that beverages can be produced with different gas infusion volume levels from the same beverage making machine 100. As an extension of this embodiment, the adjusted gas-infused volumes level of the beverage diluent liquid can be mixed with at least one of a micro ingredient to form the final beverage in vessel 118.

In another exemplary embodiment, a beverage making machine 100 can comprise a first beverage making cartridge 200, further comprising at least one of a gas source portion 228, the gas source portion 228 contains a solid gas source 202 that through sublimation emits a gas 704. A gas storage tank 108 can be arranged to store the gas 704 emitted from the solid gas source 202. A second beverage making cartridge 200 can comprise at least one of a micro ingredient 214. A beverage diluent receptacle 102 can be used for receiving a beverage diluent liquid 702. A dissolver 104 dissolves a portion of the gas 704, from the gas storage tank 108, into the beverage diluent liquid 702. A dispenser 120 selectively dispenses a predefined ratio of at least one of the micro ingredient 214 and the beverage diluent liquid 702, to form a beverage.

In another exemplary embodiment, the solid gas source portion 228 can further comprise a one-way vent 204, which allows the gas 704 to escape the solid gas source portion while preventing air from entering the solid gas source packaging, wherein the environment enclosing the solid gas source 202 remains sterile while emitting the gas 704.

In another exemplary embodiment, the beverage making machine 100 can further comprise a plurality of valves, a plurality of sensors, a plurality of pumps, and a computer control 122 interconnected with at least some of the plurality of valves, the plurality of sensors, and the plurality of pumps, the computer control 122 receives a beverage selection from a consumer and controls the beverage making machine to form the beverage.

In another exemplary embodiment, a beverage making machine 100 can comprise at least one of a beverage making cartridge 200 which can further comprise at least one of a micro ingredient portion 230 and a gas source portion 228, the micro ingredient portion contains at least one of a micro ingredient 214, the gas source portion contains a solid gas source 202 that through sublimation emits a gas 704. A gas storage tank 108 can be arranged to store the gas 704 and a beverage diluent receptacle 102 can be provided for receiving a beverage diluent liquid 702. A dissolver dissolves a portion of the gas 704, from the gas storage tank 108, into the beverage diluent liquid 702. A dispenser can selectively dispense a predefined ratio of the micro ingredient 214 and the beverage diluent liquid to form a beverage.

In another exemplary embodiment, the dispenser 120 can further comprise a micro ingredient selector 150 for selecting which, if any, of the micro ingredient 214 is mixed with the beverage diluent liquid to form the beverage.

In another exemplary embodiment, a beverage making machine can comprise at least one of a beverage cartridge 200 which can further comprise at least one of a micro ingredient portion 230, a gas source portion 228, and a gas dissolver portion 140, the gas source portion 228 contains a solid gas source 202 that through sublimation emits a gas 704. A gas storage tank can be arranged to store the gas 704. A beverage diluent receptacle 102 can route at least a portion of a beverage diluent liquid 702 to the dissolver portion 104. The dissolver 104 dissolves at least a portion of the gas 702, from the gas storage tank 108, into the beverage diluent liquid. A dispenser 120 selectively dispenses a predefined ratio of at least one of the micro ingredient 214 and the beverage diluent liquid to form a beverage.

In another exemplary embodiment, a beverage making machine 100 can comprise a beverage making cartridge 200 which can further comprise at least one of a micro ingredient portion 230, a gas source portion 228, and a gas dissolver portion 104, the micro ingredient portion contains at least one of a micro ingredient, the gas source portion 228 contains a solid gas source 202 that through sublimation emits a gas 704. A gas storage tank 108 can be arranged to store the gas 704. A beverage diluent receptacle 102 for routing at least a portion of a beverage diluent liquid 702 to the dissolver portion 104. The dissolver 104 dissolves at least a portion of the gas 704, from the gas storage tank 108, into the beverage diluent liquid 702, the gas source portion 228 is arranged to thermally couple the gas source 202 to the beverage diluent receptacle 102 cooling the beverage diluent liquid 702. A dispenser 120 selectively dispenses a predefined ratio of the micro ingredient 214 and the beverage diluent liquid 702 to form a beverage.

For disclosure purposes the shaded blocks in at least FIGS. 7-8 and 15A-16 denote a changeable supply, ingredient, or functional device (such as filer 222). In an exemplary embodiment, for example and not a limitation, such a changeable supply can preferably be a beverage making cartridge that can be interchanged to resupply the beverage making machine with solid gas sources, micro ingredients, filters, and/or other types and kinds of changeable supplies, as may be required and/or desired in a particular embodiment.

Figure 8:
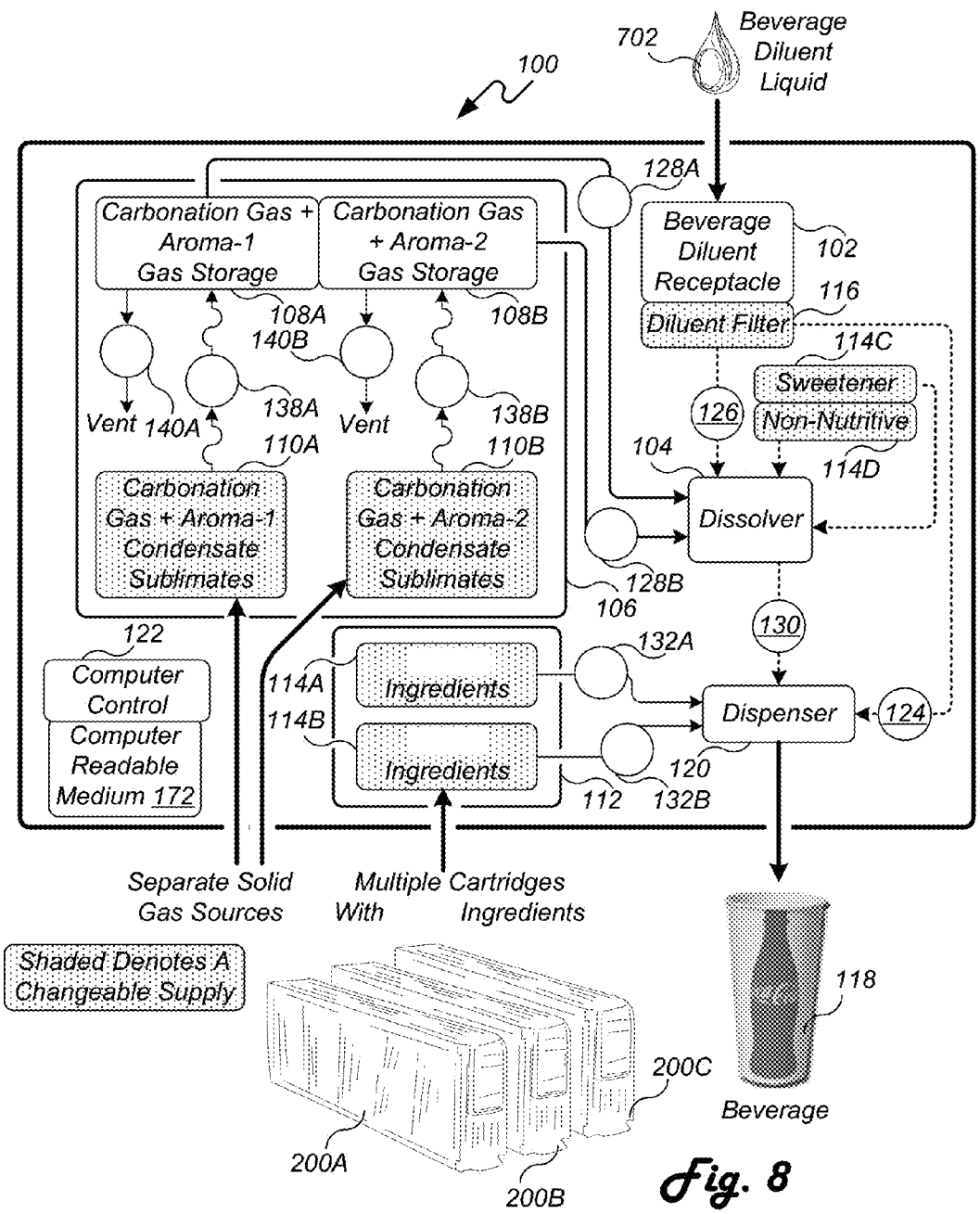
FIG. 8 illustrates one example of a beverage making machine, which utilizes more than one of an aroma enhanced solid gas.

Referring to FIG. 8 there is illustrated a beverage making machine 100, which utilizes more than one of an aroma enhanced solid gas. In an exemplary embodiment, and as illustrated in at least FIG. 3 an aroma enhanced solid gas source can be produced and packaged in a beverage making cartridge 200. Since the solid gas source now contains an aroma, the gas produced will contain aroma molecules. As such, the gas must be kept separate from other gas supplies so that the aroma will not mix and/or be diluted by other gas sources. As such, more than one of an aroma enhanced solid gas source can be separately inserted into beverage making cartridge receptacles 110A-B, which are part of the gas generation and storage system 106. The aroma enhanced solid gas source can then sublimate, emitting a gas which can be captured and stored in separate sections of a gas storage tank 108A-B. In this regard, gas storage tank section 108A is kept from mixing with gas storage tank 108B. There is no limit to the number of separate gas storage tank sections that gas storage tank 108 or a plurality of gas storage tanks 108 can be divided into, as may be required and/or desired in a particular embodiment.

Pumps, valves, and/or regulators 138A-B also referred to as gas transfer system 138A-B can separately effectuate the transfer of the different and separated aroma enhanced emitted gas 704, from the solid gas source to separate gas storage tank section 108A-B. To avoid over pressure conditions, within the separate gas storage tank sections 108A-

B, pumps, valves, mixers, and/or regulators 140A-B can be arranged to vent the gas in over pressure conditions, thus holding the various tank storage sections at a predetermined upper gas pressure limit when pressurizing.

A gas transfer system 128A-B can separately control the supply of separate aroma enhanced gases and pressure level maintained within the dissolver 104. A pump, valve, mixer, and/or regulator 130 can control the flow of aroma enhanced gas infused beverage diluent liquid to the dispenser 120.

In an exemplary embodiment, for example and not a limitation, as also described in at least FIG. 7, the beverage diluent liquid 702 can be supplied to the beverage diluent receptacle 102 and optionally filtered by way of the beverage diluent filter 222, which can be packaged in a beverage making cartridge 200 and inserted into the beverage diluent filter receptacle 116. Beverage diluent liquid 702 can be routed to either dissolver 104 or the dispenser 120, by way of pump, valve, mixer, and/or regulators 124 and 126. Micro ingredients 214 can be packaged into beverage making cartridges 200 and each of the beverage making cartridges enclosures can be inserted into beverage making cartridge receptacles (for micro ingredients) 114A-D. A series of pumps, valves, and/or regulators 132A-B can control the flow of the micro ingredients to the dispenser 120.

With respect to beverage cartridge receptacles 114C and 114D, these receptacles can be optionally utilized to supply a micro ingredient which is a sweetener in beverage making cartridge receptacle 114C and/or to supply a micro ingredient which is a non-nutritive sweetener in beverage making cartridge receptacle 114D. In an exemplary embodiment sweetener from beverage making cartridge receptacle 114C and/or non-nutritive sweetener from beverage making cartridge receptacle 114D can be routed to the dispenser 120 and mixed with other fluid streams to form the beverage.

In another exemplary embodiment, a method of making a beverage, in a beverage making machine 100, can include increasing the retained volume of gas in the beverage after dispense into a vessel 118, this can be accomplished by mixing the beverage diluent liquid with a micro ingredient, either sweetener in beverage making cartridge receptacle 114C and/or non-nutritive sweetener in beverage making cartridge receptacle 114D, to form an enhanced beverage diluent liquid. The gas can then be dissolved into the enhanced beverage diluent liquid. When compared to dissolving gas into the beverage diluent liquid only, the enhanced beverage diluent liquid can exhibit a higher volume of dissolved gas.

Such a method, in the present invention, can include mixing on inlet into a dissolver 104 a predefined ratio of a beverage diluent liquid 702 and a micro ingredient to form an enhanced beverage diluent liquid. This micro ingredient in this case is sweetener in beverage making cartridge receptacle 114C and/or non-nutritive sweetener in beverage making cartridge receptacle 114D. The gas can then be injected into the dissolver 104 at a pressure to cause the gas to dissolve into the enhanced beverage diluent liquid. A predetermined amount of the gas can be dissolved into the enhanced beverage diluent liquid. The enhanced beverage diluent liquid can then be mixed with at least one of a second micro ingredient 114A-B to form the beverage. The beverage can then be dispensed by way of dispenser 120 into a vessel 118, wherein as the beverage leaves the higher pressure environment of the dissolver 104 and enters standard atmospheric conditions of the vessel 118, the enhanced beverage diluent liquid causes the gas to be retained in the beverage in higher concentration instead of being released to the atmosphere such that the volumes of the gas in the beverage, after dispense, is increased versus alternative method of dissolving the gas into the beverage diluent liquid only.

A computer control 122 can then selectively formulate and make a wide variety of gas infused and non-gas infused beverages 118. As example and not a limitation, computer control 122 can select at least one of the aroma enhanced gases and infuse at least a portion of the beverage diluent liquid with the aroma enhanced gas by way of the dissolver 104. Once infused, at least one of a micro ingredients and an aroma enhanced gas infused beverage diluent liquid 702 can be dispensed in a predetermined volumetric ratio to form an aroma enhanced gas infused beverage in vessel 118. As example, tea aroma when tea leaves, used as an ingredient, is brewed, or coffee aroma when coffee, used as an ingredient, is brewed, or fresh squeezed citrus aroma, when being squeezed or when citrus is processed to extract aroma, or other aroma when brewing, fermenting, squeezing, or other preparation process is used with other ingredients.

In another example and not a limitation, computer control 122 can dispense at least one of a micro ingredient and non-gas infused beverage diluent liquid 702 in a predetermined volumetric ratio to form a non-gas infused beverage in vessel 118.

In another example and not a limitation, the computer control 122 can dispense both aroma enhanced gas infused beverage diluent liquid 702 and non-gas infused beverage diluent liquid 702, in a predetermined volumetric ratio, to control the volumes of the gas infused into the beverage. In this regard, the aroma enhanced gas infused into the beverage diluent liquid can have a higher than desired volumes of gas dissolved in the liquid, for example and not a limitation, greater than nine volumes. To adjust the gas volumes, the aroma enhanced gas infused beverage diluent liquid can be mixed with a portion of the non-gas infused beverage diluent liquid. This has the effect of reducing by diluting the volumes of gas to the desired level in the beverage. An advantage in this approach is that beverages can be produced with different gas infusion volume levels from the same beverage making machine. The adjusted beverage diluent liquid can then be mixed with at least one of a micro ingredient to form the final beverage in vessel 118.

For disclosure purposes the shaded blocks in at least FIGS. 7-8 and 15A-16 denote a changeable supply, ingredient, or functional device (such as filer 222). In an exemplary embodiment, for example and not a limitation, such a changeable supply can preferably be a beverage making cartridge that can be interchanged to resupply the beverage making machine with solid gas sources, micro ingredients, filters, and/or other types and kinds of changeable supplies, as may be required and/or desired in a particular embodiment.

Figure 9:
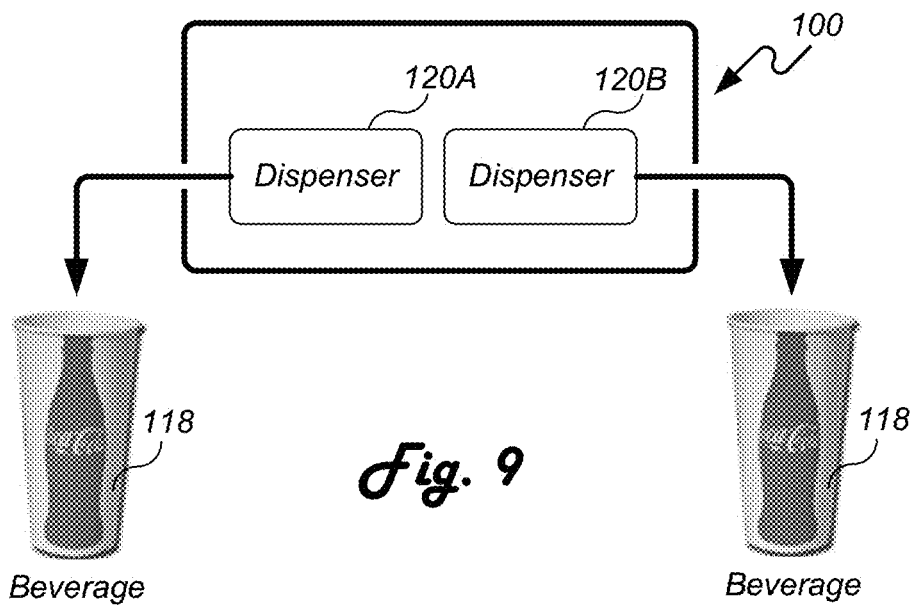
FIG. 9 illustrates one example of a beverage making machine comprising multiple dispensers.

Referring to FIG. 9 there is illustrated one example of a beverage making machine 100 comprising multiple dispensers 120A-B. In an exemplary embodiment, a single beverage making machine 100 can be configured with more than one dispenser 120. An advantage to this configuration is that more than one beverage can be made at a time. In high volume beverage making locations, such as quick serve restaurants, there is a need to make beverages quickly to meet consumer demand. As such, the beverage making machine 100 of the present invention can be configured with more than one dispenser 120 in a single beverage making machine to accommodate the demands of high volume beverage making locations. For disclosure purpose there is shown in FIG. 9 a dual dispenser 120A-B configuration. It is note though that in other exemplary embodiments three, four, or more dispenser 120 can be configured into a single beverage making machine 100, as may be required and/or desired in a particular embodiment.

Figure 10:
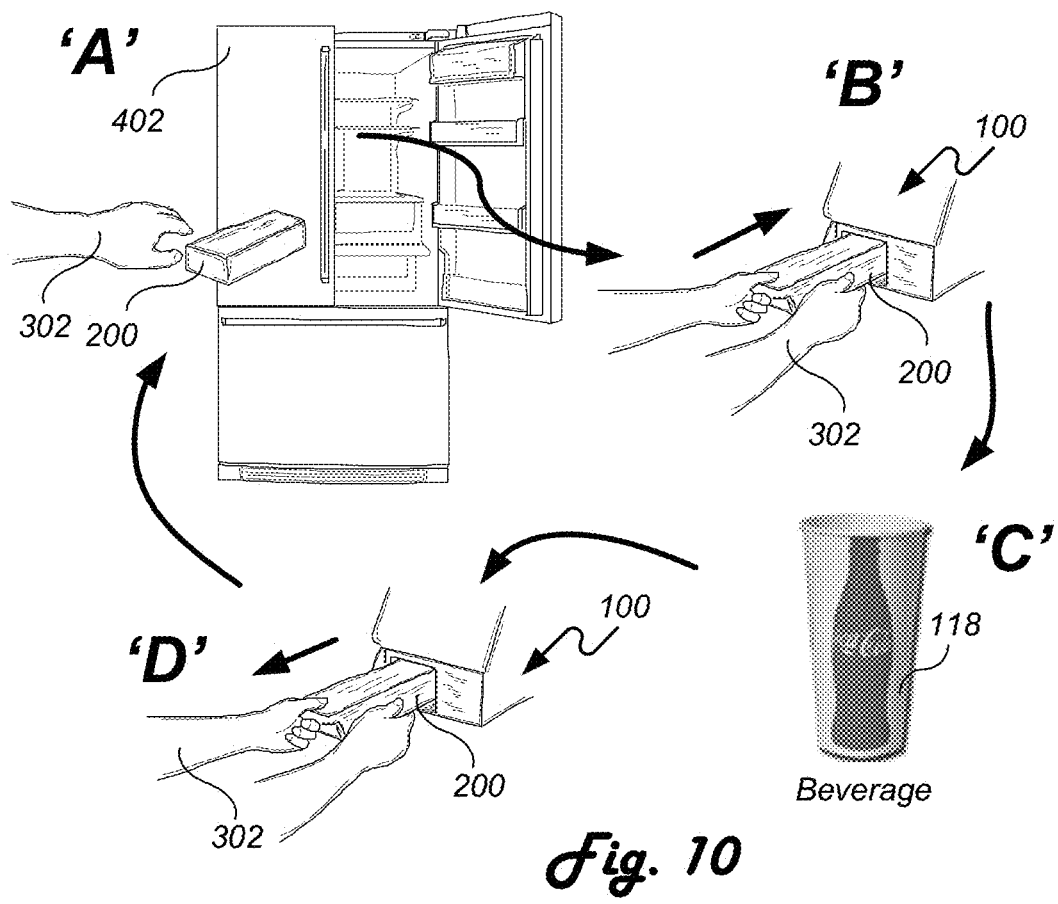
FIG. 10 illustrates one example of a beverage making machine utilizing at least one of a beverage making machine cartridge, which is stored in a refrigerated appliance, separate from the beverage making machine.

Referring to FIG. 10 there is illustrated one example of a beverage making machine 100 utilizing at least one of a beverage making machine cartridge 200, which is stored in a refrigerated appliance 402, separate from the beverage making machine 100. In an exemplary embodiment, and with reference to the methods illustrated in at least FIG. 29, a refrigerated appliance can be utilized to chill and store the beverage making cartridges 200 instead of leaving the cartridges in the beverage making machine 100.

There are several advantages to storing the beverage making cartridges 200 in a refrigerated appliance 402. One such advantage can be chilling the beverage diluent in a beverage making cartridge 200 in a refrigerated appliance 402 prior to beverage making. In this regard, when cold beverage diluent liquid is used in beverage making it is easier to infuse gas and more refreshing to drink a cold beverage. In an exemplary embodiment, chilling the beverage diluent liquid approaching 32 degrees Fahrenheit, prior to dissolving the gas into the beverage diluent liquid, increases the solubility of the gas into the beverage diluent liquid. Thus allowing higher volumes of gas level to be obtained in a shorter amount of time. In addition, this can cause the gas infused beverage diluent liquid to reach dissolved equilibrium and hold the gas infusion better when dispensed. As such, throughput of producing gas infused beverage diluent can be increased.

Another advantage can be chilling the micro ingredients in a beverage making cartridge in a refrigerated appliance 402 can extend the shelf life of the micro ingredients. In this regard, such sensitive micro ingredients can include, for example and not a limitation, dairy, soy, fruit based, microbiological sensitive ingredients, and/or other types and kinds of ingredients that are quickly perishable ingredients when exposed to unrefrigerated environments for a prolonged period of time, and/or as may be required and/or desired in a particular embodiment.

Referring to FIG. 10, reference label 'A' illustrates a consumer 302 removing at least one beverage making cartridge 200 from a refrigerated appliance 402. Reference label 'B' illustrates the consumer 302 then placing the beverage making cartridge 200 into a beverage making machine 100. Reference label 'C' illustrates the beverage making machine forming the beverage in vessel 118. Reference label 'D' illustrates the consumer then removing the beverage making cartridge 200, from the beverage making machine, and returning the cartridge to the refrigerated appliance 402. In an exemplary embodiment, the consumer can refill the beverage making cartridge with beverage diluent liquid as necessary. With regards to consumables such as micro ingredients and the solid gas source, as required non-refillable beverage making cartridges can be discarded and replaced with new beverage making cartridges to replenish the consumable supply.

Figure 31A:
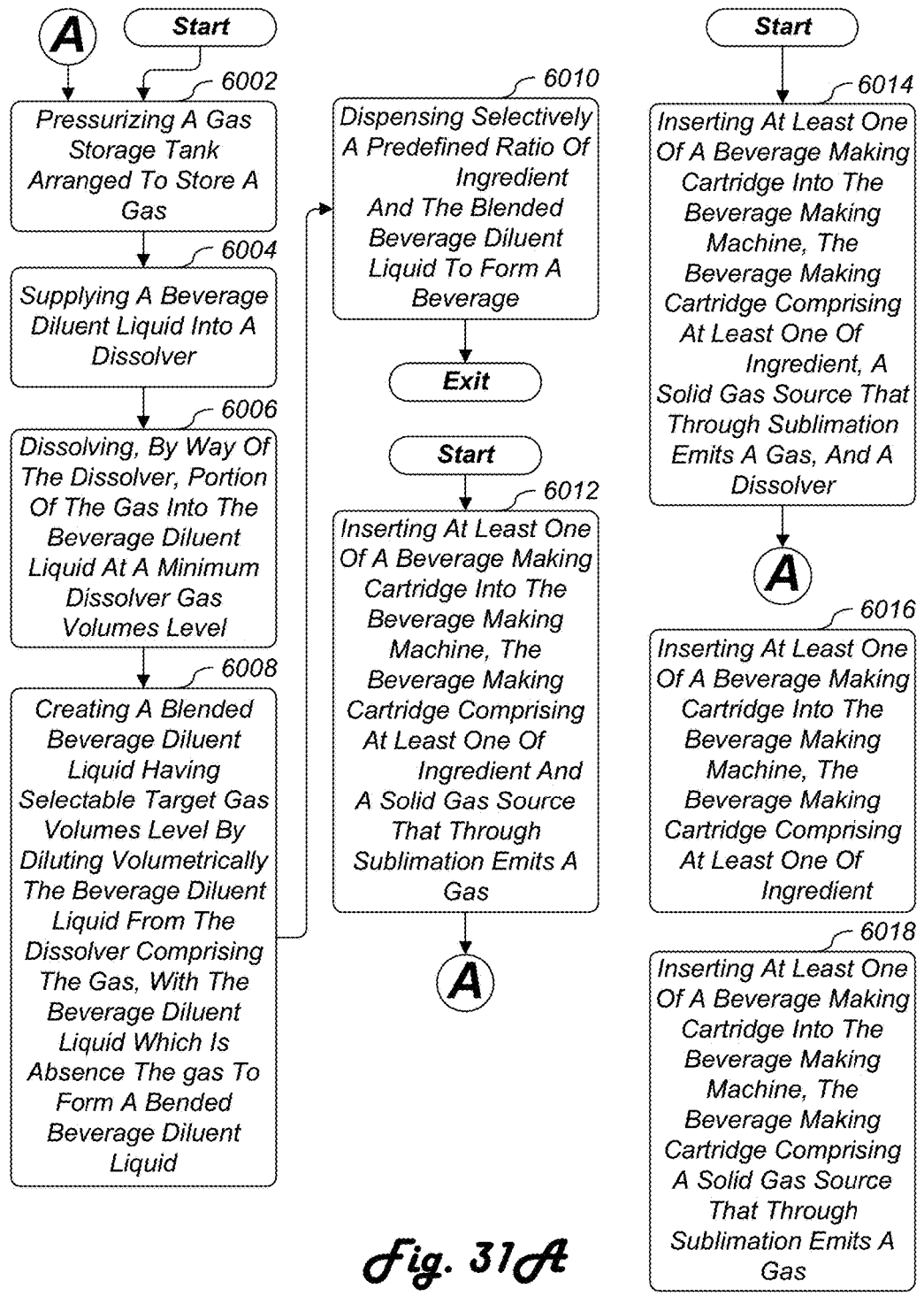
FIGS. 31A-B illustrates examples of methods of making a beverage in a beverage making machine.
Figure 31B:
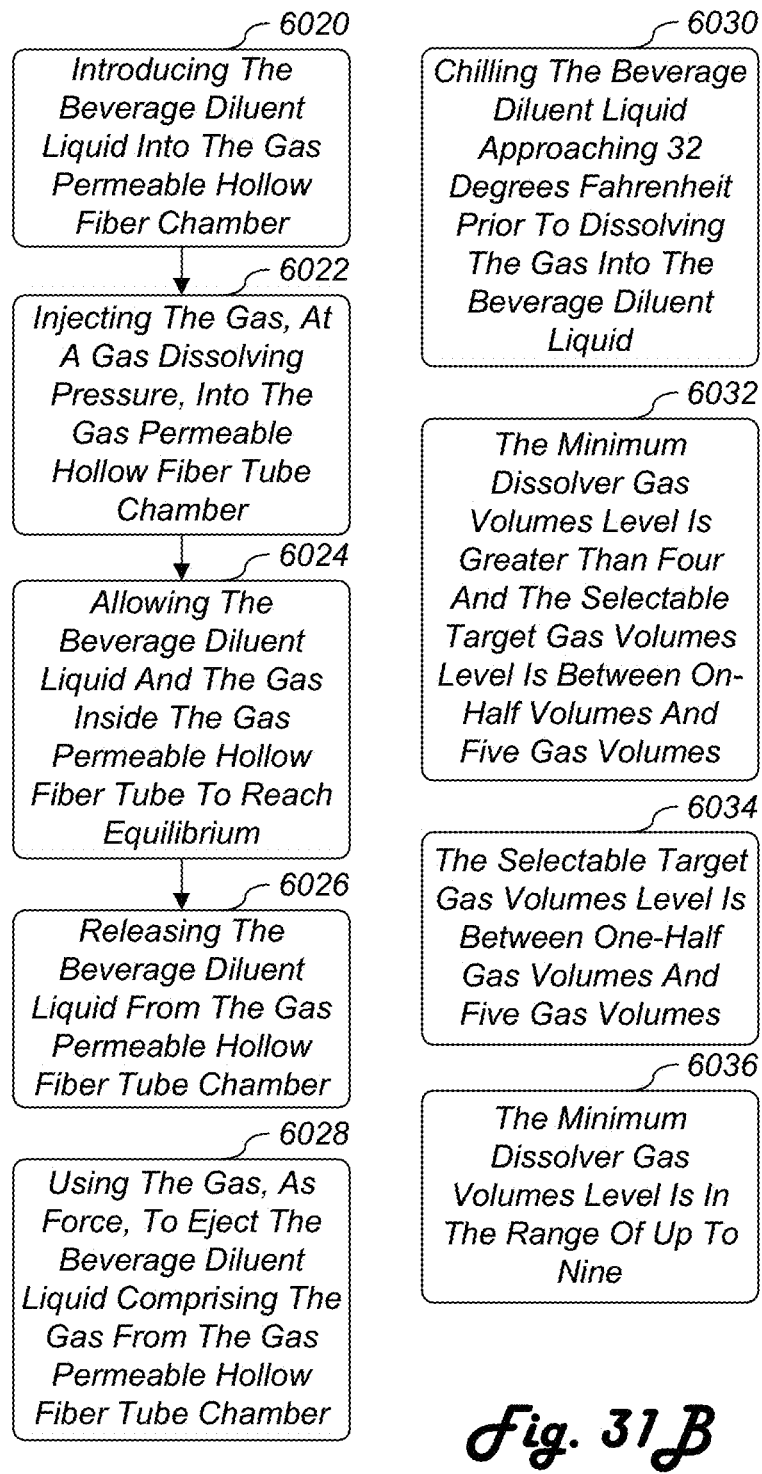

Referring to FIG. 11, with reference also to at least FIGS. 31A-B, there is illustrated one example of combining beverage diluent liquid fluid flows (with and without gas infusion) with at least one of a micro ingredient flow to control the volumes of gas in a formed beverage. Illustrated in the Figure are multiple incoming liquid streams that can comprise micro ingredients, at least two beverage diluent liquids (with and without gas infusion), and/or other types and kinds of liquid streams, as may be required and/or desired in a particular embodiment. The streams converge on the dispenser 120 or a mixer 150. The mixed streams can then be dispensed to form the beverage having a selectable level of dissolved gas into a vessel 118.

In an exemplary embodiment, one method of making a beverage comprising a gas in a beverage making machine 100 includes pressurizing a gas storage tank 108, which is arranged to store a gas emitted from the solid gas source. A beverage diluent liquid 702 can be supplied into a dissolver. A dissolver 104 can be utilized to dissolve a portion of the gas into the beverage diluent liquid at a minimum dissolver gas volumes level. The minimum dissolver gas volumes level is a higher gas volumes level than what is needed in the final beverage; perhaps in the range of 5-11 gas volumes level. A blended beverage diluent liquid can be created having a selectable target gas volumes level by diluting volumetrically the beverage diluent liquid from the dissolver 104 comprising the gas with the beverage diluent liquid which is absence the gas, to form the blended beverage diluent liquid having the predefined target gas volumes level. The final beverage can be formed and/or dispensed by selectively adding a predefined ratio of a micro ingredient and the blended beverage diluent liquid to form the beverage.

Use of the term "minimum dissolver gas volumes level", in the present invention, is intended to mean the least amount of gas volumes dissolved into the beverage diluent liquid, while the beverage diluent liquid is in the dissolver or stored elsewhere in the beverage making machine under pressure. In general, the minimum dissolver gas volumes level is in the range of 3 to 11 gas volume levels, under pressure, inside the beverage making machine. Once dispensed the gas volumes level drops with the corresponding drop from high pressure to atmospheric pressure.

Use of the term "target gas volumes level", in the present invention, is intended to mean the desired gas volumes level of the final beverage dispensed into vessel 118. In general, the gas volumes level will need to be higher in the dissolver to accommodate for the loss of gas when the gas infused beverage diluent liquid transition from a high pressure environment inside the beverage making machine tanks, tubes, etc. to the low pressure atmospheric conditions with the beverage dispensed into the vessel 118 environment. As such, the target gas volumes level is the gas volumes level you end up with in the when the beverage is formed and dispensed into the consumer's vessel 118. For most cases the target gas volumes level will be less than four volumes of dissolved gas into the final beverage composition.

In another exemplary embodiment, a method of making a beverage comprising a gas in a beverage making machine can comprise inserting at least one of a beverage making cartridge 200 into the beverage making machine 100, the beverage making cartridge 200 including at least one of a solid gas source 202 that through sublimation emits a gas. A gas storage tank can be arranged to store a gas in a gas storage tank. A beverage diluent liquid can be supplied into the dissolver and the dissolver can dissolve a portion of the gas into the beverage diluent liquid at a minimum dissolver gas volumes level. Once dissolved, a blended beverage diluent liquid can be created having a selectable target gas volumes level by diluting volumetrically the beverage diluent liquid, from the dissolver, comprising the gas with the beverage diluent liquid, which is absence the gas, to form the blended beverage diluent liquid having the predefined target gas volumes level. A beverage can then be dispensed or otherwise formed by selectively dispensing a predefined ratio of the micro ingredient and the blended beverage diluent liquid to form the beverage.

In another exemplary embodiment, a dissolver 104 can be incorporated into the beverage making cartridge 200. In this regard, the beverage making cartridge 200 can then be utilized to dissolve the gas into the beverage diluent liquid. This places the functionality for dissolving the gas into the beverage diluent liquid in the beverage making cartridge 200 instead of the beverage making machine 100. As such, a beverage making machine which is not equipped with a dissolver 104 can by way of a dissolver 104 equipment beverage making cartridge 200 make gas infused beverages.

In another exemplary embodiment, an infrared sensor system 160 comprising an infrared light source and an infrared receiver sensor can data communicate with a computer control 122 and be used to look through the beverage diluent liquid. If Carbon dioxide ($CO_2$) is used as the gas and the beverage diluent liquid is clear (like water), the dissolved gas in the beverage diluent liquid will appear opaque to the infrared receiver sensor essentially blocking the infrared light source from reaching the sensor. The more dissolved gas the more opaque. As such, the amount of infrared light passing through the beverage diluent liquid is proportional to the amount of $CO_2$ dissolved in the beverage diluent liquid. This correlation can be used to measure the dissolved $CO_2$ level or volumes in the beverage diluent as the liquid is being dispensed and the gas infused and non-gas infused beverage diluent sources can each be throttled accordingly to set the dissolved volumes level at the desired value.

As example, if the infrared sensor system 160 indicates the dissolved $CO_2$ level is too low then the gas infused beverage diluent liquid flow can be increased, by way of pump, valve, mixer, and/or regulators 130, or the non-gas infused beverage diluent liquid flow can be decreased, by way of pump, valve, mixer, and/or regulators 124. Conversely, if the infrared sensor system 160 indicates that the dissolved $CO_2$ level is too high then the gas infused beverage diluent liquid flow can be decreased, by way of pump, valve, mixer, and/or regulators 130, or the non-gas infused beverage diluent liquid flow can be increased, by way of pump, valve, mixer, and/or regulators 124. A micro ingredient, by way of pump, valve, mixer, and/or regulators 132 can also be mixed with the beverage diluent liquid to form the beverage which can be dispensed into vessel 118. The pump, valve, mixer, and/or regulators 124, 130, and 132 can data communicate with computer control 122 or otherwise are operable and/or controllable by way of computer control 122 or other control systems, as may be required and/or desired in a particular embodiment.

Referring to FIG. 12, reference label 'A', there is illustrated one example of a dissolver 104 for dissolving gas into the beverage diluent liquid, such method being effectuated by way of a gas permeable hollow fiber tube style dissolver 104. In an exemplary embodiment, a gas permeable hollow fiber tube can be used as a dissolver 104. In this regard, beverage diluent liquid 702 can enter the dissolver, by way inlet 154. A series of small gas permeable tubes forming a dissolving chamber 152A can allow the beverage diluent liquid to pass through the dissolver 104 and exit the dissolver 104 by way of an outlet 158. Gas 704 under pressure can enter the dissolver by way of a gas inlet 156. The tubes are permeable to the gas 704 and as such, the gas passes through the walls of the tubes and dissolves in the beverage diluent liquid. Surface area of the beverage diluent liquid is increased with this design making it easier for the gas 704 to dissolve in the beverage diluent liquid 702. A series of pump, valve, mixer, and/or regulator 130, as well as gas transfer system 128 can control the inlet, dissolving of the gas 704, and outlet of the beverage diluent liquid 702 operating the dissolver 104 in an on demand continuous batch method to produce gas infused beverage diluent liquid for use in beverage making.

In an exemplary embodiment, for example and not a limitation, in operation, the dissolver 104 can be a gas permeable hollow fiber tube, as illustrated in FIG. 12 and the steps for dissolving gas into the beverage diluent liquid can comprise introducing the beverage diluent liquid 702 into the gas permeable hollow fiber tube dissolving chamber 152A, the gas permeable hollow fiber tube dissolving chamber 152A receives a fixed volume of the beverage diluent liquid 702. The gas 704 can then be injected, at a gas dissolving pressure to obtain the minimum dissolver gas volumes level, into the gas permeable hollow fiber tube dissolving chamber 152A. A brief time period is allowed so that the beverage diluent liquid and the gas inside the gas permeable hollow fiber tube chamber 152A to dissolve into one another and reach equilibrium. The brief time period can range from a few seconds to minutes depending on factors such as beverage diluent liquid volume and temperature, gas pressure, desired volumes of gas diffused into the beverage diluent liquid, permeability of the small fiber tubes (how easy does it pass the gas to the beverage diluent liquid), beverage forming requirements, and/or other factors. After gas-liquid equilibrium is reached, the beverage diluent liquid can be released from the gas permeable hollow fiber tube dissolving chamber 152A, and exit the dissolver 104, ready for use in beverage forming.

In another exemplary embodiment, the gas, as a fluid moving force, can be used to eject the gas infused beverage diluent liquid from the gas permeable hollow fiber tube dissolving chamber 152A. Alternatively, and as needed, a series of pump, valve, mixer, and/or regulator 130, as well as gas transfer system 128 can control the inlet, dissolving of the gas 704 and outlet of the beverage diluent liquid 702, operating the dissolver 104 in an on-demand continuous batch method to produce gas infused beverage diluent liquid for use in beverage making.

In another exemplary embodiment, with reference to at least FIG. 12, reference label 'B' and FIG. 30, a beverage making machine 100 for making a beverage having an increased retained volume of gas 704 in the beverage after dispense into a vessel 118, by mixing a beverage diluent liquid 702 with at least ones of a micro ingredient 214 to form an enhanced beverage diluent liquid, and then dissolving the gas 704 into the enhanced beverage diluent liquid versus dissolving the gas 704 into the beverage diluent liquid only, the beverage making machine comprising at least one of a micro ingredient receptacle 114 for receiving a beverage making cartridge 200 which further comprises at least one of a micro ingredient 214. A beverage diluent receptacle 102 can be included for supplying a beverage diluent liquid. A gas storage tank 108 can be included for supplying a gas 704.

Continuing in this exemplary embodiment, a dissolver comprising a gas inlet 156, a sweetener inlet 164, a non-nutritive sweetener inlet 166, a beverage diluent liquid inlet 154, at least a first dissolving chamber 152B, and a second dissolving chamber 152D each having an inlet end 168 for receiving the sweetener 214A, the non-nutritive sweetener 214B and the beverage diluent liquid 702, and an outlet end 170 where the sweetener 214A, the non-nutritive sweetener 214B, the beverage diluent liquid 702, and combinations thereof can exit, each of the first dissolving chamber 152B and the second dissolving chamber 152D is partitioned and arranged to prevent mixing between the first and the second dissolving chamber 152B/152D, each of the first and second dissolving chamber 152B/152D is also arranged to allow the gas 704 supplied, from the gas inlet 156, to permeate liquids in each of the first and second dissolving chamber 152B.152D.

Continuing in this exemplary embodiment, a computer control 122 comprising a computer readable medium 172 encoded with instructions for mixing on inlet into the dissolver 104 a predefined ratio of a beverage diluent liquid 702 and a micro ingredient 214 to form an enhanced beverage diluent liquid, the micro ingredient 214 being a sweetener 214A or a non-nutritive sweetener 214B or a combination thereof.

In operation, in this embodiment, the gas 704 can be injected into the dissolver 104 at a gas dissolving pressure to cause the gas 704 to dissolve into the enhanced beverage diluent liquid. A predetermined amount of the gas can be dissolved into the enhanced beverage diluent liquid. The enhanced beverage diluent liquid can be mixed with at least one of a second micro ingredient to form the beverage. The beverage from the beverage making machine can be dispensed into a vessel.

Resultant in this embodiment is that, as the beverage leaves the higher pressure environment of the dissolver 104 and enters standard atmospheric conditions of the vessel 118, the enhanced beverage diluent liquid causes the gas 704 to be retained in the beverage in higher concentration, instead of being more easily released to the atmosphere, such that the volumes of the gas 704 in the beverage, after dispense, is increased versus having dissolved the gas 704 into the beverage diluent liquid only.

Figure 30A:
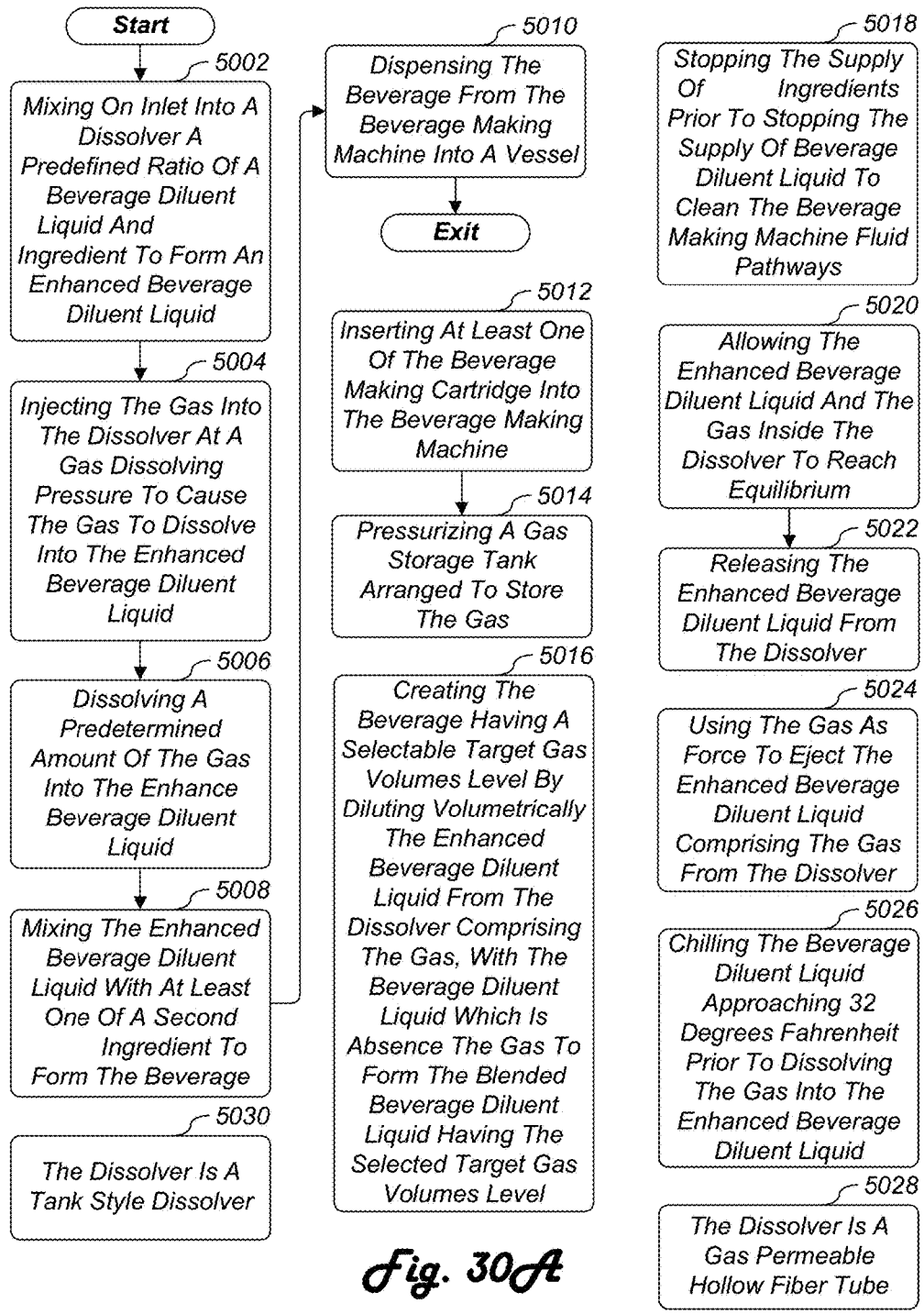
FIGS. 30A-B illustrates examples of methods of increasing the retained volume of gas in the beverage after dispense into a vessel, by mixing a beverage diluent liquid with at least one of a micro ingredient to form an enhanced beverage diluent liquid.
Figure 30B:
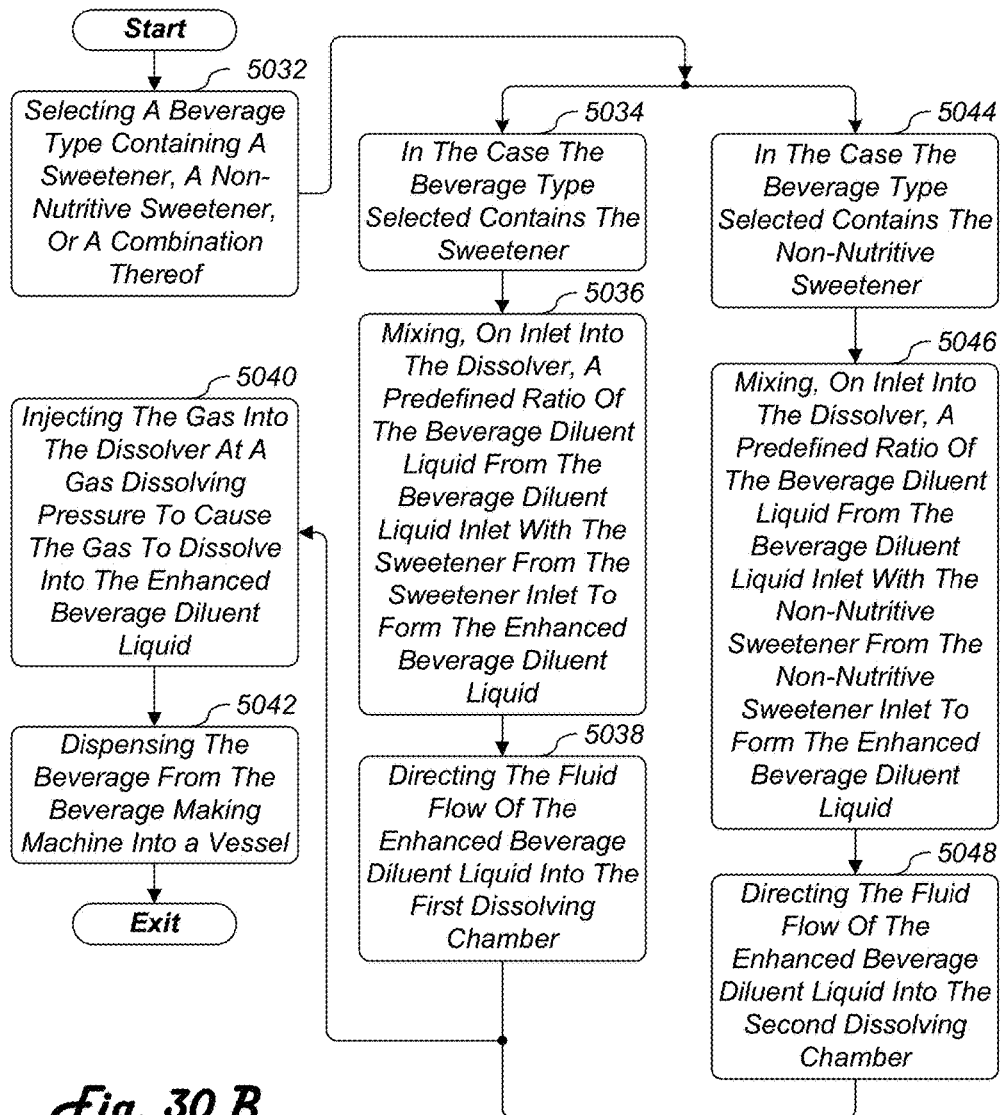

In another exemplary embodiment, with reference to at least FIG. 12, reference label 'B' and at least FIGS. 30A-B, a beverage making machine 100 for making a beverage that has an increased retained volume of gas in the beverage, after dispense, into a vessel 118, can be effectuated by mixing a beverage diluent liquid 702 with at least ones of a micro ingredient, either sweetener 214A and/or non-nutritive sweetener 214B in this embodiment, to form an enhanced beverage diluent liquid. The gas 704 can then be dissolved into the enhanced beverage diluent liquid. When compared to dissolving the gas into the beverage diluent liquid only, the enhanced beverage diluent liquid can exhibit a higher volume of dissolved gas.

In operation, in this embodiment, the beverage making machine 100 can comprise at least one of a micro ingredient receptacle for receiving a beverage making cartridge comprising at least one of a micro ingredient, a beverage diluent receptacle 102 for supplying a beverage diluent liquid 702, a gas storage tank 108 for supplying a gas 704, and a dissolver 104 comprising a gas inlet 156, a sweetener inlet 164, a non-nutritive sweetener inlet 166, a beverage diluent liquid inlet 154, at least a first dissolving chamber 152B, and a second dissolving chamber 152D, each having an inlet end 168 for receiving the sweetener 214A, the non-nutritive sweetener 214B and the beverage diluent liquid 702, and an outlet end 170 where the sweetener 214A, the non-nutritive sweetener 214B, the beverage diluent liquid 702, and combinations thereof can exit the chamber, each of the first dissolving chamber 152B and second dissolving chamber 152D is partitioned with a partition 162, which is arranged to prevent mixing between the first dissolving chamber 152B and second dissolving chamber 152D, each of the first dissolving chamber 152B and the second dissolving chamber 152D are also arranged to allow the gas 704 supplied, from the gas inlet 156, to permeate liquids in each of the first dissolving chamber 152B and the second dissolving chamber 152D.

Continuing in this exemplary embodiment, a computer control 122 can be used to effectuate the making of a beverage. In this regard, the computer control 122 can comprise a computer readable medium 172 encoded with instructions for selecting a beverage type containing a sweetener 214A, a non-nutritive sweetener 214B, or a combination thereof, wherein two of the micro ingredient can be the sweetener 214A and the non-nutritive sweetener 214B. Based on the beverage type selection, a first and/or second case can follow.

In a first case, if the beverage type selected contains the sweetener 214 then on inlet into the dissolver 104 a predefined ratio of a beverage diluent liquid 702, from the beverage diluent inlet 154 and the sweetener 214A, from the sweetener inlet 164 can be mixed to form the enhanced beverage diluent liquid. Fluid flow can then direct the enhanced beverage diluent liquid through the first dissolving chamber 152B. The gas can be injected into the dissolver 104, by way of gas inlet 156, at a gas dissolving pressure to cause the gas to dissolve into the enhanced beverage diluent liquid. The beverage can then exit the dissolver proximate the outlet end 170, by way of outlet 158, and optionally mixed further with other micro ingredients and ultimately dispensed into the vessel 118.

In a second case, if the beverage type selected contains the non-nutritive sweetener 214B, then on inlet to the dissolver 104 a predefined ratio of a beverage diluent liquid 702, from the beverage diluent inlet 154 and the non-nutritive sweetener 214B, from the non-nutritive sweetener inlet 166 can be mixed to form the enhanced beverage diluent liquid. Fluid flow can then direct the enhanced beverage diluent liquid through the second dissolving chamber 152D. The gas can be injected into the dissolver 104, by way of gas inlet 156, at a gas dissolving pressure to cause the gas to dissolve into the enhanced beverage diluent liquid. The beverage can then exit the dissolver proximate the outlet end 170, by way of outlet 158, and optionally be mixed further with other micro ingredients and ultimately dispensed into the vessel 118.

Resultant in this embodiment is that, as the beverage leaves the higher pressure environment of the dissolver 104 and enters standard atmospheric conditions of the vessel 118, the enhanced beverage diluent liquid causes the gas 704 to be retained in the beverage in higher concentration, instead of being more easily released to the atmosphere, such that the volumes of the gas in the beverage, after dispense, is increased versus having dissolved the gas 704 into the beverage diluent liquid only.

The dissolver 104 can further comprise a third dissolving chamber 152C for dissolving gas 704 into the beverage diluent liquid 702 only, the third dissolving chamber 152C also having the inlet end 168 and the outlet end 170 and is partitioned, by a partition 162, and arranged to prevent mixing between the first dissolving chamber 152B, the second dissolving chamber 152D, and the third dissolving chamber 152C is arranged to allow the gas 704 supplied, from the gas inlet 156, to permeate liquids in the third dissolving chamber 152C.

Figure 13:
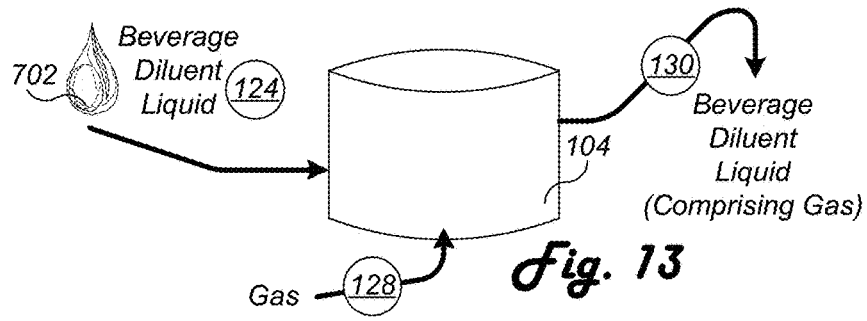
FIG. 13 illustrates one example of dissolving the gas into the beverage diluent liquid, by way of a tank style dissolver.

Referring to FIG. 13 there is illustrated one example of dissolving gas into the beverage diluent liquid 702, by way of a tank style dissolver 104. In an exemplary embodiment, the beverage diluent liquid 702 can enter a dissolver 104 tank. The tank can be sized for convenient capacities and as necessary to support the demand of consumer's making quantities of beverages, from the beverage making machine 100, over a predetermined time period. As example, maybe an eight to thirty two ounce tank is suitable for home and office use, whereas maybe a thirty two to sixty four or one hundred twenty eight ounce tank is suitable for quick service restaurants.

Once the beverage diluent liquid is in the tank, the gas under pressure can be injected and dissolved into the beverage diluent liquid. A brief time period is allowed so that the beverage diluent liquid and the gas inside the tank dissolve into one another and reach equilibrium. The brief time period can range from a few seconds to minutes depending on factors such as beverage diluent liquid volume and temperature, gas pressure, desired volumes of gas diffused into the beverage diluent liquid, surface area of the gas liquid interface and/or other factors and dependent on the particular embodiment and beverage forming requirements. After equilibrium is reached, the beverage diluent liquid can be released from the tank, the dissolver 104, and used in beverage forming.

Other types of sensors, such as level sensors, and carbonation level sensors can be used with the tank style dissolvers. In addition, a refrigerator can be used to chill the beverage diluent liquid inside and/or outside the dissolver 104 tank. Other embodiments can also include vents to release gas in dissolver 104 tank over pressure situations, dip tubes to draw the beverage diluent out of the tank, by way of the top of the tank, by removing the liquid from the bottom first. Furthermore, aerators, recirculation pumps, and other devices can also be used in specific embodiments to improve the performance of the tank style dissolver 104, as may be required and/or desire in a particular embodiment.

For disclosure purposes the gas permeable hollow fiber tube style dissolver 104 of at least FIG. 12 and the tank style dissolver 104 of at least FIG. 13 are just two examples of dissolvers 104. In this regard, other types and kids of dissolvers 104 can be configured and implemented, as may be required and/or desired in a particular embodiment.

Figure 14:
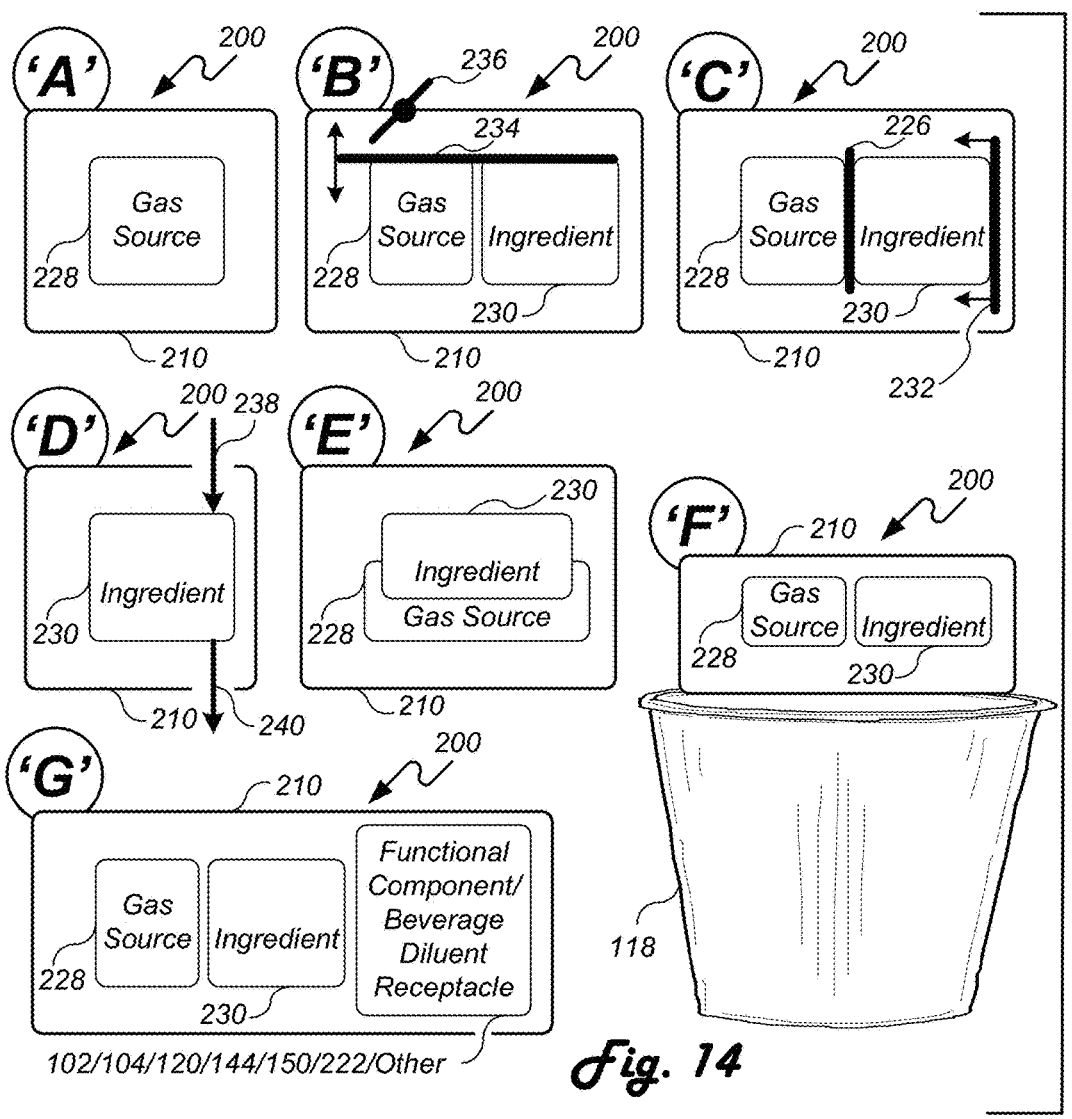
FIG. 14 illustrates examples of different beverage making cartridge configurations, for use in a beverage making machine for forming a beverage.

Referring to FIG. 14 there are illustrated examples of different beverage making cartridge 200 configurations, for use by a beverage making machine 100 in forming a beverage. In an exemplary embodiment, for example and not a limitation, there can be numerous combinations of the solid gas source 202 with micro ingredients 214, and with different functional components, such as with dissolver 104 (illustrated in at least FIGS. 19-23), that form the functional design of the beverage making cartridge 200.

Beverage making cartridge 200 can even include a beverage diluent receptacle 102 for holding the beverage diluent liquid 702. Such feature being particularly useful when it is desired to remove the beverage making 200 cartridge from the beverage making machine 100 and store the cartridge in a refrigerated appliance, such as refrigerated appliance 402 (illustrated in at least FIG. 10). Furthermore, fluid handling components 144 (illustrated in at least FIGS. 19-20 and 22-23), mixers 150, and beverage diluent filters 222 can be integrated into the design of a particular beverage making cartridge 200, as may be required and/or desired in a particular embodiment.

Several of the embodiments are mentioned below; however for disclosure purposes these are but a few examples of the numerous combinations that can be rendered in the context of the present invention.

Use of the term 'gas source portion' or 'gas source portion 228', in the present invention, is intended to mean the portion of the beverage making cartridge 200 that has been sectioned off or otherwise dedicated to housing the solid gas source 202. Such sectioning off can include relative position in a beverage making cartridge 200, a physical barrier through which entry and exit are controlled, sealed areas and/or sterile areas to keep contaminates from infiltrating, and/or other similar constructs in the spirit of being able to locate the solid gas source 202 in a particular location, within the beverage making cartridge 200, and interface the gas source portion 228 and solid gas source 202 to operate with the beverage making machine 100 and deliver the desired outcome of being able to make beverages.

Use of the term 'micro ingredient portion' or 'micro ingredient portion 230', in the present invention, is intended to mean the portion of the beverage making cartridge 200 that has been sectioned off or otherwise dedicated to housing the micro ingredient 214. Such sectioning off can include relative position in a beverage making cartridge 200, a physical barrier through which entry and exit are controlled, sealed areas and/or sterile areas to keep contaminates from infiltrating, and/or other similar constructs in the spirit of being able to locate the micro ingredient 214 in a particular location, within the beverage making cartridge 200, and interface the micro ingredient portion 230 and micro ingredient 214 to operate with the beverage making machine 100 and deliver the desired outcome of being able to make beverages.

Illustrated in at least FIG. 14 are several beverage making cartridge exemplary embodiments that utilize a solid gas source, a micro ingredient, or both. The functionality of the various cartridge configurations 'A'-'G' can be interchangeable to form other unique cartridge combinations, as may be required and/or desired in a particular embodiment. Additionally, the cartridge combinations and their permutations, in at least FIGS. 5, 14, 19-23, can be combined with more or less of the shown elements and functionality to form other cartridge combination. Furthermore, the cartridge combinations and their permutations, in at least FIGS. 5, 14, 19-23, can be combined with other Figures, concepts, and teachings in the present invention to form yet other combinations of unique beverage making cartridge designs and/or functionality, as may be required and/or desired in a particular embodiment.

With reference to reference label 'A', in an exemplary embodiment a beverage making cartridge 200, for use by a beverage making machine 100, in forming a beverage, can comprise a beverage making cartridge enclosure 210, which comprises a gas source portion 228 comprising a solid gas source 202, that through sublimation, emits a gas to be dissolved in a beverage diluent liquid 702. Furthermore, the beverage making cartridge enclosure 210 can comprise a one-way vent arranged to allow the gas to escape from the gas source portion while keeping the gas source portion sterile.

With reference to reference label 'B', without the movable part 234 and without lock element 236, in an exemplary embodiment a beverage making cartridge 200, for use by a beverage making machine 100, in forming a beverage, can comprise a beverage making cartridge enclosure 210, which comprises a gas source portion 202 comprising a solid gas source 202, that through sublimation, emits a gas to be dissolved in a beverage diluent liquid and a micro ingredient portion comprising a micro ingredient 214, the micro ingredient 214 is dispensed and mixed in a pre-defined volumetric ratio of the beverage diluent liquid to form a beverage.

Additional embodiments can include, but are not limited to, the beverage making cartridge can further comprise a wall 232 that is movable to force the micro ingredient 214 to exit the micro ingredient portion. In addition, the micro ingredient portion can further comprise a fluid handler 144 through which the micro ingredient 214 can be extracted from the micro ingredient portion.

In other embodiments, the gas source portion and the micro ingredient portion can be arranged to prevent the gas source from contacting the portions of the beverage diluent liquid and the micro ingredient 214 used to form the beverage. In addition, the gas source portion can further comprise a carbonation gas and an aroma enhancing gas. In an exemplary embodiment, the carbonation gas can be carbon dioxide (CO2), nitrogen, oxygen, an inert gas, or other types and kinds of gas, as may be required and/or desired in a particular embodiment. Furthermore, the beverage making cartridge enclosure 210 can further comprise a one-way vent 204 arranged to allow the gas to escape from the gas source portion while keeping the gas source portion sterile.

With reference to reference label 'C', in another exemplary embodiment, a beverage making cartridge 200, for use by a beverage making machine 100, in forming a beverage can comprise a beverage making cartridge enclosure 210 which can further comprise a gas source portion 202 and a micro ingredient portion 214 that are attached together and separated by an impermeable barrier 226, the gas source portion comprising a solid gas source 202, that through sublimation emits a gas to be dissolved in a beverage diluent liquid 702, the micro ingredient portion 230 comprising a micro ingredient and comprising a wall 232 that is movable to force the micro ingredient to exit the micro ingredient portion, the micro ingredient is dispensed and mixed in a pre-defined volumetric ratio with the beverage diluent liquid to form a beverage.

With reference to reference labels 'C' and 'E', in another exemplary embodiment, a beverage making cartridge 200, for use by a beverage making machine, in forming a beverage can comprise, as illustrated in reference label 'C', a gas source portion 228 and a micro ingredient portion 230, which are attached together and separated from each other by an impermeable barrier 226, the gas source portion 228 further comprising a solid gas source 202, that through sublimation emits a gas to be dissolved in a beverage diluent liquid 702, the micro ingredient portion comprising a micro ingredient 214, the beverage making cartridge 200 having a plane, as better illustrated in reference label 'E' where the gas source portion 228 is located below the plane and the micro ingredient portion 230 is located above the plane, wherein the gas source portion 228 is arranged to interact with the beverage making machine 100 to dissolve the gas into the beverage diluent liquid 702 and the micro ingredient portion 230 is arranged to interact with the beverage making machine 100 to provide the micro ingredient 214 for mixing with the beverage diluent liquid 702, the gas source portion 228 and the micro ingredient portion 230 are arranged to prevent the solid gas source 202 from contacting portions of the beverage diluent liquid 702 and the micro ingredient 214 which are used to form a beverage, the micro ingredient 214 is dispensed and mixed in a pre-defined volumetric ratio with the beverage diluent liquid 702 to form a beverage.

With reference to reference label 'D', in an exemplary embodiment, a beverage making cartridge 200, for use by a beverage making machine 100 in forming a beverage can comprise a beverage making cartridge enclosure 210 further comprising a micro ingredient portion 230 which comprises a micro ingredient 214. The micro ingredient 214 being dispensed and mixed with the beverage diluent liquid (with or without gas infusion) to form the beverage in a vessel 118. The micro ingredient portion 228 can further comprise an inlet port 238 through which beverage diluent liquid 702 (with or without gas infusion) can enter the micro ingredient portion 228 and mix with the micro ingredient 214. Furthermore, the micro ingredient portion 228 can further comprise an outlet port 240 through which beverage diluent liquid 702 (with or without gas infusion) can exit the micro ingredient portion 228 after mixing with the micro ingredient 214.

With reference to reference label 'E', in an exemplary embodiment a beverage making cartridge 200 for forming a beverage, can comprise a beverage making cartridge enclosure 210, which comprises a gas source portion 228 and a micro ingredient portion 230, that are separated from each other, the gas source portion 228 partially surrounding the micro ingredient portion 230 and comprising a solid gas source 202 for emitting a gas to be dissolved in a beverage diluent liquid 702, the micro ingredient portion 230 comprising a micro ingredient 214, the gas source portion 228, and the micro ingredient portion 230 are arranged to prevent the solid gas source 202 from contacting portions of the beverage diluent liquid 702 and the micro ingredient 214 which are used to form a beverage, the micro ingredient 214 is dispensed and mixed in a pre-defined volumetric ratio, with the beverage diluent liquid 702, to form the beverage.

With reference to reference label 'F', in an exemplary embodiment a beverage making cartridge 200, for forming a beverage, can comprise a beverage making cartridge enclosure 210, which comprises a gas source portion 228, a micro ingredient portion 230 and vessel portion 118 that are separated from each other, the gas source portion 228 comprising a solid gas source 202 for emitting a gas to be dissolved in a beverage diluent liquid 702, the micro ingredient portion 230 comprising a micro ingredient 214, and the vessel portion 118 arranged to receive the micro ingredient 214 from the micro ingredient portion 230 and receive the beverage diluent liquid 702, the gas source portion 228 and the micro ingredient portion 230 are arranged to prevent the solid gas source 202 from contacting portions of the beverage diluent liquid 702 and the micro ingredient 214 which are used in the vessel portion 118 to form a beverage, the micro ingredient 214 is dispensed and mixed in a pre-defined volumetric ratio with the beverage diluent liquid 702 to form a beverage.

With reference to reference label 'G', in an exemplary embodiment, a beverage making cartridge 200, for forming a beverage, can comprise a beverage making cartridge enclosure 210, which comprises a gas source portion 228, a micro ingredient portion 230, and at least one of a beverage diluent liquid receptacle 102, a dissolver 104, a dispenser 120, fluid handling components 144, mixer 150, beverage diluent filter 222, (further illustrated in at least FIGS. 5 and 19-23), and/or other types and kinds of functional components, as may be required and/or desired in a particular embodiment. The gas source portion 228 comprising a solid gas source 202 for emitting a gas to be dissolved in a beverage diluent liquid 702, and the micro ingredient portion 230 comprising a micro ingredient 214. The gas source portion 228 and the micro ingredient portion 230 are arranged to prevent the solid gas source 202 from contacting portions of the beverage diluent liquid 702 and the micro ingredient 214 used to form a beverage, the micro ingredient 214 is dispensed and mixed in a pre-defined volumetric ratio with the beverage diluent liquid 702 (with or without gas infusion) to form a beverage.

With reference to reference label 'B' with the movable part 234 and without lock element 236, in an exemplary embodiment a beverage making cartridge 200 for forming a beverage can comprise a beverage making cartridge enclosure 210 comprising a gas storage portion 228 and a micro ingredient portion 230 that are separated from each other, the gas source portion 228 comprising a solid gas source 202 for emitting a gas to be dissolved in a beverage diluent liquid 702, the micro ingredient portion 230 further comprising a micro ingredient 214, for use in mixing, with the beverage diluent liquid 702 to form a beverage, the gas source portion 228 and micro ingredient portion 230 being closed to an external environment. A movable part 234 is attached to the beverage making cartridge enclosure 210, the movable part 234 being movable relative to the beverage making cartridge enclosure 210 to open the gas source portion 228 and/or the micro ingredient portion 230 for emission of gas from the gas source portion 228, and/or for introducing a beverage diluent liquid 702 into or permitting the micro ingredient 214 to exit the micro ingredient portion 230, the gas source portion 228 and micro ingredient portion 230 are arranged to prevent the solid gas source 202 from contacting portions of the beverage diluent liquid 702 and the micro ingredient 214 which are used to form the beverage, the micro ingredient 214 is dispensed and mixed in a pre-defined volumetric ratio with the beverage diluent liquid 702 to form a beverage.

With reference to reference label 'B' with the movable part 234 and lock element 236, in an exemplary embodiment a beverage making cartridge 200 for forming a beverage can comprise a beverage making cartridge enclosure 210 comprising a gas source portion 228 and a micro ingredient portion 230 that are separated from each other, the gas source portion 230 comprising a solid gas source 202 for emitting a gas to be dissolved in a beverage diluent liquid 702, the micro ingredient portion 230 comprising a micro ingredient 214, the gas source portion 228 and the micro ingredient portion 230 are arranged to prevent the solid gas source 202 from contacting portions of the beverage diluent liquid 702 and the micro ingredient 214 which are used to form the beverage. A movable part 234 attached to the beverage making cartridge enclosure, the movable part 234 being movable relative to the beverage making cartridge enclosure 210 to configure the beverage making cartridge 220 for use in forming the beverage, and a lock element 236 that prevents movement of the movable part 234 to configure the beverage making cartridge 200 for use in forming the beverage, the lock element 236 being releasable by a user.

With reference to reference label 'F', in an exemplary embodiment, a beverage making cartridge 200, for forming a beverage, can comprise a beverage making cartridge enclosure 210 comprising a gas source portion 228, a micro ingredient portion 230 and a vessel portion 218 that are separated from each other, the gas source portion 228 compromising a solid gas source 202 for emitting a gas to be dissolved in a beverage diluent liquid 702, the micro ingredient portion 230 comprising a micro ingredient 214 for use in mixing with the beverage diluent liquid 702 to form a beverage, and the vessel portion 118 arranged to receive the micro ingredient 214 from the micro ingredient portion 214 and receive the beverage diluent liquid to mix the beverage diluent liquid with the micro ingredient 214, the gas source portion 228, the micro ingredient portion 230 and the vessel portion 118 are arranged to prevent the solid gas source 202 from contacting the portions of the beverage diluent liquid 702 and the micro ingredient 214 which are used to form the beverage, wherein the beverage making cartridge 200 is arranged to receive a first portion of the beverage diluent liquid into the micro ingredient portion 230 to mix with the micro ingredient 214 so that the mixed beverage diluent liquid and micro ingredient 214 enters the vessel portion 118, and the beverage making cartridge 200 is arranged to receive a second portion of the beverage diluent liquid 702 directly into the vessel portion 118 for mixing with the mixed first portion of the beverage diluent liquid and the micro ingredient in the vessel portion 118.

With reference to reference label 'B' without the movable part 234 and without lock element 236, in an exemplary embodiment a beverage making cartridge 200 for forming a beverage can comprise a beverage making cartridge enclosure 210 comprising a gas source portion 228 and a micro ingredient portion 230 that are separated from each other, the gas source portion 228 comprising a solid gas source 202 for emitting a gas through a one way vent 204 of the beverage making cartridge enclosure 210 to be dissolved in a beverage diluent liquid 702, the micro ingredient portion 230 comprising a micro ingredient 214 for mixing with the diluent liquid to form a beverage, the micro ingredient 214 exiting the beverage making cartridge enclosure 210 by way of a micro ingredient outlet 240, as reference in reference label 'D', wherein the one way valve 204 illustrated in at least FIG. 1B and the micro ingredient outlet 240, as reference in reference label 'D', are located on a same side of the beverage making cartridge enclosure, the gas source portion 228 and the micro ingredient portion 230 are arranged to prevent the solid gas source 202 from contacting the portions of the beverage diluent liquid 702 and the micro ingredient 214 that form the beverage.

With reference to reference label 'B' without the movable part 234 and without lock element 236, in an exemplary embodiment a beverage making cartridge 200 for forming a beverage can comprise a beverage making cartridge enclosure 210 comprising a gas source portion 228 and a micro ingredient portion 230 that are separated from each other, the gas source portion 228 comprising a solid gas source 202 for emitting a gas to be dissolved in a beverage diluent liquid 702, the micro ingredient portion 230 comprising a micro ingredient 214 for use in mixing with the beverage diluent liquid 702 to form a beverage, the micro ingredient portion 230 comprising an outlet 240, as reference in reference label 'D', through which the micro ingredient 214 exits the micro ingredient portion 230, wherein the gas source portion 228 is movable relative to the micro ingredient portion 230 to force the micro ingredient 214 to exit the micro ingredient portion 230 through the outlet 240, as reference in reference label 'D', of the micro ingredient portion, the gas source portion 228 and the micro ingredient portion 230 are arranged to prevent the gas source 202 from contacting the portions of the beverage diluent liquid and the micro ingredient 214 that form the beverage.

Figure 15A:
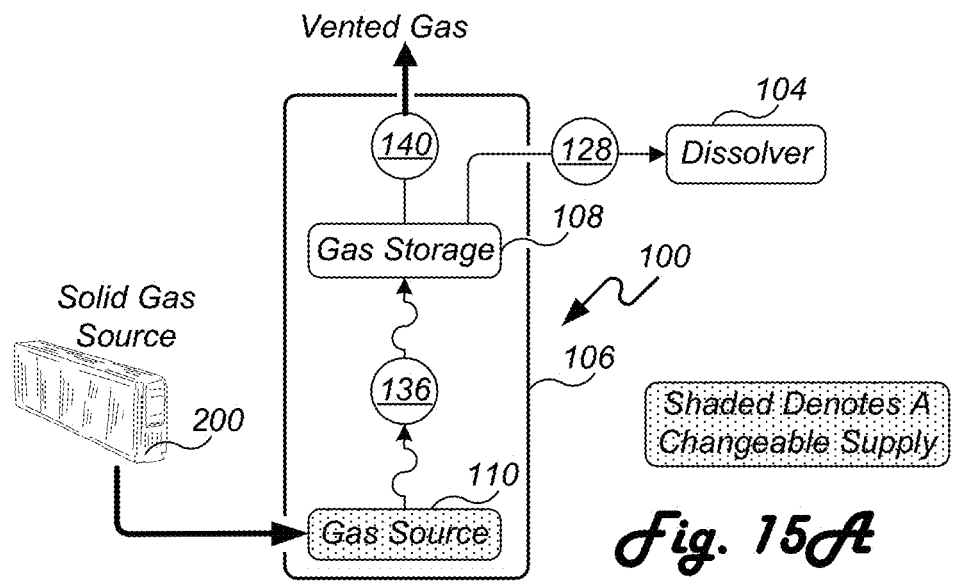
FIGS. 15A-B illustrate examples of a gas generation and storage system.
Figure 15B:
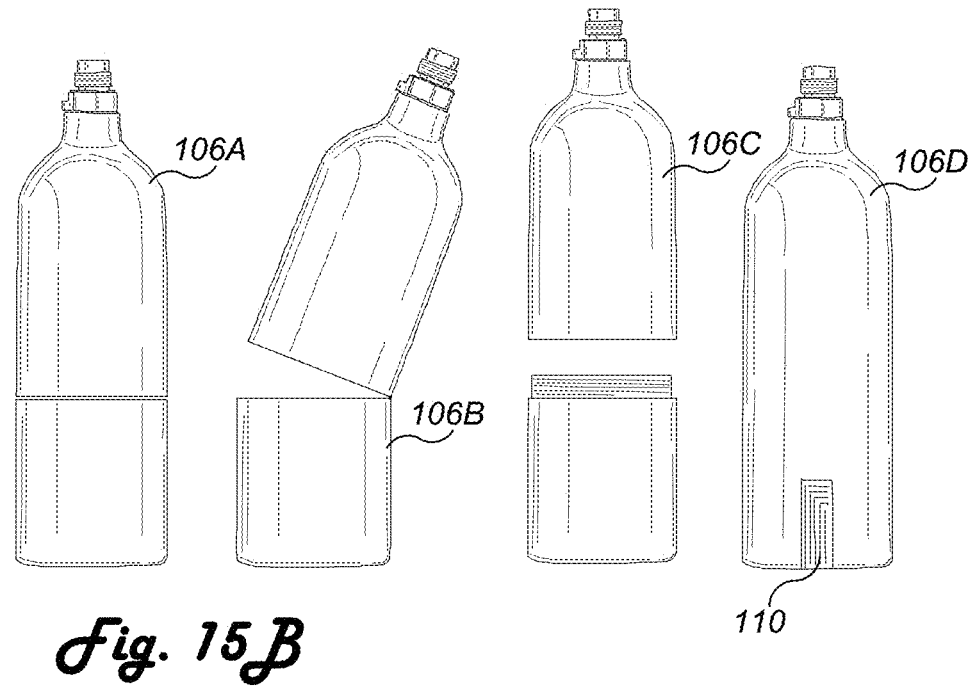

Referring to FIGS. 15A-B there are illustrated examples of a gas generation and storage system 106. With reference to FIG. 15A, in an exemplary embodiment, a beverage making cartridge 200 comprising at least a solid gas source 202 or an aroma enhance solid gas source 202B inside, as illustrated in at least FIGS. 1A-B and 3, can be inserted or otherwise interlocked into place, within a beverage making cartridge receptacle 110. A series of pumps, mixers, valves, and/or regulators 136 and 128, which can also be referred to as the gas transfer system 128 and 136, can be arranged to receive the emitted gas 704 from the interlocked beverage making cartridge 200, by way of the beverage making cartridge receptacle 110, and proceed to transfer the gas storage tank 108. The emitted gas 704 pressure from the beverage making cartridge 200 comprising the solid gas source is typically not much more than standard atmospheric pressure and is somewhat regulated and determined by the selection of the venting parameters of the sterile one-way vent 204, and other considerations; however the pressures in the gas storage tank 108 can reach upwards of several hundred pounds per square inch and is a pressure that is really only limited by the gas storage tank vessel limits and the capability to transfer the emitted gas 704 from low pressure to storage tank higher pressure environments, by way of gas transfer system 136.

In an exemplary embodiment, for example and not a limitation, a beverage making cartridge 200 could contain several ounces of a solid gas, such as frozen carbon dioxide (dry-ice), after sublimation a storage tank having received the emitted gas 704 could be pressurized with enough gas for many liters of gas infused beverage product. An 'ounces-of-dry-ice-to-liters-of-beverage-product' determination can vary on a number of factors including dissolver 104 technology and techniques, properties of the beverage diluent liquid 702, efficiency of sublimation and gas transfer and final beverage gas infused volumes of gas preference, as well as other types and kinds of factors, as may be desired and/or required in a particular embodiment.

A gas transfer system 128, which can comprise pumps, mixers, valves, and/or regulators, can control the supply of gas and pressure level maintained within the dissolver 104. To avoid over pressure conditions, within the gas storage tank 108, pumps, valves, mixers, and/or regulators 140 can be arranged to vent the gas in an over pressure conditions, thus holding the tank at a predetermined upper gas pressure limit.

For disclosure purposes the shaded blocks in at least FIGS. 7-8 and 15A-16 denote a changeable supply, ingredient, or functional device (such as filer 222). In an exemplary embodiment, for example and not a limitation, such a changeable supply can preferably be a beverage making cartridge that can be interchanged to resupply the beverage making machine with solid gas sources, micro ingredients, filters, and/or other types and kinds of changeable supplies, as may be required and/or desired in a particular embodiment.

Referring to FIG. 15B there are illustrated exemplary embodiments of the gas storage system 106A-D. In an exemplary embodiment, a gas storage system 106A can be a tank configuration and/or style. Such a tank configuration and/or style can be an openable tank, for receiving the solid gas 202, and allowing the solid gas source 202 to sublimate, emitting a gas, which pressurize the gas within an internal tank 108 portion. The gas storage system 106 tank configurations and/or styles can then be used in beverage dispensing system 100, of the present invention, to be used to infuse the pressurized gas into beverage diluent to form gas infused beverages 118.

One such tank configuration can be separable tank halves, such as illustrated in gas storage system 106A. Another configuration can be a hinged tank halves, such as illustrated in gas storage system 106B. Yet another configuration can be screwable threaded tank halves, such as illustrated in gas storage system 106C. Furthermore, a tank configuration can comprise a beverage making cartridge receptacle 110, for receiving a beverage making cartridge 210, such as illustrated in gas storage system 106D, or other similar type, kind or combination of gas storage system 106A-D, as may be required and/or desired in a particular embodiment.

In embodiments where the gas storage system comprises separable, hinged, or otherwise openable halves the solid gas source 202, in a beverage making cartridge 210 or otherwise, can be inserted into the gas storage system. The tank halves can then be interlocked together, sealing the solid gas 202 inside in a manner that allows the sublimation of the solid gas source 202 emitting a gas 704 to pressurize the gas tank 108 portion of the gas storage system. In a similar manner, in the embodiments wherein a beverage making cartridge receptacle 110 provides access to an interconnect with a beverage making cartridge 210, which contains at least a solid gas source 202, the solid gas source can be allowed to sublimate, emitting a gas 704, which pressurizes the gas tank 108 portion of the gas storage system 106D.

Figure 16:
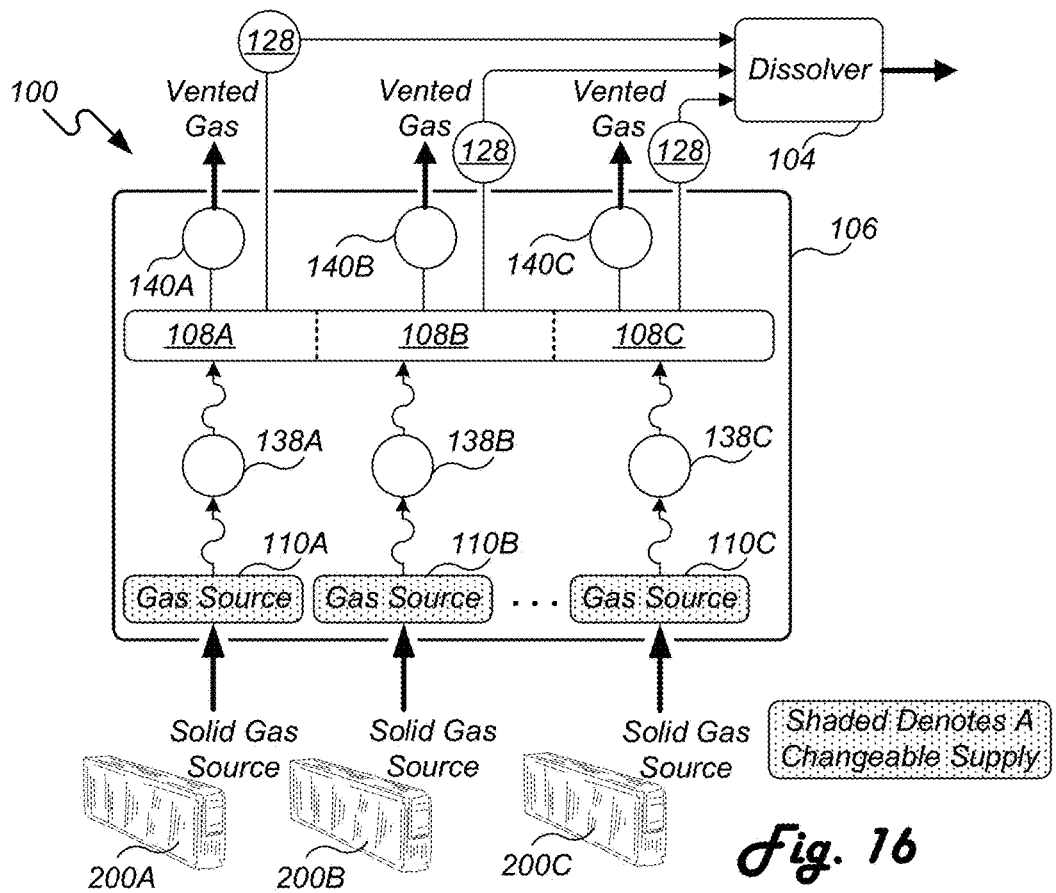
FIG. 16 illustrates one example of a gas generation and storage system having multiple gas storage portions.

Referring to FIG. 16 there is illustrated one example of a gas generation and storage system 106 having multiple gas storage portions 108A-C. In an exemplary embodiment, at least one of a beverage making cartridge 200 having at least one of a solid gas source or an aroma enhance solid gas source inside, as illustrated in at least FIGS. 1A-B and 3. The beverage making cartridge 200 can be inserted into or otherwise interlocked in place, within a beverage making cartridge receptacle 110A-C. In this exemplary embodiment, a variety of different kinds of gasses 704, if desired can be used in beverage making machine 100. In this regard, different kinds of aroma enhanced gases can be used to aroma enhance beverages. At least FIG. 3 illustrates these features. As example, such aroma vapor could be tea aroma when tea leaves, as an ingredient, are brewed or coffee aroma when coffee, as an ingredient, is brewed or fresh squeezed citrus aroma when being squeezed or citrus is processed to extract aroma or other types and kinds of aroma when brewing, fermenting, squeezing, or other preparation process is used with other ingredients. To prevent aroma carryover from gas to gas and beverage to beverage, the different aroma enhanced gases must be kept separate so that they don't mix.

FIG. 16 illustrates one example of how different aroma enhanced gas sources, in beverage making cartridges 200A-C, can be inserted into different beverage making cartridge gas source receptacles 110A-C and transfer the different aroma enhanced gasses to a storage tank 108A-C, wherein 108A, 108B, and 108C are different sections within the gas storage tank, sectioned off specifically for holding different aroma enhanced gases and preventing them from mixing.

A gas transfer system 138A-C can be arranged to receive the emitted gas 704, from the interlocked beverage making cartridge 200A-C, by way of the beverage making cartridge receptacle 110A-C, and proceed to transfer the gases to separate storage tank portions 108A-C. In an exemplary embodiment, the emitted gas 704 pressure, from the beverage making cartridges 200A-C, from the solid gas sources, is typically not much more than standard atmospheric pressure and is somewhat regulated and determined by the selection of the venting parameters of the sterile one-way vent 204; however the pressures in the storage tank can reach upwards of several hundred pounds per square inch and is really only limited by the gas storage tank vessel limits and the capability of the gas transfer system 138A-C to transfer the emitted gas 704 from low pressure to storage tank higher pressure environments.

In an exemplary embodiment, for example and not a limitation, a beverage making cartridge 200 could contain two to three ounces of a solid gas, such as frozen carbon dioxide (dry-ice), after sublimation a storage tank having received the emitted gas 704 could be pressurized with enough gas for many liters of gas infused beverage product. An 'ounces-of-dry-ice-to-liters-of-beverage-product' determination can vary on a number of factors including dissolver 104 technology and techniques, properties of the beverage diluent liquid 702, efficiency of sublimation and gas transfer and final beverage gas infused volumes of gas preference, as well as other types and kinds of factors, as may be desired and/or required in a particular embodiment.

A pump, valve, mixer, and/or regulator 128A-C, also referred to as gas transfer system 128A-C, can control the supply of gas and pressure level maintained within the dissolver 104. To avoid over pressure conditions, within the gas storage tank sections 108A-C, pumps, valves, mixers, and/or regulators 140A-C can be arranged to vent the gas in over pressure conditions, thus holding the tank at a predetermined upper gas pressure limit.

The term "upper gas pressure limit", in the present invention, is intended to mean the desired highest pressure level allowed in the gas storage tank 108 also referred to as 108A-C in at least FIG. 16. This is the maximum pounds per square inch (psi) or other convenient unit of measure, at which all excess gas pressure will be vented out of the gas storage tank to keep the gas storage tank safe and at no more than the upper gas pressure limit. The primary purpose for setting a maximum pressure is safety, but satisfactory system operation is also a factor to consider.

Figure 17:
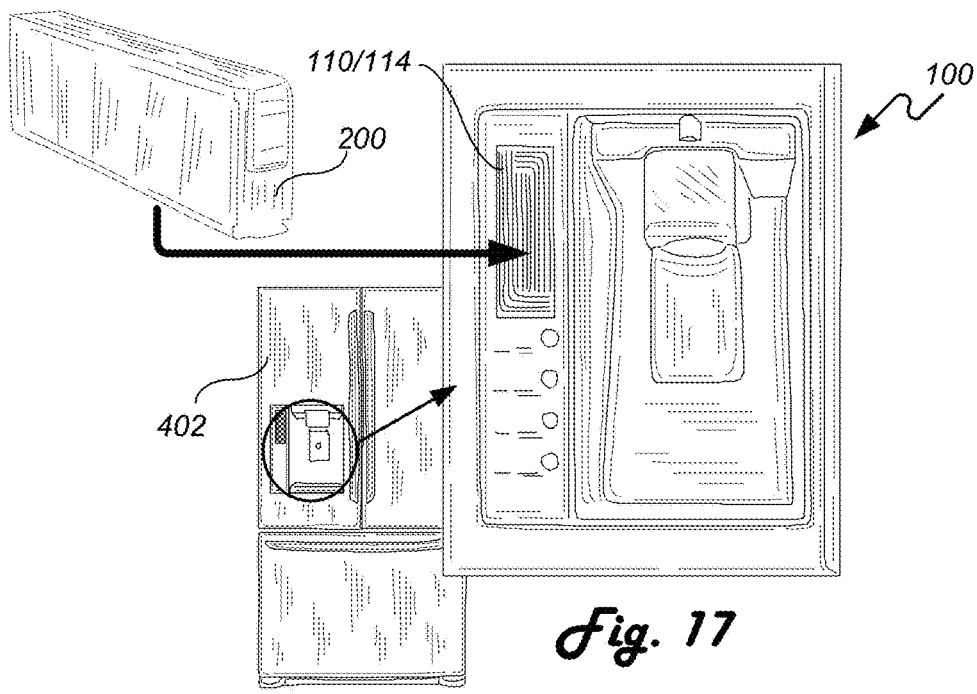
FIG. 17 illustrates one example of a domestic appliance having a beverage making machine, which utilizes at least one of a beverage making cartridge.

Referring to FIG. 17 there is illustrated one example of a refrigerated appliance 402 having a beverage making machine 100 embedded. The embedded beverage making machine 100 utilizes at least one of a beverage making cartridge 200 to make a beverage. In an exemplary embodiment, for example and not a limitation, a beverage making cartridge 200 can be inserted into or otherwise interlocked in a beverage making dispense 100 by way of beverage making cartridge receptacle 110/114. For clarification, beverage making cartridge receptacle 110 is illustrated in at least FIG. 7 as a receptacle for receiving a solid gas source cartridge and beverage making cartridge receptacle 114 is shown as a receptacle for receiving micro ingredient. In the exemplary embodiment illustrated in FIG. 17 the beverage making cartridge receptacle 110/114 can be a beverage making cartridge 200 gas cartridge or a beverage making cartridge 200 micro ingredient cartridge or a beverage making cartridge 200 with both at least one of a solid gas and at least one of a micro ingredient in the same beverage making cartridge 200. Once the beverage making cartridge 200 has been installed, the system and methods of the present invention can be used to make gas infused and non-gas infused beverages, with and without aroma enhancement.

Figure 18:
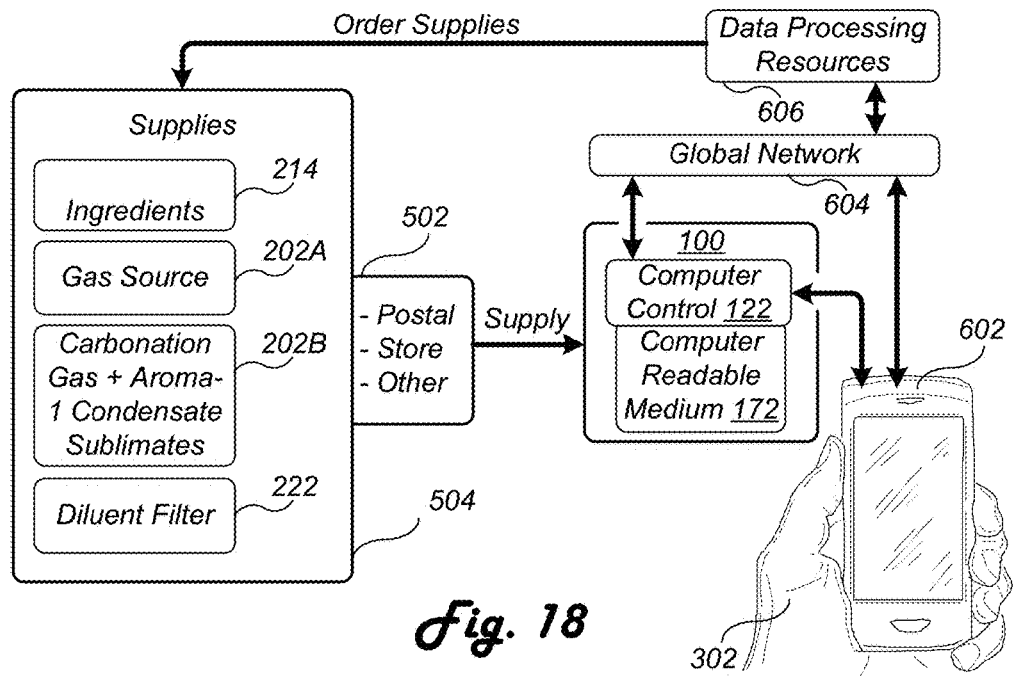
FIG. 18 illustrates one example of a method of supplying a beverage making machine with beverage making cartridges.

Referring to FIG. 18 there is illustrated one example of a method of supplying a beverage making machine 100 with beverage making cartridges 200. In an exemplary embodiment, the beverage making machine 100 can data communicate by way of a computer control, such as computer control 122 or other types and/or kinds of computer control across a global network 604 with data processing resources 606. Data processing resources 606 can be websites, online stores, and factory ordering systems, servers, mobile devices, computer networks, and/or other types and kinds of data processing resources, as may be required and/or desired in a particular embodiment. Such data communications can include ordering supplies, such as supplies 504, checking inventory, transacting business in an online account, data communicating market information, beverage data, inventory data, service needs, and other types and kinds of data communications, as may be required and/or desired in a particular embodiment. Supplies 504 can include various types and kinds of beverage making cartridges 200. In an exemplary embodiment, for example and not a limitation, the beverage making cartridges 200 can include micro ingredient 214, solid gas sources 202A, aroma enhanced solid gas sources 202B, beverage diluent filters 222, cartridge configurations and functional components, cartridge based beverage diluent liquid receptacles, and/or other types and kinds of supplies, functional technologies, and/or combinations thereof, as may be required and/or desired in a particular embodiment.

The computer control 122 can further comprise a computer readable medium 172 which can be encoded with instructions to operate the beverage making machine 100, the methods of the present invention, control operation of the beverage making machine 100, data communicate across the global network 604, with data processing resources 606, with wireless device 602, and/or encoded with instructions for effectuating other types and kinds of activities, as may be required and/or desired in a particular embodiment.

The term "global network" or "global network 604", in the present invention, is intended to mean the internet or other network which facilitates the ability to network and access the beverage making machine with remote computer systems, transact commerce, reorder supplies, check status of shipments, gain information about products, communicate with customers and consumers, and/or data communicate globally between data processing resources such as servers, personal computers, mobile devices, and other digital devices, including the beverage making machine 100 of the present invention.

Use of the term "no-high-pressure-gas-allowed-delivery-service", in the present invention, is intended to mean a delivery service that restricts or bans the shipment of high pressure gas. Many delivery services restrict or ban such high pressure gas shipments due to safety concerns. In this regard, high pressure gas under certain circumstances, such as over pressure gas tank, excessive heating, gas tank structural defects, and other conditions can cause catastrophic gas tank failure, which can lead to very serious injury and damage. As such, many delivery services avoid shipping high pressure gas. An advantage, in the present invention, is that a solid gas source 202 under little to no pressure conditions can be shipped to the point of use. At the point of use, the solid gas source is inserted into the beverage making machine 100 where it sublimates to pressurize a gas storage tank 108. In this regard, the present invention overcomes the limitation of not being able to ship high pressure gas by shipping the gas in solid form at no or low pressure and then generating the high pressure gas when inserted into the beverage making machine 100. As such, the term "no-high-pressure-gas-allowed-delivery-service" is used, in the present invention's, to refer to the ability to overcome the limitation of not being able to ship high pressure gas by shipping a solid gas source 202, form which a high pressure gas can be generated therefrom at point of use.

Use of the term "wireless device" or "consumer's wireless device" or "wireless device 602", in the present invention, is intended to mean a wireless device such as a smart phone and other similar wireless phones, IPAD and other tablet computers, readers such as the AMAZON KINDLE and other similar readers, and/or other mobile portable wireless digital devices, as may be required and/or desired in a particular embodiment.

Figure 28A:
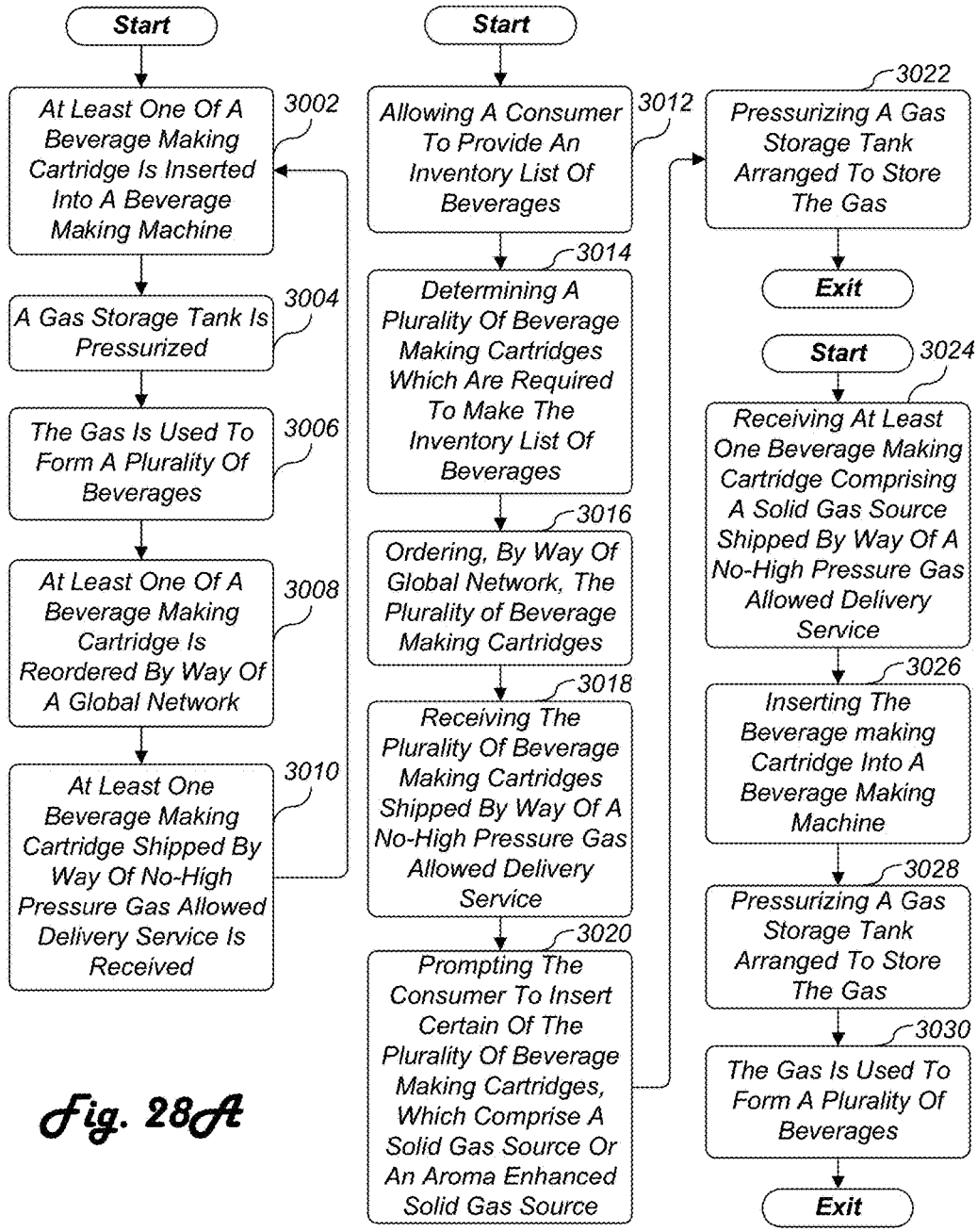
FIGS. 28A-B illustrates examples of methods of supplying consumables to a beverage making machine.
Figure 28B:
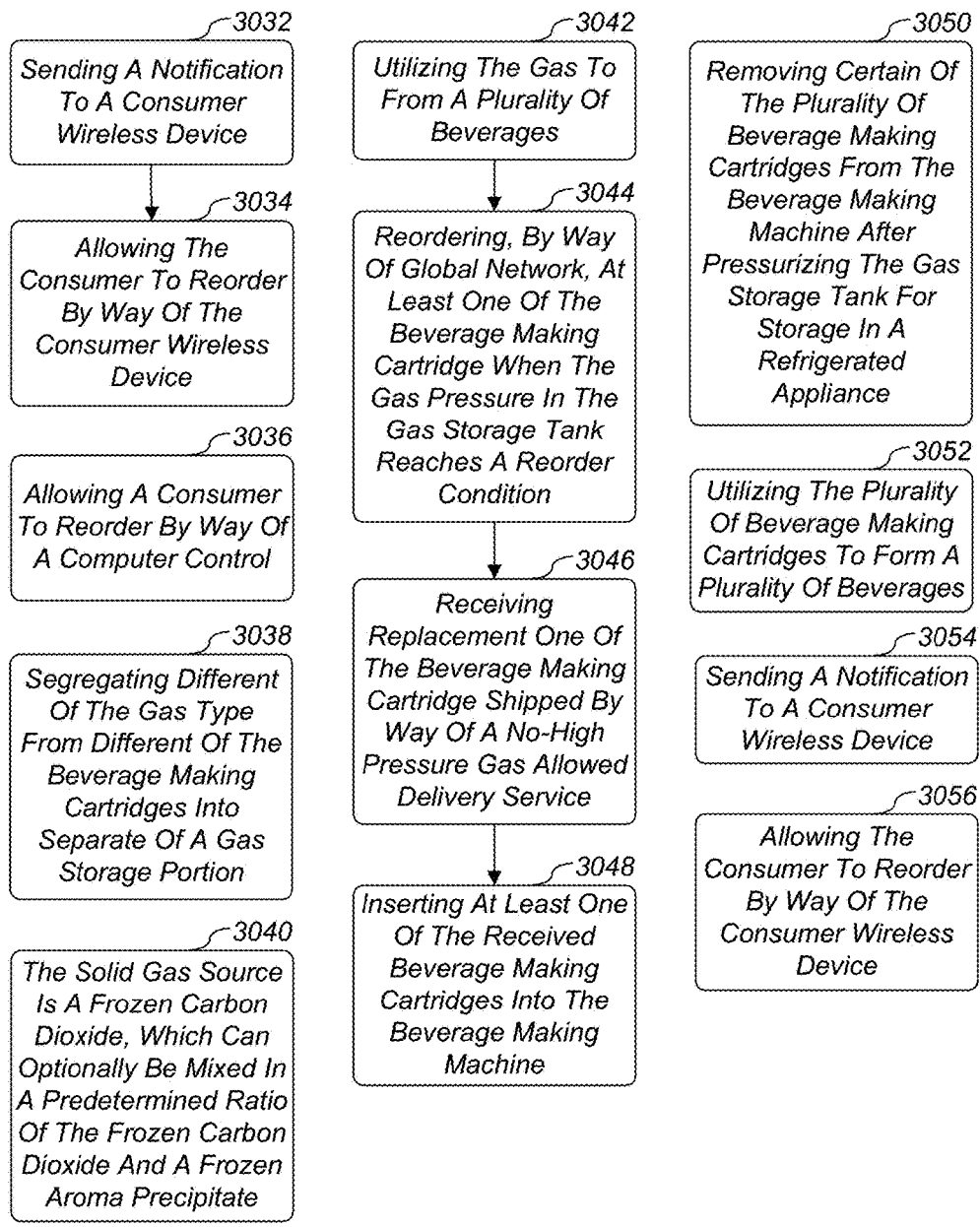

In operation, with reference to FIGS. 28A-B, a consumer 302 can utilize wireless device 602 to interact with the beverage making machine 100, by way of computer control 122. Such interaction can be by way of WIFI, BLUETOOTH, a 3G or 4G mobile networks, emails, text messages, and/or other types an kinds of interaction and data communication technologies both wired and wireless, as may be required and/or desired in a particular embodiment. The consumer's wireless device 602 can also data communicate across a global network 604 with data processing resources 606. Such data communications with data processing resources 606 can include ordering supplies, such as supplies 504. Supplies 504 can include various types and kinds of beverage making cartridges 200. In an exemplary embodiment, for example and not a limitation, the beverage making cartridges 200 can include micro ingredient 214, solid gas sources 202A, aroma enhanced solid gas sources 202B, beverage diluent filters 222, and/or other types and kinds of supplies and combinations thereof, as may be required and/or desired in a particular embodiment.

The orders can be processed and supplies 504 shipped, by way of a delivery service 502, to the point of use. The delivery service 502 can include postal service, cargo service, air transport service, overnight service, courier service, no-high-pressure-gas-allowed-delivery-service, and other types and kinds of deliver service, as may be required and/or desired in a particular embodiment. In addition, delivery service 502 can also include places where supplies 504 can be picked up by a consumer such as in a store and/or include other places that are convenient and/or preferred by the consumer, and as may be required and/or desired in a particular embodiment.

In an exemplary embodiment, the beverage machine 100 can be configured to monitor beverage making cartridge supply levels and either automatically reorder supplies across the global network 604 with data processing resources 606 and have the supplies 504 delivered by delivery service 502 without consumer 302 intervention or consumer 302 can initiate, confirm, or authorize any steps in the process, as may be required and/or desired in a particular embodiment.

In another exemplary embodiment, a consumer 302 can use wireless device 602 to check the inventory level status of the beverage making cartridges and/or supply of gas by wired or wireless data communication with the computer control 122 or the beverage making machine 100. Based on the determination and results returned to the consumer 302, the consumer can decide and initiate a supply reorder across the global network 604 with data processing resources 606 and have the supplies 504 delivered by delivery service 502.

In another exemplary embodiment, a consumer 302 can access data processing resources 606, by way of a global network 604, to make discovery of available supplies 504 for the beverage making machine 100. Such discovery can be, for example and not a limitation, available or new beverage flavors, solid gas sources, aroma enhanced solid gas sources, diluent filters, and/or make other types and kinds of discovery. The consumer can then order the desired supplies across the global network 604 with data processing resources 606 and have the supplies 504 delivered by delivery service 502, as may be required and/or desired in a particular embodiment.

Figure 19:
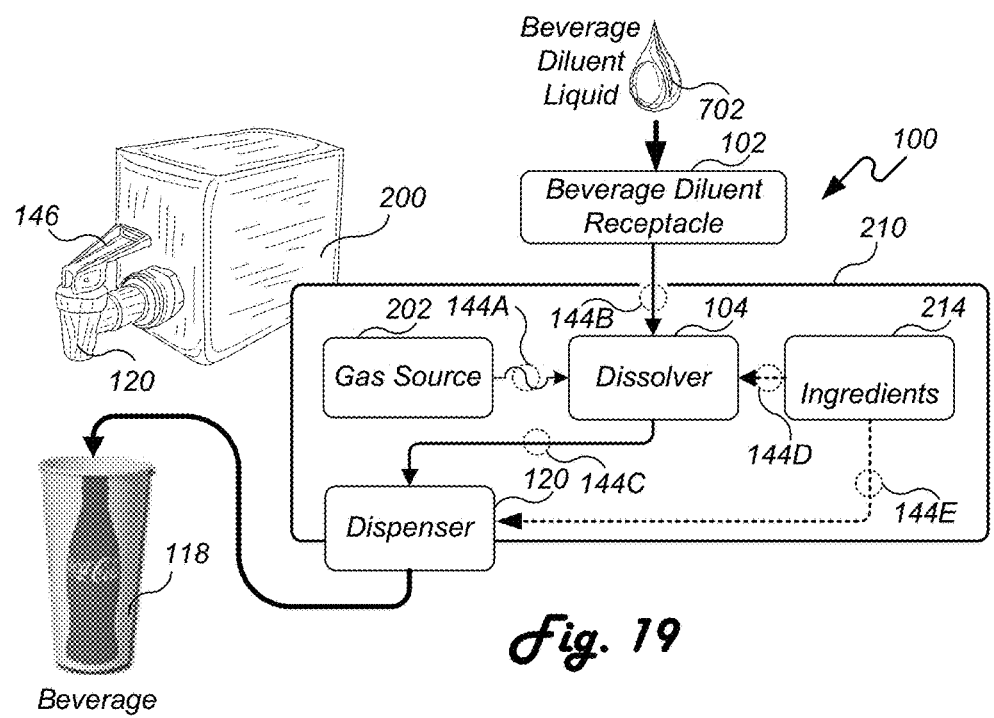
FIGS. 19-23 illustrates examples of a system block diagram of beverage making cartridges arranged to be a factory in a cartridge.

Referring to FIG. 19 there is illustrated one example of a system block diagram of a beverage making cartridge 200 arranged to be a factory in a cartridge. In an exemplary embodiment, a beverage making cartridge 200 can comprise a beverage making cartridge enclosure 210, a solid gas source 202, at least one of a micro ingredient 214, a dissolver 104, a dispenser 120, and a series of optional fluid handling components 144A-D. In this regard, the beverage making cartridge 200 can comprise consumables such as a solid gas source, at least one micro ingredient, and the necessary functional components to effectuate forming a beverage.

Use of the term "fluid handling components" or "fluid handling components 144", in the present invention, is intended to mean pumps, mixers, valves, regulators, and/or other gas or liquid handling and/or routing, regulating, or control types and kinds of devices. In general, fluid handling components can be standard size or miniature size when it is needed to incorporated such components into a beverage making machine. The fluid handling components can be micro scale when needed to fit into a beverage making cartridge enclosure 210. Additionally, the fluid handling components can be embodied as microelectromechanical system (MEMS) components and/or other micro scale technologies when needed.

Use of the term "beverage making cartridge factory" or "factory in a cartridge", in the present invention, is intended to mean, a beverage making cartridge 200 comprising the necessary solid gas source 202 and/or at least one micro ingredient 214 with the necessary functional components to form a beverage in vessel 118. In general, the functional components can include, for example and not a limitation, dissolver 104, beverage diluent filter 222, dispenser 120, beverage diluent cooler 148, fluid handling components 144, and/or other functional components, as may be required and/or desired in a particular embodiment.

In an exemplary embodiment, with arrows indicating fluid flow and dashed arrows indicating optional or alternative fluid flows, a beverage diluent liquid 702 can be placed into a beverage diluent receptacle 102. A beverage making cartridge enclosure 210 can comprise a solid gas source 202, a dissolver 104, at least one of a micro ingredient 214, and a dispenser 120 can be arranged to transfer fluids from outside the beverage making cartridge enclosure 210 to the inside where a beverage can be formed or otherwise dispensed. A series of optional fluid handling components 144A-D, micro-scale in nature, can selectively be utilized to control the flow of fluids, ingredients, and gases through the beverage making cartridge 200, as may be required and/or desired in a particular embodiment.

The dissolver 104 can be arranged to receive emitted gas 704 from the solid gas sources 202, at least a portion of the beverage diluent liquid 702 from the beverage receptacle 102, and selectively at least one of a micro ingredient 214. The dissolver 104 dissolves the emitted gas 704 into the beverage diluent liquid 702 and can optionally mix the beverage diluent liquid with the micro ingredient 214 to form the beverage in vessel 118. Alternatively, the micro ingredient 214 can be routed to and dispensed from the dispenser 120. A dispenser 120 can comprise a bistable lever actuated valve 146, by which the dispenser 120 can be operated to dispense at least the beverage diluent liquid 702 and the micro ingredient 214 to form a beverage in vessel 118. A series of fluid handling components 144A-D can be selectively utilized, as needed, to control the fluid flow, through the beverage making cartridge enclosure 210, as may be required and/or desired in a particular embodiment.

The beverage making cartridge enclosure 210 is preferably configured to be inserted into a bulk water type beverage making machine 100, such as illustrated in at least FIGS. 4A-B and 24-25. In an exemplary embodiment, in operation, the beverage making cartridge 200 comes in many flavors, types, kinds, and/or brands and can easily be inserted into a beverage making machine 100, and be utilized by consumers to make a plurality of beverages from a single beverage making cartridge 200. When the consumables are used up, the beverage making cartridge 200 can be removed, discarded, and/or recycled, being replaced with a new beverage making cartridge 200.

Figure 20:
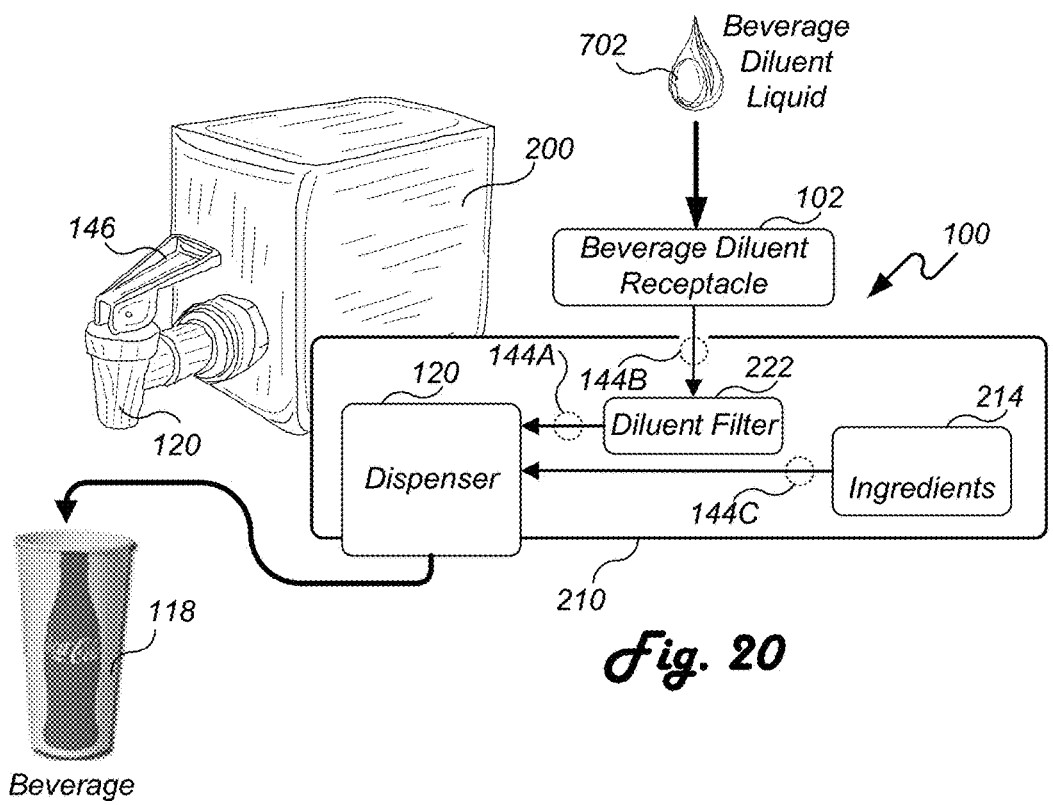

Referring to FIG. 20 there is illustrated one example of a system block diagram of a beverage making cartridge 200 arranged to be a factory in a cartridge. In an exemplary embodiment, a beverage making cartridge 200 can comprise a beverage making cartridge enclosure 210, at least one of a micro ingredient 214, a diluent filter 222, a dispenser 120, and a series of optional fluid handling components 144A-C. In this regard, the beverage making cartridge 200 can comprise consumables such as, at least one micro ingredient, a beverage diluent filter 222, and the necessary functional components to effectuate forming a beverage.

In an exemplary embodiment, with arrows indicating fluid flow, a beverage diluent liquid 702 can be placed into a beverage diluent receptacle 102. A beverage making cartridge enclosure 210 can comprise a beverage diluent filter 222 to filter the incoming beverage diluent liquid, at least one of a micro ingredient 214, and a dispenser 120 can be arranged to transfer fluids from inside the beverage making cartridge enclosure 210 to the outside where a beverage can be formed and dispensed. A series of optional fluid handling components 144A-C, micro-scale in nature, can selectively be utilized to control the flow of fluids and ingredients through the beverage making cartridge 200, as may be required and/or desired in a particular embodiment.

The dispenser 120 can be arranged to receive at least a portion of the beverage diluent liquid 702 from the beverage receptacle 102 by way of the beverage diluent filter 222, and selectively at least one of a micro ingredient 214. A dispenser 120 can comprise a bistable lever actuated valve 146, by which the dispenser 120 can be operated to dispense at least the beverage diluent liquid 702 and the micro ingredient 214, to form a beverage in vessel 118. A series of fluid handling components 144A-C can be selectively utilized, as needed, to control the fluid flow, through the beverage making cartridge enclosure 210, as may be required and/or desired in a particular embodiment.

The beverage making cartridge enclosure 210 is preferably configured to be inserted into a bulk water type beverage making machine 100, such as illustrated in at least FIGS. 4A-B and 24-25. In an exemplary embodiment, in operation, the beverage making cartridge 200 comes in many flavors, types, kinds, and/or brands and can easily be inserted into a beverage making machine 100, utilized by consumers to make a plurality of beverages from a single beverage making cartridge 200, and then when the consumables are used up, the beverage making cartridge 200 can be removed and discarded, being replaced with a new beverage making cartridge 200.

Figure 21:
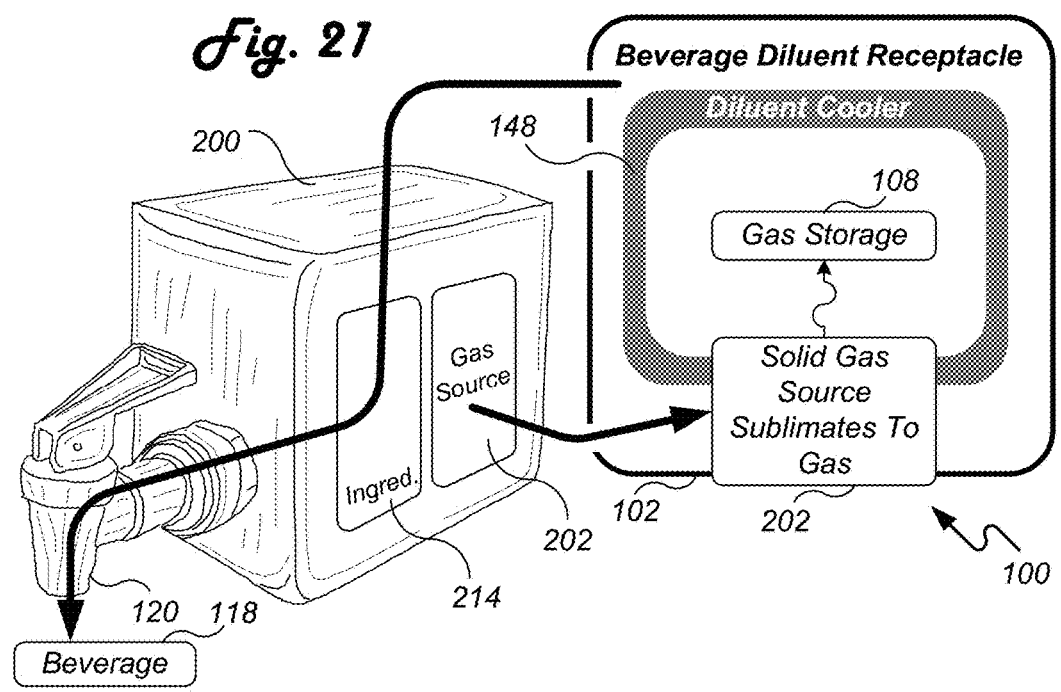

Referring to FIG. 21 there is illustrated one example of a system block diagram of a beverage making cartridge 200 arranged to be a factory in a cartridge. In an exemplary embodiment, a beverage making cartridge 200 can be arranged to chill the beverage diluent liquid 702. In this regard, a beverage making cartridge 200 can comprise a solid gas source 202, and optionally at least one of a micro ingredient 214. A beverage making machine 100 can comprise a beverage diluent receptacle 102 and optionally a gas storage tank 108. Alternatively, if gas isn't needed for infusion into the beverage diluent liquid 702 then the gas 704 can be vented to the atmosphere and the gas storage tank 108 can be eliminated. As another alternative, if it is desired that the beverage diluent liquid 702 be infused with gas but a separate gas storage tank 108 is not desired then the gas 704 can be vented into the beverage diluent receptacle which is holding the beverage diluent liquid 702 where the gas can be dissolved into the beverage diluent liquid.

To chill the beverage diluent liquid, which is in the beverage diluent receptacle 102 the beverage making cartridge 200 can be inserted into the beverage making machine 100 and can be thermally coupled, by way of a beverage diluent cooler 148, to the beverage diluent receptacle 102. In this regard, the surface temperature of the solid gas source can be extremely cold. For example and not a limitation, frozen carbon dioxide (dry-ice) can have a surface temperature of −109 F. As such, coupling the cold surface temperature of the solid gas source, by way of a beverage diluent cooler 148, to the beverage diluent receptacle 102, which has in it the beverage diluent liquid 702, causes the beverage diluent liquid 702 to cool. A beverage diluent cooler 148 can comprise a metal or other thermally conducting materials designed to transfer the cold surface temperature of the solid gas source to the beverage diluent receptacle 102, which can also be fabricated from metal or other thermally conducting material, as may be required and/or desired in a particular embodiment.

As illustrated in at least FIG. 21, a beverage making cartridge 200 can be configured to chill the beverage diluent liquid 702, which is inside the beverage diluent receptacle 102, by way of thermally coupling the beverage diluent cooler 148 between at least the solid gas source 202 and the beverage diluent receptacle 102. A dispenser 120 can comprise a bistable lever actuated valve 146, by which the dispenser 120 can be operated to dispense at least the chilled beverage diluent liquid 702 and the micro ingredient 214, to form a beverage in vessel 118.

Figure 22:
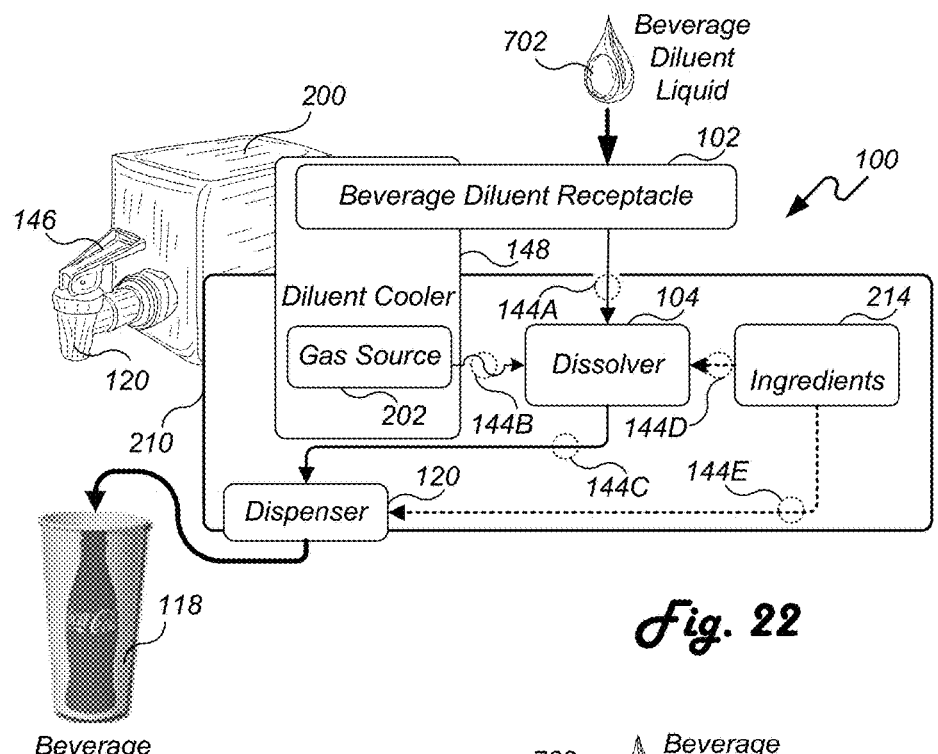

Referring to FIG. 22 there is illustrated one example of a system block diagram of a beverage making cartridge 200 arranged to be a factory in a cartridge. In an exemplary embodiment, a beverage making cartridge 200 can comprise a beverage making cartridge enclosure 210, at least one of a micro ingredient 214, a dissolver 104, a solid gas source 202, a dispenser 120, and a series of optional fluid handling components 144A-D. In this regard, the beverage making cartridge 200 can comprise consumables such as at least one micro ingredient, a solid gas source 202, and the necessary functional components to effectuate forming a beverage. A beverage diluent cooler 148 thermally is arranged and couples the solid gas source 202 with a beverage diluent receptacle 102, which contains a beverage diluent liquid 702, such that the cold surface temperature of the solid gas source 202 chills the beverage diluent liquid 702.

In an exemplary embodiment, with arrows indicating fluid flow and dashed arrows indicating optional or alternative fluid flows, a beverage diluent liquid 702 can be placed into a beverage diluent receptacle 102. A beverage making cartridge enclosure 210 can comprise a solid gas source 202, a dissolver 104, at least one of a micro ingredient 214, at least a portion of a beverage diluent cooler 148, and a dispenser 120. The beverage making cartridge 200 can be arranged to transfer fluids from outside the beverage making cartridge enclosure 210 to the inside where a beverage can be formed and dispensed. A series of optional fluid handling components 144A-E, micro-scale in nature, can selectively be utilized to control the flow of fluids, ingredients, and gases through the beverage making cartridge 200, as may be required and/or desired in a particular embodiment.

The dissolver 104 can be arranged to receive emitted gas 704 from the solid gas sources 202, at least a portion of the beverage diluent liquid 702 from the beverage receptacle 102, and selectively at least one of a micro ingredient 214. The dissolver 104 dissolves the emitted gas 704 into the beverage diluent liquid 702 and can optionally mix the beverage diluent liquid with the micro ingredient 214, to form and dispense the beverage into vessel 118. Alternatively, the micro ingredient 214 can be routed to and dispensed from the dispenser 120. A dispenser 120 can comprise a bistable lever actuated valve 146, by which the dispenser 120 can be operated to dispense at least the beverage diluent liquid 702 and the micro ingredient 214 to form and dispense a beverage into vessel 118. A series of fluid handling components 144A-E can be selectively utilized, as needed, to control the fluid flow, through the beverage making cartridge enclosure 210, as may be required and/or desired in a particular embodiment.

The beverage making cartridge enclosure 210 is preferably configured to be inserted into a bulk water type beverage making machine 100, such as illustrated in at least FIGS. 4A-B and 24-25. In an exemplary embodiment, in operation, the beverage making cartridge 200 comes in many flavors, types, kinds, and/or brands and can easily be inserted into a beverage making machine 100, utilized by consumers to make a plurality of beverages from a single beverage making cartridge 200, and then when the consumables are used up, the beverage making cartridge can be removed, discarded, and/or recycled, being replaced with a new beverage making cartridge 200.

Figure 23:
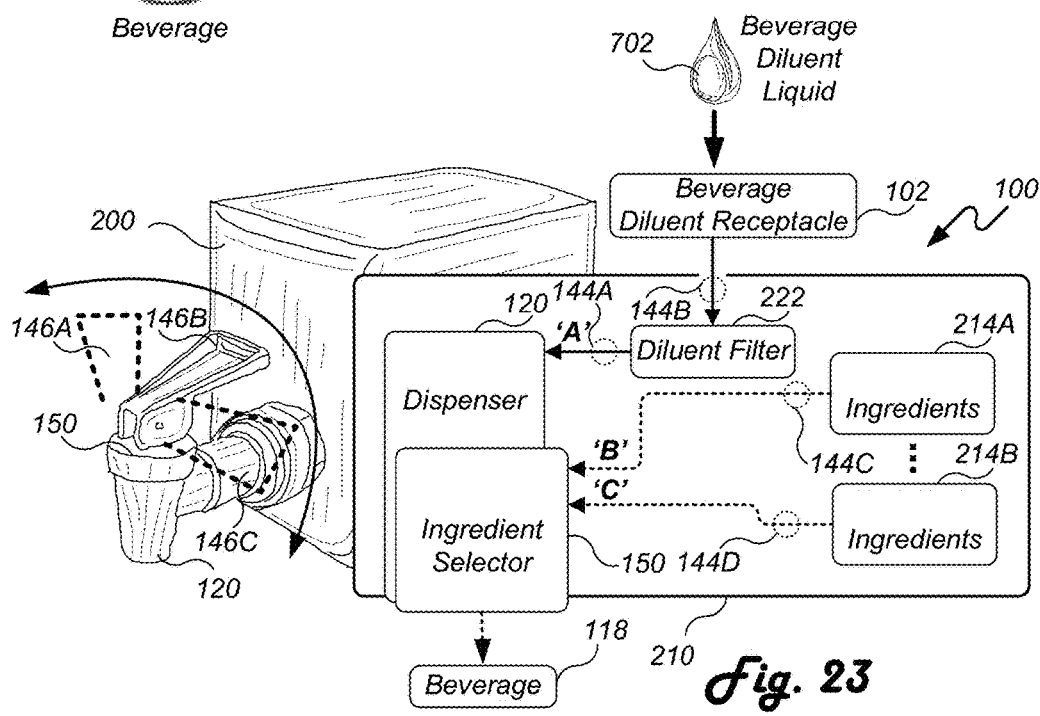

Referring to FIG. 23 there is illustrated one example of a system block diagram of a beverage making cartridge 200 arranged to be a factory in a cartridge. In an exemplary embodiment, a beverage making cartridge 200 can comprise a beverage making cartridge enclosure 210, more than one of a micro ingredient 214A-B, a diluent filter 222, a dispenser 120, wherein the dispenser 120 further comprising a micro ingredient selector 150, and a series of optional fluid handling components 144A-D. In this regard, the beverage making cartridge 200 can comprise consumables such as, more than one micro ingredient, a beverage diluent filter 222, and the necessary functional components, as required and/or desired in a particular embodiment, to effectuate forming a beverage.

In an exemplary embodiment, with arrows indicating fluid flow and dashed arrows indicating optional or alternative fluid flows, a beverage diluent liquid 702 can be placed into a beverage diluent receptacle 102. A beverage making cartridge enclosure 210 can comprise a beverage diluent filter 222 to filter the incoming beverage diluent liquid 702, at least one of a micro ingredient 214, and a dispenser 120 can be arranged to transfer fluids from outside the beverage making cartridge enclosure 210 to the inside where a beverage can be formed and dispensed. A series of optional fluid handling components 144A-D, micro-scale or MEMS scale in nature, can selectively be utilized to control the flow of fluids and micro ingredients through the beverage making cartridge 200, as may be required and/or desired in a particular embodiment.

The dispenser 120 can be arranged to receive at least a portion of the beverage diluent liquid 702 from the beverage receptacle 102, by way of the beverage diluent filter 222, and by way of micro ingredient selector 150, select at least one of a micro ingredient 214 for use in forming the beverage. A dispenser 120 can comprise a bistable lever actuated valve 146A-C and the micro ingredient selector 150, by which the dispenser 120 can be operated to dispense at least the beverage diluent liquid 702 and selectively none or at least one of the micro ingredient 214, to form a beverage in vessel 118. In this regard, the bistable lever actuated valve 146A-C can be movable and positional in more than one position. FIG. 23 illustrates, as example and not a limitation, three positions 146A, 146B, and 146C, though more or less positions can be included. Such movement and positioning 146A, 146B, and 146C can in turn configure the micro ingredient selector 150 to select or otherwise complete pathways, wherein selectively the beverage diluent liquid only or at least one of the micro ingredients can be chosen by the consumer and used to form the beverage, as may be required and/or desired in a particular embodiment.

In operation, a consumer can move and/or position the bistable lever actuated valve in positions 146A, 146B, or 146C. Correspondingly, positioning the bistable lever actuated valve in positions 146A, 146B, or 146C configures the micro ingredient selector 150. Depending on the position of the ingredient selector 150 a selection of which of the micro ingredients 214A-B or none of the micro ingredients to mix with the beverage diluent liquid can be effectuated. As example, in position 146A perhaps no micro ingredient is mixed resulting in only beverage diluent liquid being dispensed to form the beverage in vessel 118, flow pathway reference label 'A'. In a second example, in position 146B perhaps micro ingredient 214A is dispensed with the beverage diluent liquid to form the beverage in vessel 118, flow pathway reference label 'B'. In another example, in position 146C perhaps micro ingredient 214B is dispensed with the beverage diluent liquid to form the beverage in vessel 118, flow pathway reference label 'C'.

A series of fluid handling components 144A-D can be selectively utilized, as needed, to control the fluid flow, through the beverage making cartridge enclosure 210, as may be required and/or desired in a particular embodiment.

For disclosure purposes, as example and not a limitation, two micro ingredients 214A-B and a three position dispenser 120 positions 146A-C are illustrated in FIG. 23; however any number of micro ingredients and positions on dispenser 120 can be implemented, as may be required and/or desired in a particular embodiment.

The beverage making cartridge enclosure 210 is preferably configured to be inserted into a bulk water type beverage making machine 100, such as illustrated in at least FIGS. 4A-B and 24-25. In an exemplary embodiment, in operation, the beverage making cartridge 200 comes in many flavors, types, kinds, and/or brands and can easily be inserted into a beverage making machine 100, utilized by consumers to make a plurality of beverages from a single beverage making cartridge 200, and then when the consumables are used up, the beverage making cartridge 200 can be removed, discarded, and/or recycled, being replaced with a new beverage making cartridge 200.

Figure 24:
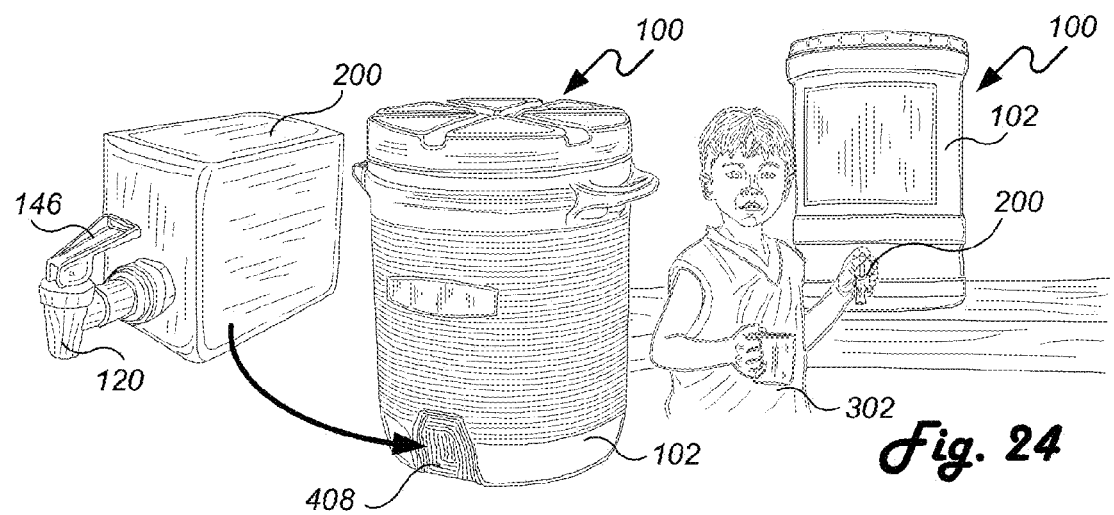
FIGS. 24-25 illustrates examples of a beverage making machine, which utilizes at least one of a beverage making cartridge.

Referring to FIG. 24 there are illustrated examples of a beverage making machine 100, which utilizes at least one of a beverage making cartridge 200. In an exemplary embodiment, beverage making cartridge 200 can be inserted into a beverage making machine 100. The beverage making machine 100 illustrated in the Figure can also be referred to as a bulk beverage diluent liquid type dispenser. In this regard, a large quantity of beverage diluent liquid, such as water, milk, or other liquid can be bulk loaded into the thermos or container like beverage diluent receptacle 102. These bulk beverage diluent liquid holding versions of the beverage making machine 100 are typically characterized by having a large beverage diluent receptacle 102. Such bulk type dispensers are typically portable and often found at sporting events, picnics, church and social functions, and/or at other types and kinds of events and locations. Furthermore, these bulk type dispensers can use hot or cold beverage diluent liquids and serve a limitless range of beverage types including sports drinks, carbonated drinks, non-carbonated drinks, hot or cold tea based drinks, hot or cold coffee based drinks, dairy drinks, and/or other types and kinds of beverage types, as may be required and/or desired in a particular embodiment.

Such bulk type beverage making machines 100 also have applicability in the developing world where access to clean water is a challenge. These bulk water beverage making machine 100 tank type facilities or stations can have a big impact on the communities and consumers who don't have the opportunity to experience safe clean high quality flavored beverages very often. As such, water treatment techniques combined with beverage making technology, in simple easy to use forms, is in demand and very much needed around the world.

In operation, the beverage making cartridge 200 comes in many flavors, types, kinds, and/or brands and can easily be inserted into a beverage making machine 100, utilized by consumers to make a plurality of beverages from a single beverage making cartridge 200, and then when the consumables are used up, the beverage making cartridge 200 can be removed, discarded, and/or recycled, being replaced with a new beverage making cartridge 200.

Figure 25:
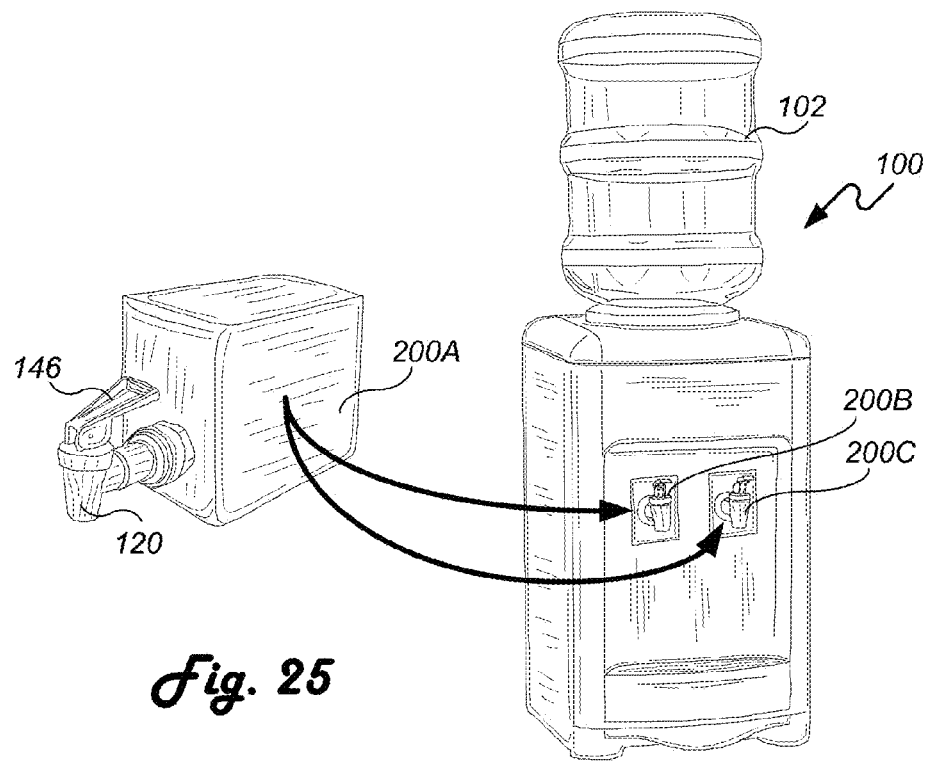

Referring to FIG. 25 there is illustrated a beverage making machine 100, which utilizes at least one of a beverage making cartridge 200A-C. In an exemplary embodiment, similar in function as the bulk dispensers of FIG. 24, this bulk type dispenser 100, often referred to as a water cooler style dispenser, is capable of having more than one beverage making cartridge 200 inserted into the bulk type dispenser 100, in this example labeled 200B and 200C.

In operation, this can allow hot and cold beverages, along with a wide variety of beverages to be dispensed from bulk dispenser type beverage making machines 100. The beverage making cartridge 200 can come in many flavors, types, kinds, and/or brands and more than one can typically be inserted into this type of bulk dispenser beverage making machine 100. The beverage making machine can be utilized by consumers to make a plurality of hot and cold beverages from the installed beverage making cartridges 200B-C, and then when the consumables are used up in one of the cartridges, the beverage making cartridge 200B or 200C can be removed, discarded, and/or recycled, replaced with a new beverage making cartridge 200, as needed.

Referring to FIGS. 26A-B there are illustrated examples of methods of producing aroma enhanced solid gas 202 for use in a beverage making machine 100 to make a beverage. Illustrated in FIG. 26A, with reference also to at least FIG. 3, is an exemplary embodiment of a preparation process such as brewing, fermentation, or other preparation process, as may be required and/or desired in a particular embodiment, which can be used to cause aroma vapor to be produced or otherwise released from an ingredient. Such aroma vapor, for example and not a limitation, could be tea aroma when tea leaves, as an ingredient, are brewed or coffee aroma when coffee, as an ingredient, is brewed, fresh squeezed citrus aroma when being squeezed or citrus is processed to extract aroma, or other aromas when brewing, fermenting, squeezing, or other preparation process is used with other ingredients.

Prior to the present invention it has been difficult to capture, collect, or otherwise package this aroma vapor and later use to aroma enhance a beverage. With reference to FIG. 3, one advantage of the present invention is to be able to capture and condense aroma vapor 216 from ingredients 214A and brewed ingredients 220 into an aroma precipitate 218. Such an aroma precipitate 218 can be in frozen ice form or other form and can be aroma captured from brewing, fermenting, squeezing, or other preparation process of tea, coffee, citrus, sweetness enhancers, flavors, and/or other ingredients, precipitate states, or preparation processes, as may be required and/or desired in a particular embodiment.

Another advantage, in the present invention, is that aroma liquid or vapor added to micro ingredient degrades over time, such that the benefit of the aroma at the time of use may be negated or significantly impaired simply due to the natural degradation of the aroma when mixed with the ingredient. This has for a long time prevented delivering to the consumer real authentic tasting tea, or fresh brewed coffee smell, or freshly squeezed citrus aroma simply because aroma mixed with ingredients degrades. The present invention overcomes this limitation by creating a frozen precipitate 218 and mixing with the frozen solid gas source. In this regard, the aroma is preserved in frozen form and returned to gas vapor form, stored in a gas storage tank where the aroma does not degrade. As such, the true quality of the aroma can be delivered by infusion into the beverage, at the time the beverage is made, making delivering to the consumer in concentrated or syrup form, with aroma enhance gas, a true authentic tea experience, a real fresh brewed coffee experience, a fresh squeezed citrus experience, and/or delivering to the consumer other superior beverage making and enjoying experiences.

In this regard, in an exemplary embodiment, for example and not a limitation, the aroma vapor 216 can be from a brewed ingredient 220 like coffee or tea, or an ingredient 214A, or other aroma source. The aroma can be condensed into a precipitate 218. Preferably, the form of the aroma precipitate 218 is frozen ice so that it can be mixed in a predefined ratio with a solid gas source 202A, such as frozen $CO_2$ (dry-ice) or other frozen gas. The ratio-mix combination now forms an aroma enhanced solid gas source 202B, which can be packaged in a solid gas source package 206 as illustrated in at least FIG. 1A or directly into a beverage making cartridge enclosure 210, as illustrated in at least FIG. 1B. FIG. 3 further illustrates, for example and not a limitation, how the solid gas source 202A or the aroma enhanced solid gas source 202B can be packaged in a beverage making cartridge enclosure 210A-B individually as solid gas source 202C, as option 'A' or as solid gas source 202D collocated with at least one of a micro ingredient 214B in a beverage making cartridge enclosure 210C-D, as option 'B'. Other Figures, such as at least FIGS. 5 and 14 illustrate how the solid gas source can be collocated with other functional elements, such as dissolver 104 or in at least FIGS. 19-23 with dispenser 120.

Turning now to FIG. 26A, there is illustrated one example of a method of producing aroma enhanced solid gas 202 for use in a beverage making machine 100 to make a beverage. The method begins in block 1002.

In block 1002 an aroma vapor 216 is captured during a preparation process of an ingredient. Such preparation process typically occurs at a processing plant and can include brewing, fermentation, or other preparation process, as may be required and/or desired in a particular embodiment. In an exemplary embodiment, an ingredient could include, without limitation, tea leaves, coffee, sweetness enhance aroma producing ingredients, or other ingredients, as may be required and/or desired in a particular embodiment. The method moves to block 1004.

In block 1004 the aroma vapor 216 is condensed into an aroma precipitate. In an exemplary embodiment, the aroma precipitate 218 is frozen and/or otherwise mixable with a solid gas source 202. The method moves to block 1006.

In block 1006 the aroma precipitate is mixed with the solid gas source in a predefined ratio forming an enhanced solid gas source 202. In an exemplary embodiment, the aroma precipitate 218 and the solid gas source 202 are preferably both in a frozen ice state. The method is then exited.

In another exemplary embodiment, there is illustrated one example of a method of producing aroma enhanced solid gas 202 for use in a beverage making machine 100 to make a beverage. The method begins in block 1008.

In block 1008 an enhanced aroma solid gas source 202 is produced using at least an enhancing compound as part of an ingredient. For example and not a limitation, the enhancing aroma could be tea and the enhancing compound could be tea leaves. In another example, the enhancing aroma could be coffee and the enhancing compound could be derived from coffee beans. In another example, the enhancing aroma could be fresh squeezed citrus and the enhancing compound could be derived from citrus. One more example, the enhancing aroma and the enhancing compound could be selected with the purpose of producing a beverage having an aroma that is perceived olfactory, by a consumer, as sweetness enhancing. The method moves to block 1010.

In block 1010 an aroma precipitate is formed, through the conversion of an aroma vapor 216, released during a preparation process, which utilizes the ingredient. In an exemplary embodiment, a preparation process such as brewing, fermentation, or other preparation process, as may be required and/or desired in a particular embodiment, can be used to cause aroma vapor 216 to be produced or otherwise released from an ingredient. Such aroma vapor 216, for example and not a limitation, could be tea aroma when tea leaves, as an ingredient, are brewed or coffee aroma when coffee, as an ingredient, is brewed, fresh squeezed citrus aroma when citrus is being squeezed or citrus is processed to extract aroma, or other aroma when brewing, fermenting, squeezing, or other preparation process is used with other ingredients. The method moves to block 1012.

In block 1012 the aroma precipitate 218 and the solid gas source 202A, illustrated in at least FIG. 3, are mixed in a predefined ratio to form the aroma enhanced solid gas source 202B.

With reference to FIG. 3, in an exemplary embodiment, for example and not a limitation, the aroma vapor 216 can be from brewed ingredients 220 like tea or coffee or an ingredient 214A, or other aroma sources. The aroma can be condensed into a precipitate 218. Preferably, the form of the aroma precipitate 218 is frozen ice so that it can be mixed in a predefined ratio with a solid gas source 202A, such as frozen CO2 (dry-ice) or other frozen gas. The ratio-mixed combination now forms an aroma enhanced solid gas source 202B. The method is then exited.

Referring to FIG. 26A there are also illustrated exemplary embodiments of methods of producing aroma enhanced solid gas 202 for use in a beverage making machine 100 to make a beverage. Such exemplary embodiments illustrated below can be selectively utilized with the methods of the present invention.

In block 1014 the ingredient, as part of the preparation process, can be brewed. As example, tea aroma can be generated when tea leaves, as an ingredient, are brewed or coffee aroma can be generated when coffee, as an ingredient, is brewed.

In block 1016 the ingredient, as part of the preparation process, can be fermented. As example, wine-grape aroma can be generated when wine is fermenting, and a beer aroma can be generated when beer is fermenting.

In block 1018 a tea based aroma enhanced solid gas source is produced.

In block 1020 a coffee based enhanced solid gas source is produced.

In block 1022 a fresh squeezed citrus based enhanced solid gas source is produced.

In block 1024 the aroma enhanced solid gas source is packaged in a beverage making cartridge enclosure 210. With reference to at least FIG. 1A, the solid gas source can be placed into a solid gas package 206 and then packaged into a beverage making cartridge enclosure 210, or as illustrated in at least FIG. 1B the solid gas source can be packaged directly into the beverage making cartridge, as may be required and/or desired in a particular embodiment. In at least FIG. 3 there is illustrated, for example and not a limitation, how the solid gas source 202A or the aroma enhanced solid gas source 202B can be packaged in a beverage making cartridge enclosure 210A-B individually as solid gas source 202C, as option 'A' or as solid gas source 202D collocated with at least one of a micro ingredient 214B in a beverage making cartridge enclosure 210C-D, as option 'B'. Other Figures, such as at least FIGS. 5 and 14 illustrate how the solid gas source can be collocated with other functional elements, such as dissolver 104 or in at least FIGS. 19-23 with dispenser 120.

Referring to FIG. 26B there is illustrated one example of a method of producing aroma enhanced solid gas 202, for use in a beverage making machine 100, to make a beverage. In an exemplary embodiment, an enhanced aroma can be produced using an enhancing compound as part of an ingredient, an aroma precipitate can be formed through conversion of an aroma vapor released during the preparation process which utilizes the ingredient, a predefined ratio of aroma precipitate can be mixed with the solid gas source to form an aroma enhanced solid gas source, the enhanced solid gas source can be packaged into a beverage making cartridge and the cartridge inserted into a beverage making machine, the aroma enhanced solid gas source can be allowed to sublimate emitting an aroma enhanced gas which can be captured and stored in a gas storage tank, a portion of the aroma enhanced gas can be dissolved into the beverage diluent liquid, and the beverage diluent liquid can be mixed with a predefined ratio of at least one micro ingredient to form a beverage. The method begins in block 1026.

In block 1026 an enhanced aroma can be produced using at least an enhancing compound, as part of an ingredient. For example and not a limitation, the enhancing aroma could be tea and the enhancing compound could be tea leaves. In another example, the enhancing aroma could be coffee and the enhancing compound could be derived from coffee beans. In another example, the enhancing aroma could be fresh squeezed citrus and the enhancing compound could be derived from citrus. One more example, the enhancing aroma and the enhancing compound could be selected with the purpose of producing a beverage having an aroma that is perceived olfactory, by a consumer, as sweetness enhancing. The method moves to block 1028.

In block 1028 an aroma precipitate is formed, through the conversion of an aroma vapor 216, released during a preparation process, which utilizes the ingredient. In an exemplary embodiment, a preparation process such as brewing, fermentation, or other preparation process, as may be required and/or desired in a particular embodiment, can be used to cause aroma vapor 216 to be produced or otherwise released from an ingredient. Such aroma vapor 216, for example and not a limitation, could be tea aroma when tea leaves, as an ingredient, are brewed or coffee aroma when coffee, as an ingredient, is brewed, or fresh squeezed citrus aroma when citrus is being squeezed or citrus is processed to extract aroma, or other aroma when brewing, fermenting, squeezing, or other preparation process is used with other ingredients. The method moves to block 1030.

In block 1030 the aroma precipitate 218 and the solid gas source 202A, in at least FIG. 3, are packaged or otherwise mixed and/or combined, in a beverage making cartridge, in a predefined ratio to form the aroma enhanced solid gas source 202B. The method moves to block 1032.

In block 1032 a portion of the aroma enhanced gas is dissolved into the beverage diluent liquid. This causes the beverage diluent liquid to become gas infused with the combination gas and aroma molecules. The method moves to block 1034.

In block 1034 the gas infused beverage diluent liquid is mixed with at least one of a micro ingredient to form a beverage. As the consumer drinks the beverage the gas infused beverage diluent liquid emits gas and aroma, as the gas diffuses from the beverage diluent liquid. In this regard, the aroma can provide a pleasurable beverage for the consumer as the aroma molecules interact with the consumer's olfactory senses. The method is then exited.

Referring to FIG. 26B there are also illustrated exemplary embodiments of methods of producing aroma enhanced solid gas 202 for use in a beverage making machine 100 to make a beverage. Such exemplary embodiments illustrated below can be selectively utilized with the methods of the present invention.

In block 1036 at least tea leaves can be used as an enhancing compound.

In block 1038 at least coffee can be used as an enhancing compound.

In block 1040 at least citrus can be used as an enhancing compound.

In block 1042 the beverage making cartridge enclosure 210 including the solid gas source 202A, as illustrated in at least FIG. 3 or the aroma enhanced solid gas source 202B can be inserted into a beverage making machine 100.

In block 1044 the aroma enhanced solid gas source can be allowed to sublimate emitting an aroma enhanced gas. The emitted gas can be captured and stored in a gas storage tank 108 for use in gas infused beverage making.

In block 1046 the enhancing aroma and enhancing compound is selected with the purpose of producing a beverage having an aroma that is perceived olfactory, by a consumer, as sweetness enhancing.

In block 1048 the aroma enhanced gas emitted from the aroma enhanced solid gas source is stored in a gas storage tank 108, for use in at least preparing gas infused beverages.

In block 1050 a portion of the aroma enhanced gas is dissolved into the beverage diluent liquid. The amount of gas dissolved can be predetermined and can be measured in a ratio of volumes of gas to one volume of beverage diluent liquid. Dissolved volumes of gas into the beverage diluent liquid in the storage tank can typically range from one to nine volumes, as it is relatively easy to pressurize the dissolver 104 tank (in as least FIG. 13) or hollow tubes (in at least FIG. 12) with the stored gas and force higher volumes of gas into the beverage diluent liquid. Finished beverage, that is the beverage dispensed into a consumer's vessel 118, at typically normal atmospheric pressures and temperatures often see a finished gas infused beverage of two to four volumes of gas.

In block 1052 the beverage diluent liquid is mixed in a predefined ratio with at least one micro ingredient to form a beverage.

In block 1054 between up to nine volumes of the aroma enhanced gas is dissolved into the beverage diluent liquid. The amount of gas dissolved can be predetermined and can be measured in a ratio of volumes of gas to one volume of beverage diluent liquid.

In block 1056 both the aroma precipitate and the solid gas source can be frozen prior to mixing both to form the enhanced gas source, as illustrated in at least FIG. 3.

In block 1058 a predetermined amount of volumes of aroma enhanced gas can be dissolved into the beverage diluent liquid.

Figure 27A:
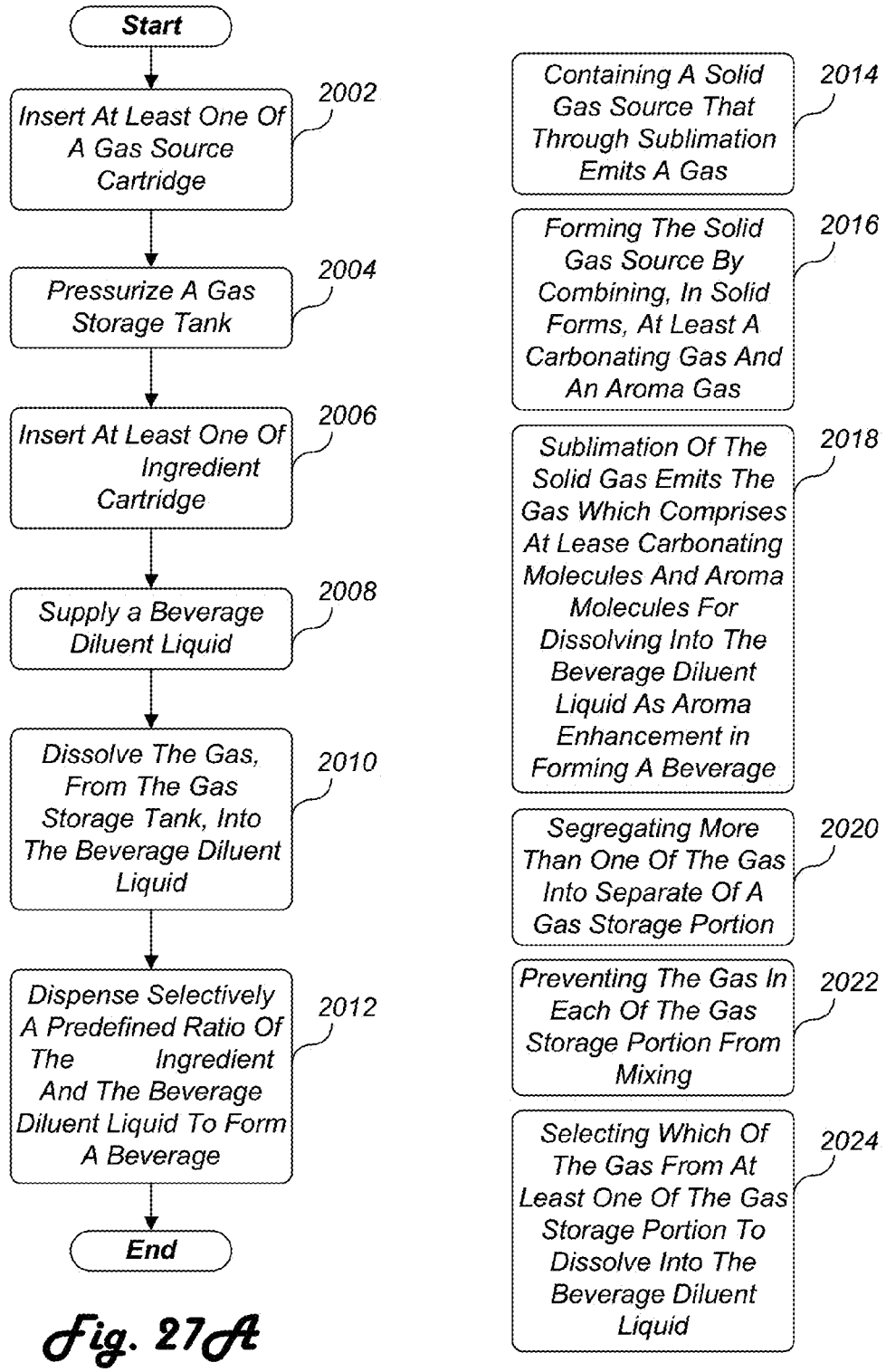
FIGS. 27A-B illustrates examples of a method of making a beverage.
Figure 27B:
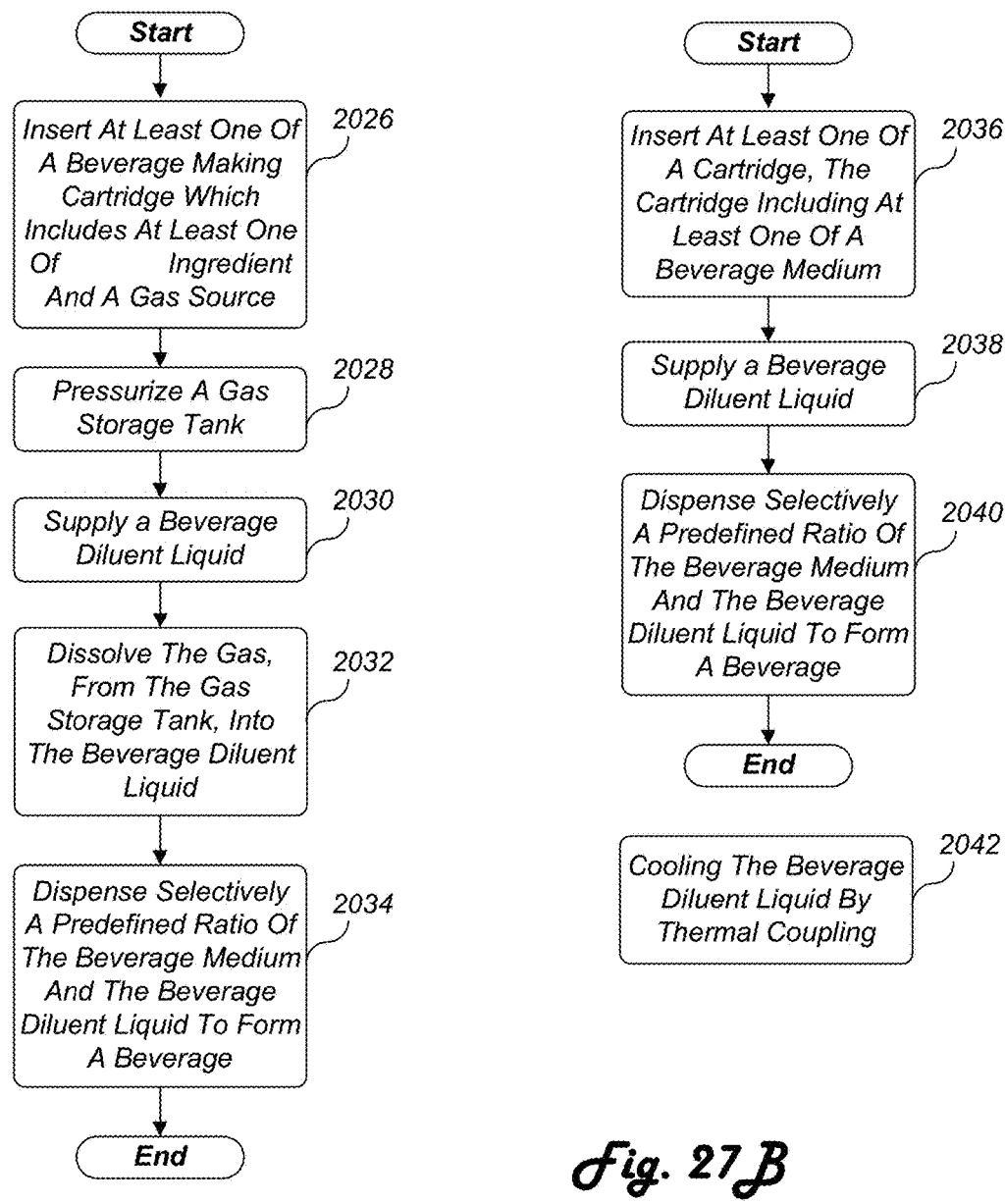

Referring to FIGS. 27A-B there is illustrated examples of a method of making a beverage. Illustrated in FIG. 27A, is an exemplary embodiment, for example and not a limitation, and with reference to at least FIGS. 7 and 8, supply cartridges 504, illustrated in at least FIG. 18 can be supplied to operate a system 100. In this regard, the supply cartridges 504 can include beverage making cartridges 200 which comprises micro ingredients 214, solid gas source 202A or aroma enhanced solid gas source 202B (in at least FIG. 3), beverage diluent filter 222, and/or other types and kinds of beverage making cartridges 200, which comprises other types and kinds of supplies, as may be required and/or desired in a particular embodiment.

In an exemplary embodiment, beverage making cartridge 200 can include supplies which can be in inserted into the beverage making machine 100. As example, a beverage making cartridge 200 comprising a solid gas source 202 or an aroma enhanced solid gas source 202 can be inserted into a solid gas source receptacle 110 and allowed to sublimate, emitting a gas 704 which can be captured, stored and utilized to pressurize a gas storage tank 108 and subsequently be dissolved by a dissolver 104 into a beverage diluent liquid 702. The beverage diluent liquid can then be optionally mixed with other micro ingredients 214 and dispensed through a dispenser 120, to form a beverage in vessel 118. With reference to at least FIGS. 27A and 7-8, the method begins in block 2002.

In block 2002 at least one of a beverage making cartridge 200 comprising a solid gas source 202 or an aroma enhanced solid gas source 202 can be inserted into a gas source receptacle 110. The method moves to block 2004.

In block 2004 the solid gas source 202 or the aroma enhanced solid gas source 202 is allowed to sublimate emitting gas 704, which can be captured, stored and utilized to pressurize a gas storage tank 108. The method moves to block 2006.

In block 2006 at least one of a beverage making cartridge 200 comprising at least one of a micro ingredient 214 can be inserted into a beverage making cartridge receptacle 114, illustrated in FIG. 7 as 114A-C and in FIG. 8 as 114 A-B. In an exemplary embodiment, for example and not a limitation, a micro ingredient 214 can be a concentrated syrup, powder, flavoring, coloring, preservative, concentrate mixture, non-caloric sweetener also referred to as a non-nutritive sweetener, caloric sweetener also referred to as a sweetener, nutraceuticals, sweetener enhancers, tea leaves, coffee, a combination thereof, or other types and kinds of substances that can be mixed with a beverage diluent liquid 702 to form a beverage. The method moves to block 2008.

In block 2008 a beverage diluent liquid 702 can be supplied to a beverage diluent receptacle 102. In an exemplary embodiment, for example and not a limitation, a beverage diluent liquid 702 can be a liquid such as water or other liquid that can be mixed with other ingredients to form a beverage. Optionally, the liquid can have gas dissolved into the liquid to form a gas infused beverage. The method moves to block 2010.

In block 2010 the pressurized gas from the gas storage tank can be dissolved, by dissolver 104, into the beverage diluent liquid 702 to form a gas infused beverage diluent liquid. In an exemplary embodiment, for example and not a limitation, the gas can be carbon dioxide (CO2) carbonating the beverage diluent liquid. A target carbonation level in the range of up to nine volumes, while the beverage diluent liquid 702 is stored in the dissolver 104, is preferred, but can vary, as may be required and/or desired in a particular embodiment. The method moves to block 2012.

In block 2012 selectively a predefined ratio of at least one of the micro ingredient 214 and the beverage diluent liquid can be dispensed to form a beverage in vessel 118. The beverage diluent liquid can be infused with gas or not, as may be required and/or desired in a particular embodiment. In this regard, at least FIGS. 7-8 illustrate different examples of the beverage diluent liquid fluid flow pathways. The method is then exited.

Referring to FIG. 27A there are also illustrated exemplary embodiments of methods of making a beverage. Such exemplary embodiments illustrated below can be selectively utilized with the methods of the present invention.

In block 2014 the beverage making cartridge 200 contains a solid gas source 202 or an aroma enhanced solid gas source 202, which through sublimation emits a gas 704.

In block 2016 the solid gas source is formed by combining, in solid form, at least a carbonating gas and an aroma. In an exemplary embodiment, for example and not a limitation, as illustrated in at least FIG. 3, the solid gas source 202A can be carbon dioxide (dry-ice) in frozen form, or other solid gas and an aroma enhanced solid gas source 202B can be a ratio mixture of the solid gas source 202A and an aroma precipitate 218.

In block 2018 the aroma enhanced solid gas source sublimates from solid form emitting a gas 704, which comprises at least a carbonation molecule and an aroma molecule for dissolving into a beverage diluent liquid. The beverage diluent being used to form a beverage in vessel 118.

In block 2020 as illustrated in at least FIG. 16, more than one of a gas can be segregated into separate portions of the gas storage tank 108A-C (in at least FIG. 16). In an exemplary embodiment, different types of gasses and/or different types of aroma enhanced gases can be segregated into separate portions of the gas storage tank 108A-C and kept from mixing. This effectuates that ability to make, for example and not a limitation, a tea with tea aroma enhanced gas and a coffee with coffee aroma enhanced gas, keeping both types of enhanced gas in a storage tank segregated, from each other, to prevent the different gas types from mixing. An advantage in the present invention is that multiple aroma enhanced gas types can be used in the same beverage making machine 100.

In block 2022 each of the gases in the separate storage portion of the gas storage tank are arranged as to prevent the gas in each of the portions from mixing.

In block 2024 selection of which of the gas from at least one of the gas storage portion to be dissolved into the beverage diluent can be made.

Referring to FIG. 27B there is illustrated examples of a method of making a beverage. In an exemplary embodiment, for example and not a limitation, and with reference to at least FIGS. 7 and 8, supply cartridges 504 illustrated in at least FIG. 18 can be supplied to operate a system 100. In this regard, the supply cartridges 504 can include beverage making cartridges 200 with include micro ingredients 214, solid gas source 202A or aroma enhanced solid gas source 202B, beverage diluent filter 222, and/or other types and kinds of beverage making cartridges 200 which comprises other types and kinds of supplies, as may be required and/or desired in a particular embodiment.

In an exemplary embodiment, beverage making cartridges 200 include supplies which can be in inserted into the beverage making machine 100. As example, a beverage making cartridge 200, which comprises a solid gas source 202 or an aroma enhanced solid gas source 202 can be inserted into a solid gas source receptacle 110 and allowed to sublimate, emitting a gas 704 which can be captured, stored and utilized to pressurize a gas storage tank 108 and subsequently be dissolved by a dissolver 104 into a beverage diluent liquid 702. The beverage diluent liquid can then be optionally mixed with other micro ingredients 214 and dispensed through a dispenser 120, to form a beverage in vessel 118. With reference to at least FIGS. 27B and 7-8, the method begins in block 2026.

In block 2026 at least one of a beverage making cartridge 200 comprising at least one of a micro ingredient 214 and at least one solid gas source, or at least one aroma enhanced solid gas source, or a combination thereof can be inserted into a beverage making beverage making machine 100. The method moves to block 2028.

In block 2028 the solid gas source 202 or the aroma enhanced solid gas source 202 is allowed to sublimate emitting gas 704, which can be captured, stored and utilized to pressurize a gas storage tank 108. The method moves to block 2030.

In block 2030 a beverage diluent liquid 702 can be supplied to a beverage diluent receptacle 102. In an exemplary embodiment, for example and not a limitation, a beverage diluent liquid 702 can be a liquid such as water or other liquid that can be mixed with other ingredient to form a beverage. Optionally, the liquid can have gas dissolved into the liquid to form a gas infused beverage. The method moves to block 2032.

In block 2032 the pressurized gas from the gas storage tank can be dissolved, by dissolver 104, into the beverage diluent liquid 702 to form a gas infused beverage diluent liquid. In an exemplary embodiment, for example and not a limitation, the gas can be carbon dioxide (CO2) carbonating the beverage diluent liquid. A target carbonation level in the range of up to nine volumes, while the beverage diluent liquid 702 is stored in the dissolver 104, is preferred, but can vary, as may be required and/or desired in a particular embodiment. The method moves to block 2034.

In block 2034 selectively a predefined ratio of at least one of the micro ingredient 214 and the beverage diluent to form a beverage in vessel 118. The beverage diluent liquid can be infused with gas or the beverage diluent liquid non-infused, as may be required and/or desired in a particular embodiment. In this regard, at least FIGS. 7 and 8 illustrate different examples of the beverage diluent liquid fluid flow pathways. The method is then exited.

Referring to FIG. 27B there is illustrated examples of a method of making a beverage. The method begins in block 2036.

In block 2036 at least one of a beverage making cartridge 200 comprising at least one of a micro ingredient 214 and at least one solid gas source, or at least one aroma enhanced solid gas source, or a combination thereof can be inserted into a beverage making beverage making machine 100. The method moves to block 2038.

In block 2038 a beverage diluent liquid 702 can be supplied to a beverage diluent receptacle 102. In an exemplary embodiment, for example and not a limitation, a beverage diluent liquid 702 can be a liquid such as water or other liquid that can be mixed with other ingredient to form a beverage. Optionally, the liquid can have gas dissolved into the liquid to form a gas infused beverage. The method moves to block 2040.

In block 2040 selectively a predefined ratio of at least one of the micro ingredient 214 and the beverage diluent liquid can be dispensed to form a beverage in vessel 118. The beverage diluent liquid can be infused with gas or the beverage diluent liquid non-infused, as may be required and/or desired in a particular embodiment. In this regard, at least FIGS. 7 and 8 illustrate different examples of the beverage diluent liquid fluid flow pathways. The method is then exited.

Referring to FIG. 27B there are also illustrated exemplary embodiments of methods of making a beverage. Such exemplary embodiments illustrated below can be selectively utilized with the methods of the present invention.

In block 2042, as illustrated in at least FIGS. 5 and 21-22 the beverage diluent liquid can be cooled by thermally coupling the beverage diluent cooler 148 with the beverage diluent receptacle 102, which is an arrangement that utilizes the cool surface temperature of the solid gas source to cool the beverage diluent liquid.

Referring to FIGS. 28A-B there is illustrated examples of methods of supplying consumables to a beverage making machine. With reference to FIG. 28A and at least FIG. 18, in an exemplary embodiment, for example and not a limitation, an initial beverage making cartridge 200 comprising a solid gas source 202 can be inserted into the beverage making machine 100. The solid gas source 202 sublimates producing a gas that can be captured and pressurized in a gas storage tank 108, the gas storage tank being arranged in the beverage making machine 100. The gas can be utilized to form a plurality of gas infused beverages. When the gas supply in the gas storage tank 108 reaches a reorder condition a replacement beverage making cartridge 200 having a solid gas source 202 can be reordered.

The term "reorder condition", in the present invention, is intended to mean the predetermined point at which it is recommended that the depleted supply should be reordered. This depleted supply point can be when the product is completely exhausted or more preferably when there is sufficient supply remaining to accommodate the time it takes for a regularly scheduled periodic trip, by the consumer, to the grocery store to take place and/or a delivery service to ship the consumer an online order or phone order of the new supply to replace the depleted supply. The beverage making machine 100 can selectively be programmed to trigger the reorder condition based on the needs and preferences of the consumer including, but not limited to, allowing the beverage making machine 100 to determine when a supply needs to be reordered and automatically placing a resupply order by way of a global network 604.

Use of the term "no-high-pressure-gas-allowed-delivery-service", in the present invention, is intended to mean a delivery service that restricts or bans the shipment of high pressure gas. Many delivery services restrict or ban such high pressure gas shipments due to safety concerns. In this regard, high pressure gas under certain circumstances, such as over pressure gas tank, excessive heating, gas tank structural defects, and other conditions can cause catastrophic gas tank failure, which can lead to very serious injury and damage. As such, many delivery services avoid shipping high pressure gas. An advantage, in the present invention, is that a solid gas source 202 under little to no pressure conditions can be shipped to the point of use. At the point of use, the solid gas source is inserted into the beverage making machine 100 where it sublimated to pressurize a gas storage tank 108. In this regard, the present invention overcomes the limitation of not being able to ship high pressure gas by shipping the gas in solid form at no or low pressure and then generating the high pressure gas when inserted into the beverage making machine 100. As such the term "no-high-pressure-gas-allowed-delivery-service" is used to refer to the present invention's ability to overcome the limitation of not being able to ship high pressure gas by shipping a solid gas source 202 form which a high pressure gas can be generated therefrom at point of use. The method begins in block 3002.

In block 3002 at least one of the beverage making cartridge 200 is inserted into the beverage making machine 100. The method move to block 3004.

In block 3004 the solid gas source 202 or the aroma enhanced solid gas source 202 is allowed to sublimate emitting gas 704, which can be captured, stored and utilized to pressurize a gas storage tank 108. The method moves to block 3006.

In block 3006 the gas 704 is used to form a plurality of beverage, which reduces the supply of gas in the storage tank 108. The method moves to block 3008.

In block 3008 a low gas and/or micro ingredient, or other low supply level can trigger a reorder condition, at least one of the beverage making cartridges 200 is reordered by way of a global network 604. The method moves to block 3010.

In block 3010 at least one of the beverage making cartridge 200 is received, having been shipped to replace the depleted supply of gas by way of a no-high-pressure-gas-allowed-delivery-service. The method moves back to block 3002.

In another exemplary embodiment, there is illustrated a method of supplying consumables to a beverage making machine 100. With reference to FIG. 28A and at least FIG. 18, in this exemplary embodiment, for example and not a limitation, a consumer can provide an inventory list of beverages they would like to make with the beverage making machine 100. From the list of beverages the consumer wants to make, a plurality of beverage making cartridges 200 needed to make the selected beverages can be determined. By way of a global network 604 the plurality of beverage making cartridges 200 can be ordered. The plurality of beverage making cartridges 200 can be shipped to the point of use and/or the consumer's location. Upon delivery at the point of use, the beverage making machine 100 can prompt the consumer to insert certain of the plurality of beverage making cartridges 200 into the beverage making machine 100. The plurality of beverage making cartridges can include micro ingredients, filters, solid gas sources, aroma enhanced solid gas sources, and other types and/or kinds of supplies, as may be required and/or desired in a particular embodiment. With respect to the solid gas sources 202, the solid gas sources can be inserted into the beverage making machine 100 and utilized to pressurize the gas storage tank, which is arranged to be part of the beverage making machine 100. The method begins in block 3012.

In block 3012 the consumer is allowed to provide an inventory list of beverages that they would like to make with the beverage making machine 100. The method moves to block 3014.

In block 3014 a plurality of beverage making cartridges 200 can be determined based in part of the inventory list of beverages the consumer would like to make with the beverage making machine 100. The method moves to block 3016.

In block 3016 by way of a global network 604 an order can be placed for the plurality of beverages needed. The method moves to block 3018.

In block 3018 the plurality of beverage making cartridges 200 are received by way of a no-high-pressure-gas-allowed-delivery-service. The method moves to block 3020.

In block 3020 the consumer can insert certain of the plurality of beverage making cartridges 200, which comprises a solid gas source or an aroma enhanced solid gas source into the beverage making machine 100. The method moves to block 3022.

In block 3022 the solid gas source 202 or the aroma enhanced solid gas source 202 is allowed to sublimate emitting gas 704, which can be captured, stored, and utilized to pressurize a gas storage tank 108. The method is exited.

In another exemplary embodiment, there is illustrated a method of supplying consumables to a beverage making machine 100. With reference to FIG. 28A and at least FIG. 18, in this exemplary embodiment, for example and not a limitation, at least one of a beverage making cartridge 200 can be shipped to the point of use and/or the consumer's location. At the point of use certain of the beverage making cartridge 200 can be inserted into the beverage making machine 100. In this regard, the beverage making cartridge 200 can include micro ingredients, filters, solid gas sources, aroma enhanced solid gas sources, and other types and/or kinds of supplies, as may be required and/or desired in a particular embodiment. With respect to the solid gas sources 202, the solid gas sources can be inserted into the beverage making machine 100 and utilized to pressurize the gas storage tank, which is arranged to be part of the beverage making machine 100. The gas can then be used to make a plurality of beverages. The method begins in block 3024.

In block 3024 at least one of a beverage making cartridge 200 is received by way of a no-high-pressure-gas-allowed-delivery-service. The method moves to block 3026.

In block 3026 the beverage making cartridges 200, which comprises a solid gas source or an aroma enhanced solid gas source can be inserted into the beverage making machine 100. The method moves to block 3028.

In block 3028 the solid gas source 202 or the aroma enhanced solid gas source 202 is allowed to sublimate emitting gas 704, which can be captured, stored and utilized to pressurize a gas storage tank 108. The method moves to block 3030.

In block 3030 the gas 704 is used to form a plurality of beverage, which reduces the supply of gas in the storage tank 108. The method is exited.

Referring to FIG. 28B there are also illustrated exemplary embodiments of methods of supplying consumables to a beverage making machine. Such exemplary embodiments illustrated below can be selectively utilized with the methods of the present invention.

In block 3032 a notification to a consumer can be sent to the consumer's wireless device, such as wireless device 602. Such a notification can be a text message and/or instant message, an email, a verbal recorded notification, a symbol that appears on the consumer's wireless device to indicate action is required or information is available, and/or other types and kinds of notifications, as may be required and/or desired in a particular embodiment. The method moves to block 3034.

In block 3034 the consumer is allowed to reorder supplies, by way of the consumer's wireless device, such as wireless device 602. Such a supply reorder can be a text message and/or instant message, an email, accessing a website, ecommerce transaction, confirming a payment charge or order acceptance with the consumer's wireless device, providing a verbal recorded order and/or approval, responding to a symbol that appears on the consumer's wireless device to indicate reorder is approved or an order is placed, and/or other types and kinds of supply reordering methods and/or reordering mechanisms, as may be required and/or desired in a particular embodiment.

In block 3036 a consumer is allowed to reorder by way of the computer control 122 that is used to operate the beverage making machine 100, as illustrated in at least FIGS. 7 and 8.

In block 3038 different gas types (enhanced aroma and non-enhanced aroma gas types) can be segregated into separate portions of the gas storage tank to prevent the different gas types from mixing.

In block 3040 the solid gas source 202 is frozen carbon dioxide, which can optionally be mixed in a predetermined ratio of the frozen carbon dioxide and a frozen aroma precipitate.

In block 3042 the gas 704 can be utilized to form a plurality of beverages. The use of which reduces the supply of gas in the storage tank 108. The method moves to block 3044.

In block 3044 at least one of the beverage making cartridges 200 can be reordered, by way of a global network 602, when the gas 704 is depleted, triggering a reorder condition. The method moves to block 3046.

In block 3046 at least one of the beverage making cartridges 200 is received having been shipped by way of a no-high-pressure-gas-allowed-delivery-service. The method moves to block 3048.

In block 3048 at least one of the beverage making cartridges 200 received is inserted into the beverage making machine 100. In an exemplary embodiment, the beverage making cartridges 200 that contain a solid gas source should preferably be inserted upon receiving them at the point of use so that the gas, which may already be sublimating, resultant from the solid gas source warming, can be captured and stored in the gas storage tank rather than just venting to the atmosphere.

In block 3050 certain of the beverage making cartridges are removed from the beverage making machine after pressurizing the gas storage tank and stored in a refrigerated appliance 402. In an exemplary embodiment, a beverage making cartridge can contain a solid gas source and at least one of a micro ingredient. Such a beverage making cartridge can be inserted into the beverage making machine to allow the solid gas source to sublimate pressurizing the gas storage tank. Once the gas storage tank has been pressurized, the beverage making cartridge 200 can be removed from the beverage making machine and stored in a refrigerated appliance 402 to extend the shelf life of the micro ingredient, to cool the beverage diluent liquid which may have been added to the beverage making cartridge, and/or for other reasons, as may be required and/or desired in a particular embodiment.

In block 3052 the plurality of beverage making cartridges can be utilized to form a plurality of beverages, as may be required and/or desired in a particular embodiment.

In block 3054 a notification to a consumer can be sent to the consumer's wireless device, such as wireless device 602. Such a notification can be a text message and/or instant message, an email, a verbal recorded notification, a symbol that appears on the consumer's wireless device to indicate action is required or information is available, and/or other types and kinds of notifications, as may be required and/or desired in a particular embodiment.

In block 3056 the consumer is allowed to reorder supplies, by way of the consumer's wireless device, such as wireless device 602. Such a supply reorder can be a text message and/or instant message, an email, accessing a website, ecommerce transaction, confirming a payment charge or order acceptance with the consumer's wireless device, providing a verbally recorded order and/or approval, responding to a symbol that appears on the consumer's wireless device to indicate reorder is approved or an order is placed, and/or other types and kinds of supply reordering methods and/or reordering mechanisms, as may be required and/or desired in a particular embodiment.

Figure 29A:
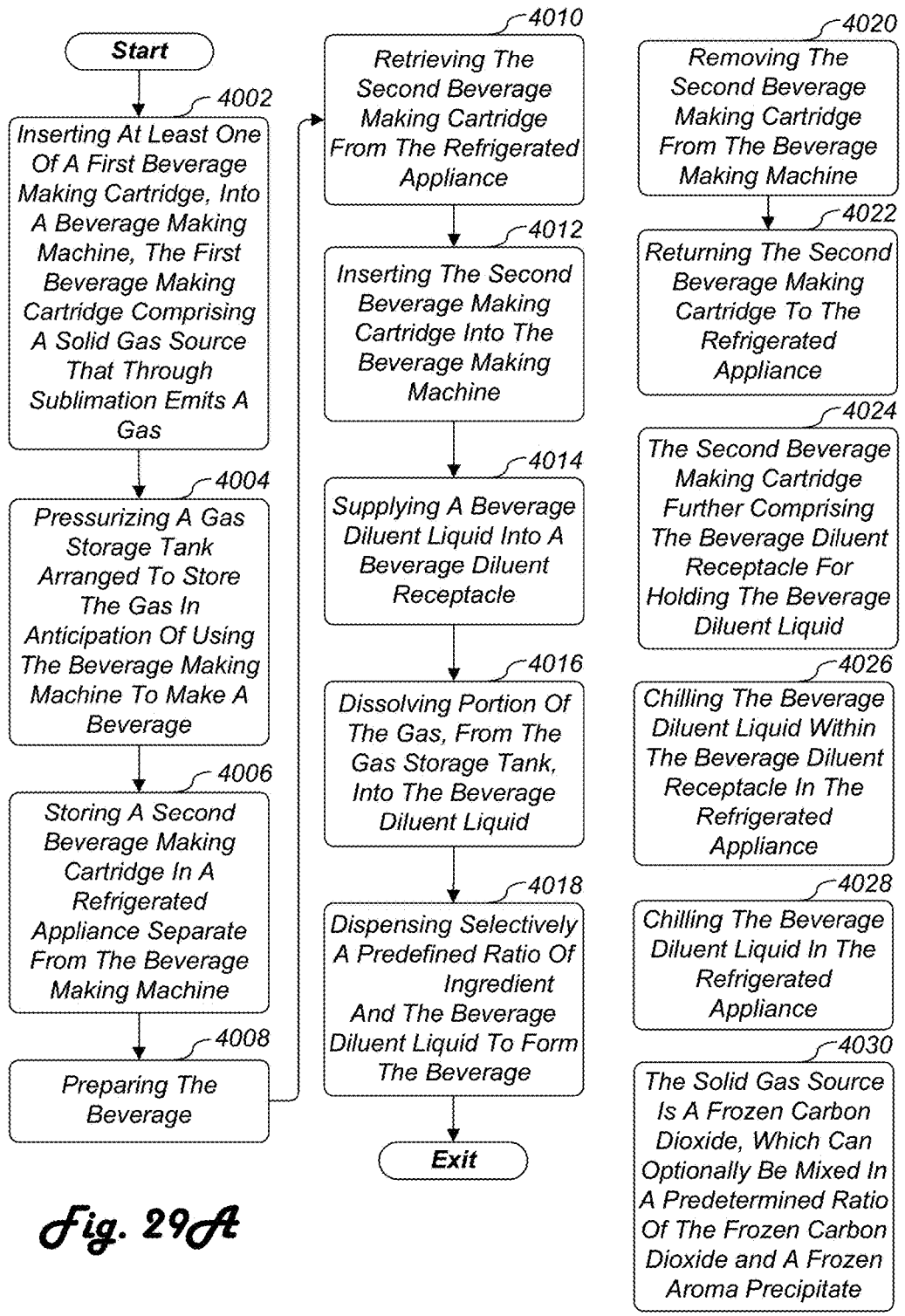
FIGS. 29A-C illustrates examples of methods of making a beverage in a beverage making machine.
Figure 29B:
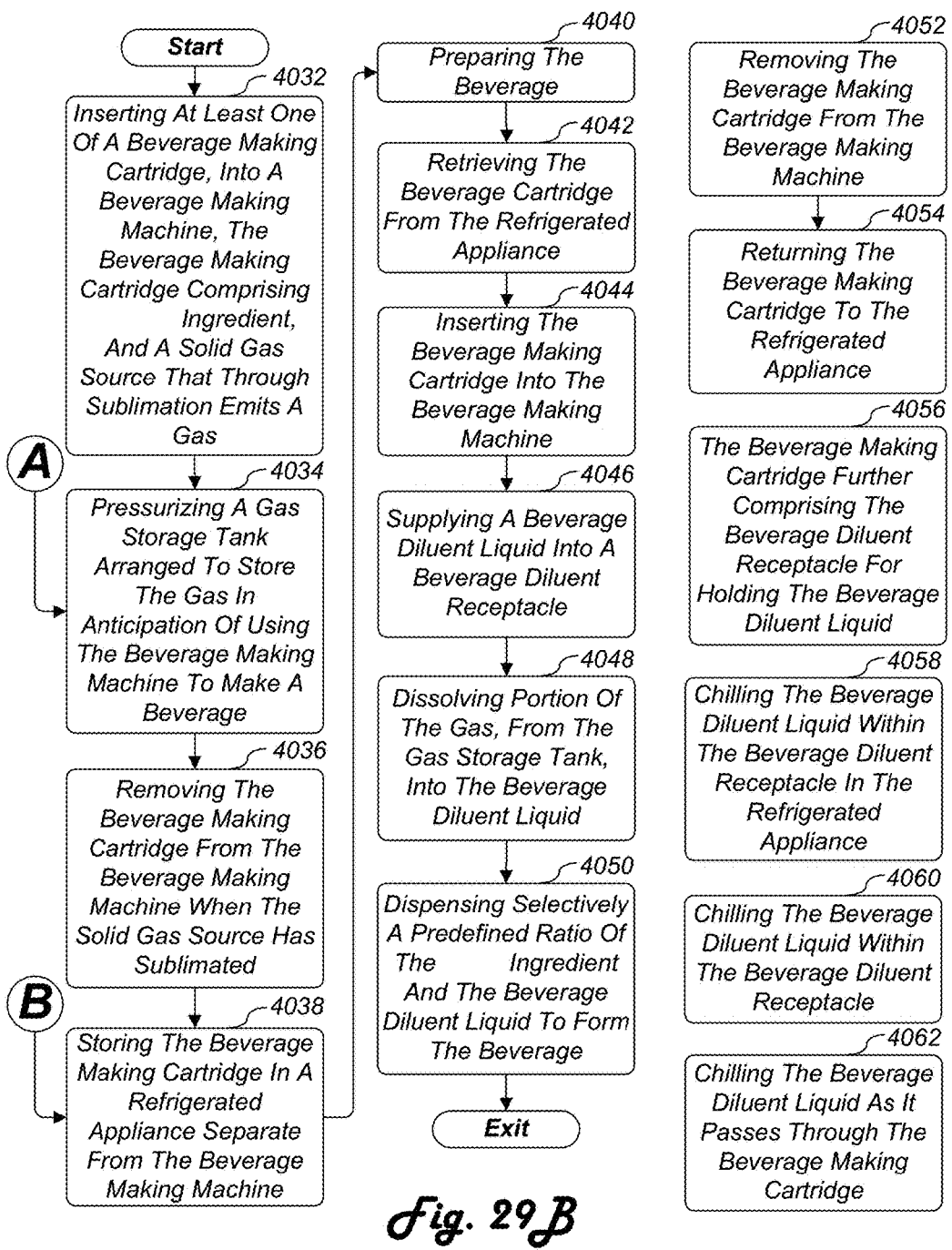
Figure 29C:
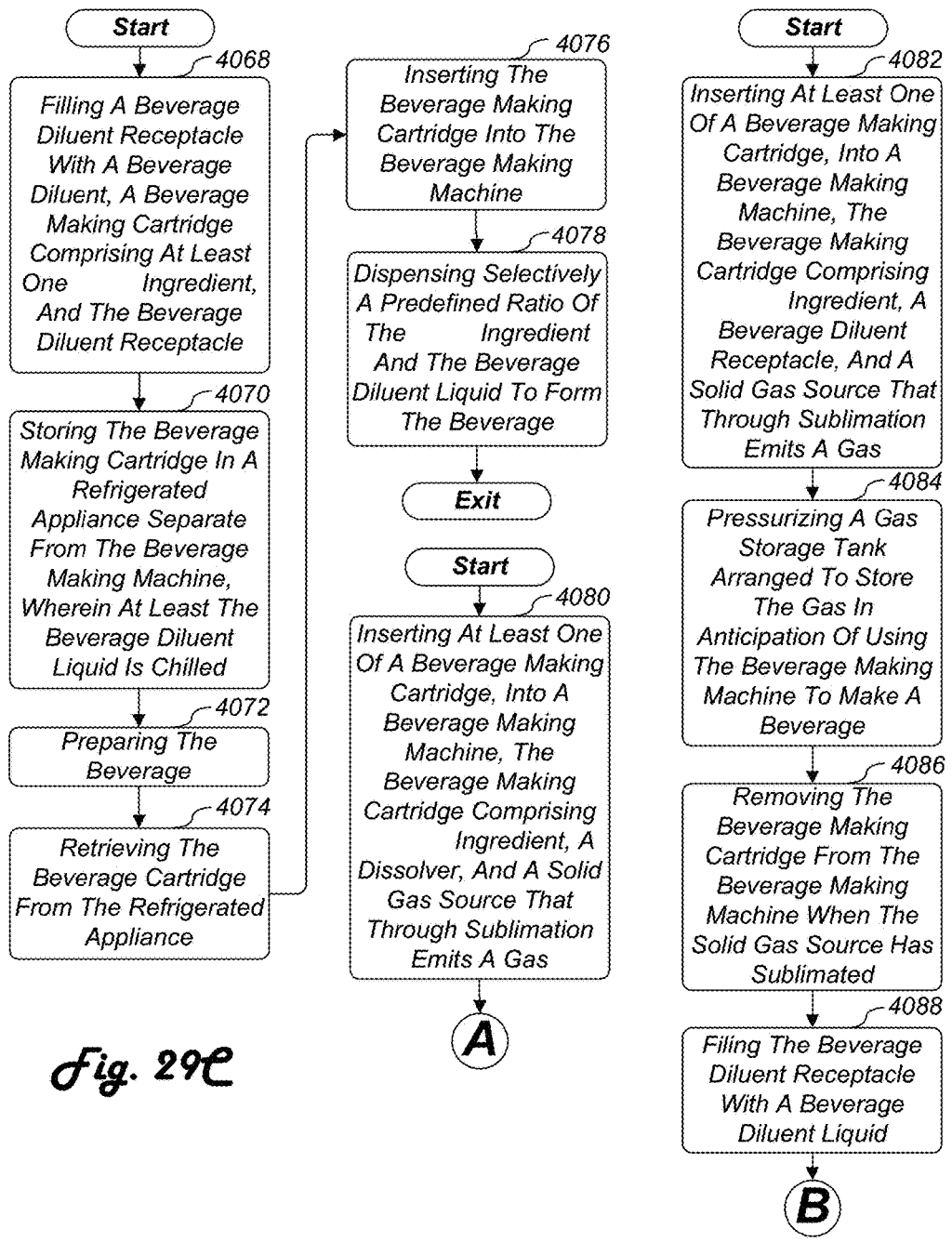

Referring to FIGS. 29A-C there is illustrated examples of methods of making a beverage in a beverage making machine 100. In an exemplary embodiment, the beverage making cartridges can be stored in a refrigerated appliance 402 being removed and inserted into a beverage making machine 100 when a beverage needs to be made. The beverage making cartridges 200 can then be removed from the beverage making machine 100 and returned to the refrigerated appliance 402. In this regard, and as better illustrated in at least FIG. 10, the beverage making cartridges 200 can be chilled in a refrigerated appliance 402 only being removed and inserted in a beverage making machine 100 when a beverage is formed.

There are several advantages to storing the beverage making cartridges in a refrigerated appliance 402. One such advantage can be chilling the beverage diluent in a beverage making cartridge in a refrigerated appliance 402 prior to beverage making. In this regard, when cold beverage diluent liquid is used in beverage making it is easier to infuse gas and more refreshing to drink a cold beverage. In an exemplary embodiment, chilling the beverage diluent liquid approaching 32 degrees Fahrenheit, prior to dissolving the gas into the beverage diluent liquid, increases the solubility of the gas into the beverage diluent liquid. Thus allowing higher volumes of gas level to be obtained in a shorter amount of time. In addition, this can cause the gas infused beverage diluent liquid to reach dissolved equilibrium and hold the gas infusion better when dispensed. As such, throughput of producing gas infused beverage diluent is increased.

Another advantage can be chilling the micro ingredients in a beverage making cartridge, in a refrigerated appliance 402, can extend the shelf life of the micro ingredients. In this regard, such sensitive micro ingredients can include, for example and not a limitation, dairy, soy, fruit based, microbiological sensitive ingredients, and/or other types and kinds of ingredients that are quickly perishable ingredients when exposed to unrefrigerated environments for a prolonged period of time, or as may be required and/or desired in a particular embodiment.

In an exemplary embodiment, the beverage making cartridge 200 containing only the solid gas source 202 can be inserted into the beverage making machine 100 and be allowed to sublimate and pressurize the gas storage tank 108. Once the gas storage tank has been pressurized the cartridges useful function is complete and it can be discarded, recycled, or simply remain in the beverage making machine. On the other hand, the micro ingredient containing beverage making cartridges 200 can be stored in the refrigerated appliance 402 and removed and used with the beverage making machine only when needed to form a beverage, then returned to the refrigerated appliance 402. Referring to FIG. 29A, the method begins in block 4002.

In block 4002 at least one of a first beverage making cartridge 200 can be inserted into the beverage making machine 100. The first beverage making cartridge comprising a solid gas source 202. The solid gas source 202 sublimates emitting a gas 704. The method moves to block 4004.

In block 4004 the gas storage tank 108 is pressurized, by way of the solid gas source 202 emitting gas as it sublimates, in anticipation of the beverage making machine 100 being used to make a beverage. The method moves to block 4006.

In block 4006 a second beverage making cartridge is stored in a refrigerated appliance 402 separate from the beverage making machine 100. The method moves to block 4008.

In block 4008 having pressurized the gas storage tank in the preceding steps, the beverage making machine 100 is now prepared for making a beverage. The consumer can prepare a beverage by way of the following steps, which starts in block 4010.

In block 4010 the second beverage making cartridge 200 can be retrieved from the refrigerated appliance. The method moves to block 4012.

In block 4012 the second beverage making cartridge 200 can be inserted into the beverage making machine 100. The method moves to block 4014.

In block 4014 a supply of beverage diluent liquid 702 can be supplied to the beverage diluent receptacle 102. The method moves to block 4016.

In block 4016 at least a portion of the gas from the gas storage tank can be dissolved into the beverage diluent liquid. The method continues in block 4018.

In block 4018 a predefined ratio of a micro ingredient and the beverage diluent liquid (with or without gas infusion or a combination of both) can be dispensed to form a beverage. The method is then exited.

Referring to FIG. 29A there are also illustrated exemplary embodiments of methods of making a beverage in a beverage making machine 100. Such exemplary embodiments illustrated below can be selectively utilized with the methods of the present invention.

In block 4020 the second beverage making cartridge 200 can be removed from the beverage making machine 100. The method moves to block 4022.

In block 4022 the second beverage making cartridge 200 can be returned to the refrigerated appliance 402.

In block 4024 the second beverage making cartridge 200 can further comprise the beverage diluent receptacle for holding the beverage diluent liquid. In this regard, when the beverage diluent liquid is supplied in the beverage diluent receptacle and the beverage making cartridge comprising the beverage diluent receptacle is stored in the refrigerated appliance 402 the beverage diluent liquid is cooled.

In block 4026 the beverage diluent liquid is chilled while in the beverage diluent receptacle in the refrigerated appliance 402. In this regard, when cold beverage diluent liquid is used in beverage making it is easier to infuse gas and more refreshing to drink a cold beverage. In an exemplary embodiment, chilling the beverage diluent liquid approaching 32 degrees Fahrenheit, prior to dissolving the gas into the beverage diluent liquid, increases the solubility of the gas into the beverage diluent liquid. Thus allowing higher volumes of gas level to be obtained in a shorter amount of time. In addition, this can cause the gas infused beverage diluent liquid to reach dissolved equilibrium and hold the gas infusion better when dispensed. As such, throughput of producing gas infused beverage diluent liquid is increased.

In block 4028 the beverage diluent liquid is chilled in the refrigerated appliance 402. In this exemplary embodiment, the beverage diluent liquid independent and not being part of the beverage making cartridge can be chilled in a separate container in the refrigerated appliance so that when the beverage diluent liquid is supplied to the beverage making machine it is chilled. This helps with the ability to infuse gas into the beverage diluent liquid as well as provides a chilled beverage.

In block 4030 the solid gas source 202 is frozen carbon dioxide, which can optionally be mixed in a predetermined ratio of the frozen carbon dioxide and a frozen aroma precipitate.

Referring to FIG. 29B there is illustrated examples of methods of making a beverage in a beverage making machine 100. In an exemplary embodiment, the beverage making cartridges comprising at least a solid gas source and a micro ingredient can be inserted into the beverage making machine 100 so that the solids gas source can sublimate emitting a gas that can be captured and use to pressurize a gas storage tank. Once the solid gas source has completely sublimated (is gone) and the gas storage tank pressurized the beverage making cartridge can be removed from the beverage making machine and stored in a refrigerated appliance 402 separate from the beverage making machine 100. When it is desired to make a beverage, the beverage making cartridge can be removed from the refrigerated appliance 402 and inserted into a beverage making machine 100. The beverage can be formed. The beverage making cartridges 200 can then be removed from the beverage making machine 100 and returned to the refrigerated appliance 402. In this regard, and as better illustrated in at least FIG. 10, the beverage making cartridges 200 can be chilled in a refrigerated appliance 402 only being removed and inserted in a beverage making machine 100 when a beverage is formed. The method begins in block 4032.

In block 4032 at least one of a beverage making cartridge 200 can be inserted into the beverage making machine 100. The first beverage making cartridge comprising at least one of a solid gas source 202 and at least one of a micro ingredient. The solid gas source 202 sublimates emitting a gas 704. The method moves to block 4034.

In block 4034 the gas storage tank 108 is pressurized, by way of the solid gas source 202 emitting gas as it sublimates, in anticipation of the beverage making machine 100 being used to make a beverage. The method moves to block 4036.

In block 4036 after the solid gas source has sublimated the beverage making cartridge 200 can be removed from the beverage making machine 100. The method moves to block 4038.

In block 4038 the beverage making cartridge 200 can be stored in a refrigerated appliance 402 separate from the beverage making machine 100. The method moves to block 4040.

In block 4040 having previously pressurized the gas storage tank, the beverage making machine 100 is now prepared for making a beverage. The consumer can prepare a beverage by way of the following steps, which starts in block 4042

In block 4042 the beverage making cartridge 200 can be retrieved from the refrigerated appliance 402. The method moves to block 4044.

In block 4044 the beverage making cartridge 200 can be inserted into the beverage making machine 100. The method moves to block 4046.

In block 4046 a supply of beverage diluent liquid 702 can be supplied to the beverage diluent receptacle 102. The method moves to block 4048.

In block 4048 at least a portion of the gas from the gas storage tank can be dissolved into the beverage diluent liquid. The method continues in block 4050.

In block 4050 a predefined ratio of a micro ingredient and the beverage diluent liquid (with or without gas infusion or a combination of both) can be dispensed to form a beverage. The method is then exited.

Referring to FIG. 29B there are also illustrated exemplary embodiments of methods of making a beverage in a beverage making machine 100. Such exemplary embodiments illustrated below can be selectively utilized with the methods of the present invention.

In block 4052 the beverage making cartridge 200 can be removed from the beverage making machine 100. The method moves to block 4054.

In block 4054 the beverage making cartridge 200 can be returned to the refrigerated appliance 402.

In block 4056 the second beverage making cartridge 200 can further comprise the beverage diluent receptacle for holding the beverage diluent liquid. In this regard, when the beverage diluent liquid is supplied in the beverage diluent receptacle and the beverage making cartridge comprising the beverage diluent receptacle is stored in the refrigerated appliance 402 the beverage diluent liquid is cooled.

In block 4058 the beverage diluent liquid is chilled while in the beverage diluent receptacle in the refrigerated appliance 402. In this regard, when cold beverage diluent liquid is used in beverage making it is easier to infuse gas and more refreshing to drink a cold beverage. In an exemplary embodiment, chilling the beverage diluent liquid approaching 32 degrees Fahrenheit, prior to dissolving the gas into the beverage diluent liquid, increases the solubility of the gas into the beverage diluent liquid. Thus allowing higher volumes of gas level to be obtained in a shorter amount of time. In addition, this can cause the gas infused beverage diluent liquid to reach dissolved equilibrium and hold the gas infusion better when dispensed. As such, throughput of producing gas infused beverage diluent liquid is increased.

In block 4060 the beverage diluent liquid is chilled in the refrigerated appliance 402. In this exemplary embodiment, the beverage diluent liquid independent and not being part of the beverage making cartridge can be chilled in a separate container in the refrigerated appliance so that when the beverage diluent liquid is supplied to the beverage making machine it is chilled. This helps with the ability to infuse gas into the beverage diluent liquid as well as provides a chilled beverage.

In block 4062 the beverage diluent liquid is chilled as it passes through the beverage making cartridge. In this regard, the beverage diluent cooler 148 can be utilized to chill the beverage diluent liquid as it passes through the beverage making cartridge as the beverage is being formed.

Referring to FIG. 29C there is illustrated examples of methods of making a beverage in a beverage making machine 100. In an exemplary embodiment, the beverage making cartridges comprising at least one of a micro ingredient and a beverage diluent receptacle 102. The beverage diluent receptacle can be filled with a beverage diluent liquid 702 and stored in a refrigerated appliance 402 separate from the beverage making machine to chill the beverage diluent liquid, which consequentially can also extend the shelf life of the micro ingredient. When it is desired to make a beverage, the beverage making cartridge 200 can be removed from the refrigerated appliance 402 and inserted into a beverage making machine 100. The beverage can be formed. The beverage making cartridges 200 can then be removed from the beverage making machine 100, refilled with a beverage diluent liquid, and returned to the refrigerated appliance 402. In this regard, and as better illustrated in at least FIG. 10, the beverage making cartridges 200 can be chilled in a refrigerated appliance 402 only being removed and inserted in a beverage making machine 100 when a beverage is formed. The method begins in block 4068.

In block 4068 a beverage making cartridge 200 comprising at least one of a micro ingredient 214 and a beverage diluent receptacle can have a beverage diluent liquid 702 filled into the beverage diluent receptacle. The method moves to block 4070.

In block 4070 the beverage making cartridge 200 can be stored in a refrigerated appliance 402 separate from the beverage making machine 100, wherein the beverage diluent liquid 702 is chilled. The method moves to block 4072.

In block 4072 having filled the beverage diluent receptacle with beverage diluent liquid, placed in a refrigerated appliance 402 to chill the beverage diluent liquid 702, preparation for making a beverage is complete. The consumer can prepare a beverage by way of the following steps, which starts in block 4074.

In block 4074 the beverage making cartridge 200 can be retrieved from the refrigerated appliance 402. The method moves to block 4076.

In block 4076 the beverage making cartridge 200 can be inserted into the beverage making machine 100. The method moves to block 4078.

In block 4078 a predefined ratio of a micro ingredient and the beverage diluent liquid can be dispensed to form a beverage. The method is then exited.

Referring to FIG. 29C there is illustrated examples of methods of making a beverage in a beverage making machine 100. In an exemplary embodiment, the beverage making cartridges comprising at least a solid gas source, a micro ingredient, and a dissolver can be inserted into the beverage making machine 100 so that the solid gas source can sublimate emitting a gas that can be captured and use to pressurize a gas storage tank. Once the solid gas source has completely sublimated (is gone) and the gas storage tank pressurized the beverage making cartridge can be removed from the beverage making machine and stored in a refrigerated appliance 402 separate from the beverage making machine 100. When it is desired to make a beverage, the beverage making cartridge can be removed from the refrigerated appliance 402 and inserted into a beverage making machine 100. The dissolver within the beverage making cartridge 200 can dissolve a portion of the gas into the beverage diluent liquid and the gas infused beverage diluent liquid can be mixed with the micro ingredient to form the beverage. The beverage making cartridges 200 can then be removed from the beverage making machine 100 and returned to the refrigerated appliance 402. In this regard, and as better illustrated in at least FIG. 10, the beverage making cartridges 200 can be chilled in a refrigerated appliance 402 only being removed and inserted in a beverage making machine 100 when a beverage is formed. The method begins in block 4080.

In block 4080 at least one of a beverage making cartridge 200 can be inserted into the beverage making machines, The beverage making cartridge comprising at least one of a micro ingredient, a dissolver 104, and at least one of a solid gas source that through sublimation emits a gas. The method moves to block 4034 referenced in FIG. 29B, wherein the step in block 4048 of dissolving the gas into the beverage diluent is accomplished by way of the dissolver which is part of the beverage making cartridge 200 in this exemplary embodiment.

Referring to FIG. 29C there is illustrated examples of methods of making a beverage in a beverage making machine 100. In an exemplary embodiment, the beverage making cartridges comprising at least a solid gas source, a micro ingredient, and a beverage diluent receptacle can be inserted into the beverage making machine 100 so that the solids gas source can sublimate emitting a gas that can be captured and use to pressurize a gas storage tank. Once the solid gas source has completely sublimated (is gone) and the gas storage tank pressurized the beverage making cartridge can be removed from the beverage making machine, the beverage diluent receptacle filled with a beverage diluent liquid 702, and the beverage making cartridge 200 can be stored in a refrigerated appliance 402 separate from the beverage making machine 100. When it is desired to make a beverage, the beverage making cartridge can be removed from the refrigerated appliance 402 and inserted into a beverage making machine 100. The beverage diluent liquid (with or without gas infusion) can be mixed with the micro ingredient to form the beverage. The beverage making cartridges 200 can then be removed from the beverage making machine 100 and returned to the refrigerated appliance 402. In this regard, and as better illustrated in at least FIG. 10, the beverage making cartridges 200 can be chilled in a refrigerated appliance 402 only being removed and inserted in a beverage making machine 100 when a beverage is formed. The method begins in block 4082.

In block 4082 at least one of a beverage making cartridge 200 can be inserted into the beverage making machines, The beverage making cartridge comprising at least one of a micro ingredient, a beverage diluent receptacle 102, and at least one of a solid gas source that through sublimation emits a gas. The method moves to block 4084.

In block 4084 the gas storage tank 108 is pressurized, by way of the solid gas source 202 emitting gas as it sublimates, in anticipation of the beverage making machine 100 being used to make a beverage. The method moves to block 4086.

In block 4086 after the solid gas source has sublimated the beverage making cartridge 200 can be removed from the beverage making machine 100. The method moves to block 4088.

In block 4088 the beverage diluent receptacle within the beverage making cartridge 200 can be filled with a beverage diluent liquid. The method moves to block 4038 referenced in FIG. 29B.

Referring to FIGS. 30A-B there is illustrated examples of methods of increasing the retained volume of gas 704 in the beverage after dispense into a vessel 118, by mixing a beverage diluent liquid 702 with at least one of a micro ingredient 214 to form an enhanced beverage diluent liquid. In an exemplary embodiment, it can be desirable to prevent as best possible the dissolved gas in the beverage diluent liquid 702 from breaking out and escaping from the beverage upon dispense into the vessel 118. In this regard, pressure change from inside the pressurized internal environment of the beverage making machine 100 dissolver 104 interconnected components and tubing to the standard pressure and atmospheric conditions of the consumer's vessel 118 is one factor that can cause outgassing of the gas 704 from the finished beverage.

One solution, in the present invention, can be blending sweetener and/or non-nutritive sweetener with the beverage diluent 702 to create an enhanced beverage diluent liquid and then dissolve gas into the enhanced beverage diluent liquid. An advantage in the present invention is that the enhanced beverage diluent liquid when dispensed into the vessel 118 holds the gas 704 better. In this regard, resulting in a higher dissolved volume of gas 704 in the beverage, as compared to having dissolved the gas 704 into the beverage diluent liquid 702 only.

The better the beverage holds the dissolved gas 704 the better and longer the beverage's sparkling benefits will last and be enjoyed by the consumer. In addition, for higher dissolved gas volume levels above 3.8, use of enhanced beverage diluent liquid instead of beverage diluent liquid only makes it easier to reach these levels and keep the beverage making within the preferred beverage making specifications. With reference to FIG. 30A, the method begins in block 5002.

In block 5002, there is illustrated a method of making a beverage, in a beverage making machine 100, the method increasing the retained volume of a gas in the beverage after dispense into a vessel 118, by mixing a beverage diluent liquid 702 with at least one of a micro ingredient 214 to form an enhanced beverage diluent liquid, and then dissolving the gas 704 into the enhanced beverage diluent liquid versus dissolving the gas into the beverage diluent liquid 702 only.

The method starts in block 5002 where on inlet into a dissolver 104 a predefined ratio of a beverage diluent liquid 702 can be mixed with at least one of a micro ingredient 214 to form an enhanced beverage diluent liquid, the micro ingredient 214 being a sweetener or a non-nutritive sweetener or a combination thereof. The method moves to block 5004.

In block 5004 the gas 704 is injected into the dissolver 104 at a gas dissolving pressure to cause the gas 704 to dissolve into the enhanced beverage diluent liquid.

The term "gas dissolving pressure", in the present invention, is intended to mean the gas pressure necessary to cause the gas to dissolve into a liquid. In general, the liquid can be at some nominal pressure and in order to get the gas to dissolve into the liquid, the pressure of the gas needs to exceed the nominal pressure of the liquid. As such, the gas dissolving pressure is that pressure, which is need to overcome any nominal liquid pressure and forcible diffuse the gas into the liquid. In an exemplary embodiment, there may be a minimum gas dissolving pressure, at which the gas begins to dissolve into the liquid and a higher and/or more preferred gas dissolving pressure that dissolves the desired volumes of gas level into the liquid, in a desired time period. Typically, liquid temperature, surface area of the liquid exposed to the gas, gas dissolving pressure, and other factors work together to determine the average time required to dissolve the gas into the liquid and for the gas infused liquid to reach equilibrium. The method moves to block 5006.

In block 5006 a predetermined amount of the gas 704 can be dissolved into the enhanced beverage diluent liquid. The method moves to block 5008.

In block 5008 the enhanced beverage diluent liquid can be mixed with at least one of a second micro ingredient to form the beverage. The method moves to block 5010.

In block 5010 the beverage can be dispensed from the beverage making machine 100 into a vessel 118. In this regard, as the beverage leaves the higher pressure environment of the dissolver 104 and enters standard atmospheric conditions of the vessel 118, the enhanced beverage diluent liquid causes the gas 704 to be retained in the beverage in higher concentration, instead of being more easily released to the atmosphere, such that the volumes of the gas 704 in the beverage, after dispense, is increased versus having dissolved the gas into the beverage diluent liquid 702 only. The routine is exited.

Referring to FIG. 30A there are also illustrated exemplary embodiments of methods of increasing the retained volume of gas 704 in the beverage after dispense into a vessel, by mixing a beverage diluent liquid 702 with at least one of a micro ingredient 214 to form an enhanced beverage diluent liquid. Such exemplary embodiments illustrated below can be selectively utilized with the methods of the present invention.

In block 5012 at least one of the beverage making cartridges 200 can be inserted into the beverage making machine 100. In an exemplary embodiment, the beverage making cartridge 200 can comprise a solid gas source 202 that through sublimation emits a gas 704. The method moves to block 5014.

In block 5014 a gas storage tank 108 can be pressurized and arranged to store the gas 704.

In block 5016 the beverage having a selectable target gas volumes level can be created by diluting volumetrically the enhanced beverage diluent liquid from the dissolver 14 which comprises the gas 704, with the beverage diluent liquid 702 which is absence the gas 704, to form the blended beverage diluent liquid having the selected target gas volumes level.

In block 5018 the supply of micro ingredients 214 can be stopped prior to stopping of the supply of the beverage diluent liquid 702 to clean the beverage making machine 100 fluid pathways, in preparation of making a subsequent beverage.

In block 5020 the enhanced beverage diluent liquid 702 and the gas 704 inside the dissolver 104 is allowed to reach equilibrium. The method moves 5022.

In block 5022 the enhanced beverage diluent liquid 702 is released from the dissolver.

In block 5024 the gas, as force, is used to eject the gas 704 infused enhanced beverage diluent liquid from the dissolver 104.

In block 5026 the beverage diluent liquid 702 can be chilled approaching 32 degrees Fahrenheit prior to dissolving the gas 704 into the enhanced beverage diluent liquid, wherein solubility of the gas 704 into the enhanced beverage diluent liquid is increased.

In block 5028 the dissolver is a gas permeable hollow fiber tube.

In block 5030 the dissolver is a tank style dissolver.

Referring to FIG. 30B and with reference to at least FIG. 12 there is illustrated examples of increasing the retained volume of gas 704 in the beverage after dispense into a vessel, by mixing a beverage diluent liquid 702 with at least one of a micro ingredient 214 to form an enhanced beverage diluent liquid. The method begins in block 5032.

In block 5032 there is illustrated a method of making a beverage, in a beverage making machine 100, the method increasing the retained volume of gas 704 in the beverage after dispense into a vessel 118, by mixing a beverage diluent liquid 702 with at least ones of a micro ingredient 214 to form an enhanced beverage diluent liquid, and then dissolving a gas 704 into the enhanced beverage diluent liquid versus dissolving the gas 704 into the beverage diluent liquid 702 only. In this regard, combining the beverage diluent liquid with the sweetener and/or the non-nutritive sweetener creates a new matrix of molecules that the gas can diffuse into. This new matrix holds the gas molecules, in the combined liquid, better than trying to infuse the beverage diluent liquid only.

The method starts in block 5032 where a beverage type containing a sweetener, a non-nutritive sweetener, or a combination thereof, can be selected wherein two of the micro ingredient 214 can be the sweetener and the non-nutritive sweetener and the beverage making machine 100.

The beverage making machine can further comprise a dissolver 104 which further comprises a gas inlet 156, a sweetener inlet 164, a non-nutritive sweetener inlet 166, a beverage diluent liquid inlet 154, at least a first dissolving chamber 152B, and a second dissolving chamber 152D each having an inlet end 168 for receiving the sweetener, the non-nutritive sweetener and the beverage diluent liquid, and an outlet end 170 where the sweetener, the non-nutritive sweetener, the beverage diluent liquid 702, and combinations thereof can exit the dissolving chamber, each of the first and second dissolving chamber 152B/152D is partitioned and arranged to prevent mixing between the first and second dissolving chamber 152B/152D, each of the first and second dissolving chamber 152B/152D is also arranged to allow the gas 704 supplied, from the gas inlet 156, to permeate liquids in each of the first and second dissolving chamber 152B/152D. The method moves to block 5034 and block 5044. Block 5034 is the path for when the beverage selected contains the sweetener and block 5044 is the path for when the beverage selected contains the non-nutritive sweetener. In the case where the beverage selected contains a combination of sweetener and non-nutritive sweetener then both pathway 5034 and 5044 are followed.

In block 5034 in the case the beverage type selected contains the sweetener. The method moves to block 5036 otherwise the method moves to block 5040.

In block 5036 on inlet into the dissolver, a predefined ratio of the beverage diluent liquid 702 from the beverage diluent liquid inlet 154 is mixed with the sweetener from the sweetener inlet 164 to form the enhanced beverage diluent liquid. Combining the beverage diluent liquid with the sweetener creates a new matrix of molecules that the gas can diffuse into. This new matrix holds the gas molecules, in the combined liquid, better than trying to infuse the beverage diluent liquid only. The method moves to block 5038.

In block 5038 the fluid flow of the enhanced beverage diluent liquid is directed into the first dissolving chamber 152B. The method continues in block 5040.

In block 5040 the gas 704 is injected into the dissolver 104 at a gas dissolving pressure to cause the gas to dissolve into the enhanced beverage diluent liquid. The method moves to block 5042.

In block 5042 the beverage is dispensed from the beverage making machine into a vessel. In this regard, as the beverage leaves the higher pressure environment of the dissolver 104 and enters standard atmospheric conditions of the vessel 118, the enhanced beverage diluent liquid causes the gas 704 to be retained in the beverage in higher concentration, instead of being more easily released to the atmosphere, such that the volumes of the gas 704 in the beverage, after dispense, is increased versus having dissolved the gas into the beverage diluent liquid 702 only. The routine is exited.

In block 5044 in the case the beverage type selected contains the non-nutritive sweetener. The method moves to block 5046 otherwise the method moves to block 5040.

In block 5046 on inlet into the dissolver 104, a predefined ratio of a beverage diluent liquid 702 from the beverage diluent liquid inlet 154 can be mixed with the non-nutritive sweetener from the non-nutritive sweetener inlet 166 to form the enhanced beverage diluent liquid. Combining the beverage diluent liquid with the non-nutritive sweetener creates a new matrix of molecules that the gas can diffuse into. This new matrix holds the gas molecules, in the combined liquid, better than trying to infuse the beverage diluent liquid only. The method moves to block 5048.

In block 5048 the fluid flow of the enhanced beverage diluent liquid can be directed into the second dissolving chamber 152D. The method moves to block 5040.

Referring to FIGS. 31A-B there is illustrated examples of methods of making a beverage in a beverage making machine 100. In an exemplary embodiment, beverages having a predetermined level of dissolved gas can be effectuated by combining beverage diluent liquid fluid flows (with and without gas infusion) with at least one of a micro ingredient flow to control the volumes of gas in a formed beverage. Illustrated in at least FIG. 11 are multiple incoming liquid streams that can comprise micro ingredients, beverage diluent liquids comprising with and without gas, and/or other types and kinds of liquid streams, as may be required and/or desired in a particular embodiment. The streams converge on the dispenser 120 or a mixer 150. The mixed streams can then be dispensed to form the beverage having a selectable level of dissolved gas into a vessel 118.

Referring to FIG. 31A, with reference also to at least FIG. 11, in an exemplary embodiment, a method of making a beverage comprising a gas in a beverage making machine 100 begins in block 6002.

In block 6002 a gas storage tank 108 can be pressurized and arranged to store a gas. The method moves to block 6004.

In block 6004 a beverage diluent liquid can be supplied into a dissolver 104. The method moves to block 6006.

In block 6006 by way of the dissolver 104, a portion of the gas 704 can be dissolved into the beverage diluent liquid at a minimum dissolver gas volumes level. The method moves to block 6008.

In block 6008 a blended beverage diluent liquid can be created having a selectable target gas volumes level by diluting volumetrically the beverage diluent liquid from the dissolver 104 comprising the gas, with the beverage diluent liquid 702 which is absence the gas 704, to form the blended beverage diluent liquid having the selected target gas volumes level. The method moves to block 6010.

In block 6010 a predefined ratio of a micro ingredient and the blended beverage diluent liquid can be dispensed to form a beverage having the selected target gas volumes level. The method is exited.

Referring to FIG. 31A, with reference also to at least FIG. 11, in another exemplary embodiment, a method of making a beverage comprising a gas in a beverage making machine 100 begins in block 6012.

In block 6012 at least one of a beverage making cartridge 200 can be inserted into the beverage making machine 100, the beverage making cartridge 200 comprising at least one of a micro ingredient 214 and a solid gas source 202 that through sublimation emits a gas. The method moves to block 6002.

Referring to FIG. 31A, with reference also to at least FIG. 11, in another exemplary embodiment, a method of making a beverage comprising a gas in a beverage making machine 100 begins in block 6014.

In block 6014 at least one of a beverage making cartridge 200 can be inserted into the beverage making machine 100, the beverage making cartridge 200 comprising at least one of a micro ingredient 214, a solid gas source 202 that through sublimation emits a gas 704, and a dissolver 104. The method moves to block 6002.

Referring to FIGS. 31A-B there are also illustrated exemplary embodiments of methods of making a beverage comprising a gas in a beverage making machine 100. Such exemplary embodiments illustrated below can be selectively utilized with the methods of the present invention.

In block 6016 at least one of a beverage making cartridge 200 can be inserted into the beverage making machine 100, the beverage making cartridge 200 comprising at least one of the micro ingredient 214.

In block 6018 at least one of a beverage making cartridge 200 can be inserted into the beverage making machine 100, the beverage making cartridge 200 comprising a gas source portion 228 comprising a solid gas source 202 that through sublimation emits the gas 704.

In block 6020 the beverage diluent liquid 702 can be introduced into the gas permeable hollow fiber tube chamber 104 (in at least FIG. 12), the gas permeable hollow fiber tube chamber 104 receiving a fixed volume of the beverage diluent liquid 702. The method moves to block 6022.

In block 6022 the gas 704 can be injected, at a gas dissolving pressure, into the gas permeable hollow fiber tube chamber 104 (in at least FIG. 12), to obtain the minimum dissolver gas volumes level. The method moves to block 6024.

In block 6024 the beverage diluent liquid 702 and the gas 704 inside the gas permeable hollow fiber tube 104 (in at least FIG. 12) are allowed to reach equilibrium. The method moves to block 6026.

In block 6026 the gas infused beverage diluent liquid is released from the gas permeable hollow fiber tube chamber 104 (in at least FIG. 12).

In block 6028 the gas 704, as force, can be used to eject the gas infused beverage diluent liquid from the gas permeable hollow fiber tube chamber (in at least FIG. 12).

In block 6030 the beverage diluent liquid 702 can be chilled approaching 32 degrees Fahrenheit prior to dissolving the gas 704 into the beverage diluent liquid 702, wherein solubility of the gas 704 into the beverage diluent liquid 702 is increased.

In block 6032 the minimum dissolver 104 gas volumes level is greater than four and the selectable target gas volumes level is between one-half gas volumes and five gas volumes.

In block 6034 the predetermined target gas 704 volumes level is between one-half gas volumes and five gas volumes.

In block 6036 the minimum dissolver gas volumes level is in the range of up to nine.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A beverage making machine comprising:
   a beverage making cartridge comprising a solid gas source that, through sublimation, emits an aroma enhanced gas, wherein the solid gas source comprises a ratio of a frozen aroma and a second solid gas source;
   a gas storage tank arranged to store the aroma enhanced gas;
   a beverage diluent receptacle for receiving a beverage diluent liquid;
   a dissolver adapted to dissolve a portion of the aroma enhanced gas, from the gas storage tank, into the beverage diluent liquid; and
   a dispenser selectively dispensing a predefined ratio of a beverage ingredient and the beverage diluent liquid with the dissolved aroma enhanced gas to form a beverage.

2. The beverage making machine of claim 1, wherein the aroma is captured from vapor release during a preparation process for coffee, tea, or citrus.

3. The beverage making machine of claim 2, wherein the preparation process is brewing, fermenting, or squeezing an ingredient.

4. The beverage making machine of claim 1, wherein the aroma is a sweetness enhancing aroma.

5. The beverage making machine of claim 1, wherein the beverage ingredient is packaged in the beverage making cartridge.

6. The beverage making machine of claim 1, wherein the dissolver is configured to dissolve up to nine volumes of the aroma enhanced gas into the beverage diluent liquid.

7. The beverage making machine of claim 1, wherein the dissolver is further configured to hold the beverage diluent liquid at a multiple of atmospheric pressure for a time period to allow the aroma enhanced gas to dissolve into the beverage diluent liquid and reach equilibrium.

8. The beverage making machine of claim 1, where the beverage comprises between two and five volumes of the aroma enhanced gas.

9. The beverage making machine of claim 1, wherein the beverage making cartridge comprises a one-way vent configured to allow the aroma enhanced gas to escape the cartridge while preventing air from entering the package through the one-way vent.

10. The beverage making machine of claim 9, wherein the beverage making cartridge further comprises an insulation material that seals the solid gas source to moderate a rate of sublimation of the solid gas source.

11. The method of claim 1, where the formed beverage comprises between two and five volumes of the aroma enhanced gas.

12. A method of making a beverage in a beverage making machine, the method comprising:
   inserting a beverage making cartridge into the beverage making machine, the beverage making cartridge comprising a solid gas source that, through sublimation, emitting an aroma enhanced gas, wherein the solid gas source comprises a ratio of a frozen aroma and a second solid gas source;
   pressurizing a gas storage tank by sublimation of the solid gas source, the gas storage tank being arranged to store the aroma enhanced gas;
   supplying a beverage diluent liquid into a dissolver;

dissolving, by way of the dissolver, a portion of the aroma enhanced gas into the beverage diluent liquid at a dissolver gas volume level;

dispensing selectively a predefined ratio of a beverage ingredient and the beverage diluent liquid with the dissolved aroma enhanced gas to form a beverage.

13. The method of claim 12, wherein the aroma is captured from vapor release during a preparation process for coffee, tea, or citrus.

14. The method of claim 13, wherein the preparation process is brewing, fermenting, or squeezing an ingredient.

15. The method of claim 11, wherein the aroma is a sweetness enhancing aroma.

16. The method of claim 12, wherein the beverage ingredient is packaged in the beverage making cartridge.

17. The method of claim 12, wherein the dissolver gas volume level is up to nine volumes of the aroma enhanced gas in the beverage diluent liquid.

18. The method of claim 12, wherein dissolving the portion of the aroma enhanced gas comprises holding the beverage diluent liquid at a multiple of atmospheric pressure for a time period to allow the aroma enhanced gas to dissolve into the beverage diluent liquid and reach equilibrium.

19. The method of claim 12, wherein the beverage making cartridge comprises a one-way vent configured to allow the aroma enhanced gas to escape the cartridge while preventing air from entering the package through the one-way vent.

20. The method of claim 12, wherein the second solid gas source is dry ice.

* * * * *